(12) United States Patent
Huang et al.

(10) Patent No.: US 11,796,881 B2
(45) Date of Patent: Oct. 24, 2023

(54) BLUE PHASE LIQUID CRYSTAL POLARIZATION HOLOGRAM COMPRISING LIQUID CRYSTAL MOLECULES HAVING A SPATIALLY VARYING IN-PLANE ORIENTATION PATTERN AND DEVICE INCLUDING THE SAME

(71) Applicant: Meta Platforms Technologies, LLC, Menlo Park, CA (US)

(72) Inventors: Yuge Huang, Painted Post, NY (US); Nicholas John Diorio, Jr., Duvall, WA (US); Lu Lu, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/157,060

(22) Filed: Jan. 19, 2023

(65) Prior Publication Data

US 2023/0280626 A1    Sep. 7, 2023

Related U.S. Application Data

(60) Provisional application No. 63/313,262, filed on Feb. 23, 2022.

(51) Int. Cl.
*G02F 1/137* (2006.01)
*C09K 19/02* (2006.01)
(Continued)

(52) U.S. Cl.
CPC ...... *G02F 1/13775* (2021.01); *C09K 19/0275* (2013.01); *C09K 19/542* (2013.01);
(Continued)

(58) Field of Classification Search
CPC .......... G02F 1/13775; G02F 1/133365; G02F 1/13793; G02F 1/1398; G02F 2203/24;
(Continued)

(56) References Cited

U.S. PATENT DOCUMENTS

2016/0011353 A1 *    1/2016    Escuti ................ G03B 21/2073
                                                                              359/15
2020/0049992 A1 *    2/2020    Peng ....................... G06F 3/012
(Continued)

OTHER PUBLICATIONS

Chen R., et al., "Multistimuli-Responsive Self-Organized Liquid Crystal Bragg Gratings," Advanced Optical Materials, 2019, 1900101, 6 pages.
(Continued)

*Primary Examiner* — Paul C Lee
(74) *Attorney, Agent, or Firm* — MILLBURN IP PLLC

(57) ABSTRACT

A device includes a polymer stabilized blue phase liquid crystal ("PS-BPLC") layer. The device also includes an alignment structure coupled with the PS-BPLC layer. LC molecules disposed in contact with the alignment structure are configured to have a spatially varying in-plane orientation pattern that is at least partially defined by the alignment structure. The PS-BPLC layer is configured to forwardly deflect a polarized light having a predetermined handedness, and transmit a polarized light having a handedness that is orthogonal to the predetermined handedness.

20 Claims, 32 Drawing Sheets

(51) Int. Cl.

| | |
|---|---|
| *G02F 1/1333* | (2006.01) |
| *G02F 1/1335* | (2006.01) |
| *G02F 1/1337* | (2006.01) |
| *G02F 1/139* | (2006.01) |
| *G02B 27/00* | (2006.01) |
| *C09K 19/58* | (2006.01) |
| *C09K 19/54* | (2006.01) |

(52) U.S. Cl.
CPC ........ *C09K 19/586* (2013.01); *G02B 27/0093* (2013.01); *G02F 1/1337* (2013.01); *G02F 1/1398* (2021.01); *G02F 1/13793* (2021.01); *G02F 1/133365* (2013.01); *G02F 1/133526* (2013.01); *C09K 2019/546* (2013.01)

(58) Field of Classification Search
CPC .......... C09K 19/0275; C09K 2019/546; G02B 5/203; G02B 5/0252
See application file for complete search history.

(56) References Cited

U.S. PATENT DOCUMENTS

| | | | | |
|---|---|---|---|---|
| 2020/0081252 | A1* | 3/2020 | Jamali | G02B 5/1828 |
| 2021/0033770 | A1* | 2/2021 | Lu | G03H 1/04 |

OTHER PUBLICATIONS

Cho S.Y., et al., "Tunable Polarization Volume Gratings Based on Blue Phase Liquid Crystals," Optics Express, Jan. 17, 2022, vol. 30, No. 2, pp. 1607-1614.

Kent Optronics: "e-TransFlector—Liquid Crystal Switchable Mirror," 2014, 2 pages.

Kim M.S., et al., "Topology-Mediated Electro-Optical Behaviour of a Wide-Temperature Liquid Crystalline Amorphous Blue Phase," Soft Matter, Sep. 2, 2015, vol. 11, No. 40, 6 pages.

Li Y., et al., "Polymer-Stabilized Blue Phase Liquid Crystals for Photonic Applications," Advanced Materials Technologies, 2016, 1, 1600102, 28 pages.

Invitation to Pay Additional Fees for International Application No. PCT/US2023/013484, dated Jun. 20, 2023, 11 pages.

Lin T., et al., "Recent Advances in Photoalignment Liquid Crystal Polarization Gratings and Their Applications," Crystals, vol. 11, No. 8, Jul. 31, 2021, 22 pages.

Yoshida H., et al., "Flat Optics with Cholesteric and Blue Phase Liquid Crystals," Liquid Crystals, vol. 43, No. 13-15, Jun. 29, 2016, pp. 1909-1919.

\* cited by examiner

200

BLUE PHASE LIQUID CRYSTAL POLARIZATION HOLOGRAM COMPRISING LIQUID CRYSTAL MOLECULES HAVING A SPATIALLY VARYING IN-PLANE ORIENTATION PATTERN AND DEVICE INCLUDING THE SAME

CROSS REFERENCE TO RELATED APPLICATION

This application claims the benefit of priority to U.S. Provisional Application No. 63/313,262, filed on Feb. 23, 2022. The content of the above-referenced application is incorporated by reference in its entirety.

TECHNICAL FIELD

The present disclosure generally relates to optical components and optical devices and, more specifically, to a blue phase liquid crystal polarization hologram and a device including the same.

BACKGROUND

Liquid crystal polarization holograms ("LCPHs") combine features of liquid crystal devices and polarization holograms. Liquid crystal displays ("LCDs"), having grown to a trillion dollar industry over the past decades, are the most successful examples of liquid crystal devices. The LCD industry has made tremendous investments to scale manufacturing, from the low end G2.5 manufacturing line to the high end G10.5+ to meet the market demands for displays. However, the LCD industry has recently faced competition from organic light-emitting diodes ("OLED"), e-paper and other emerging display technologies, which has flattened the growth rate of LCD industry and has rendered significant early generation capacity redundant. This provides an opportunity to repurpose the LCD idle capacity and existing supply chain to manufacture novel LC optical devices characterized by their polarization holograms.

LCPHs or LCPH elements have features such as small thickness (about 1 um), light weight, compactness, large aperture, high efficiency, simple fabrication, etc. Thus, LCPH elements have gained increasing interests in optical device and system applications, e.g., near-eye displays ("NEDs"), head-up displays ("HUDs"), head-mounted displays ("HMDs"), smart phones, laptops, televisions, or vehicles, etc. For example, LCPH elements may be used for addressing accommodation-vergence conflict, enabling thin and highly efficient eye-tracking and depth sensing in space constrained optical systems, developing optical combiners for image formation, correcting chromatic aberrations for image resolution enhancement of refractive optical elements in compact optical systems, and improving the efficiency and reducing the size of optical systems.

SUMMARY OF THE DISCLOSURE

Consistent with an aspect of the present disclosure, a device is provided. The device includes a polymer stabilized blue phase liquid crystal ("PS-BPLC") layer. The device also includes an alignment structure coupled with the PS-BPLC layer. LC molecules disposed in contact with the alignment structure are configured to have a spatially varying in-plane orientation pattern that is at least partially defined by the alignment structure. The PS-BPLC layer is configured to forwardly deflect a polarized light having a predetermined handedness, and transmit a polarized light having a handedness that is orthogonal to the predetermined handedness.

Consistent with another aspect of the present disclosure, a system is provided. The system includes a light source assembly configured to generate an image light representing a virtual image. The system also includes an optical combiner configured to receive the image light that is off-axis incident onto the image combiner, the optical combiner being configured to focus the image light to propagate through a plurality of sub-eyeboxes forming an uncompressed eyebox. The optical combiner includes a polymer stabilized blue phase liquid crystal ("PS-BPLC") layer and an alignment structure, and LC molecules disposed at a surface of the PS-BPLC layer are configured with a predetermined in-plane orientation pattern that is at least partially defined by the alignment structure.

Consistent with another aspect of the present disclosure, a device is provided. The device includes a light source assembly configured to output a light. The device also includes a light guide coupled with an in-coupling element and an out-coupling element, the in-coupling element being configured to couple the light received from the light source into the light guide as an in-coupled light, and the out-coupling element being configured to couple the in-coupled light out of the light guide as a plurality of output lights. At least one of the in-coupling element or the out-coupling element includes a polymer stabilized blue phase liquid crystal ("PS-BPLC") layer and an alignment structure. The PS-BPLC layer is configured to forwardly deflect a polarized light having a predetermined handedness, and transmit a polarized light having a handedness that is orthogonal to the predetermined handedness.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
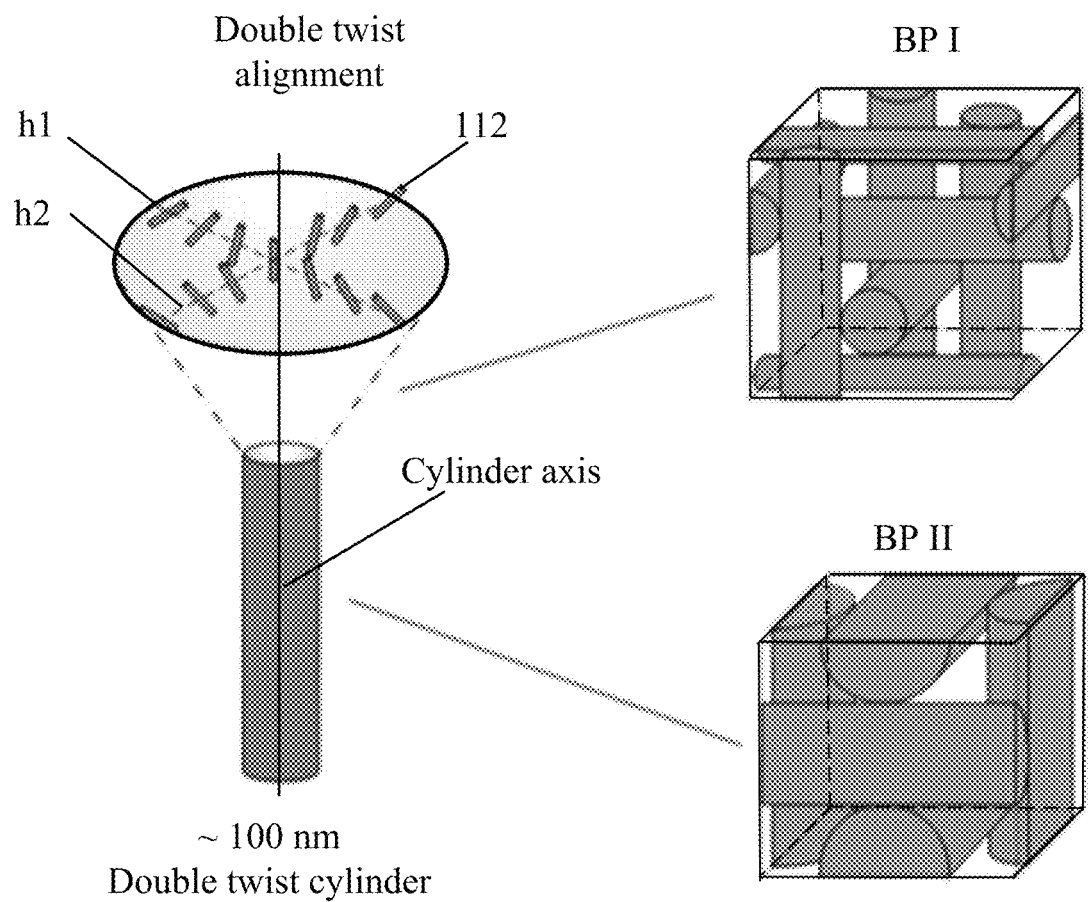
FIG. 1A schematically illustrates a double twist cylinder structure of blue phase liquid crystals ("BPLCs")

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable. The term "film plane" refers to a plane in the film, layer, coating, or plate that is perpendicular to the thickness direction or a normal of a surface of the film, layer, coating, or plate. The film plane may be a plane in the volume of the film, layer, coating, or plate, or may be a surface plane of the film, layer, coating, or plate. The term "in-plane" as in, e.g., "in-plane orientation," "in-plane direction," "in-plane pitch," etc., means that the orientation, direction, or pitch is within the film plane. The term "out-of-plane" as in, e.g., "out-of-plane direction," "out-of-plane orientation," or "out-of-plane pitch" etc., means that the orientation, direction, or pitch is not within a film plane (i.e., non-parallel with a film plane). For example, the direction, orientation, or pitch may be along a line that is perpendicular to a film plane, or that forms an acute or obtuse angle with respect to the film plane. For example, an "in-plane" direction or orientation may refer to a direction or orientation within a surface plane, an "out-of-plane" direction or orientation may refer to a thickness direction or orientation non-parallel with (e.g., perpendicular to) the surface plane. In some embodiments, an "out-of-plane" direction or orientation may form an acute or right angle with respect to the film plane.

The term "orthogonal" as in "orthogonal polarizations" or the term "orthogonally" as in "orthogonally polarized" means that an inner product of two vectors representing the two polarizations is substantially zero. For example, two lights or beams with orthogonal polarizations (or two orthogonally polarized lights or beams) may be two linearly polarized lights (or beams) with two orthogonal polarization directions (e.g., an x-axis direction and a y-axis direction in a Cartesian coordinate system) or two circularly polarized lights with opposite handednesses (e.g., a left-handed circularly polarized light and a right-handed circularly polarized light).

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, deflect, block or the like that describes processing of a light means that a major portion, including all, of a light is transmitted, reflected, diffracted, deflected, or blocked, etc. The major portion may be a predetermined percentage (greater than 50%) of the entire light, such as 100%, 98%, 90%, 85%, 80%, etc., which may be determined based on specific application needs. It is understood that when a light is transmitted, the propagation direction of the light is not affected. When a light is deflected (e.g., reflected, diffracted), the propagation direction is usually changed.

The term "optic axis" may refer to a direction in a crystal. A light propagating in the optic axis direction may not experience birefringence (or double refraction). An optic axis may be a direction rather than a single line: lights that are parallel to that direction may experience no birefringence.

Among liquid crystal polarization hologram ("LCPH") elements, liquid crystal ("LC") based polarization volume hologram ("PVH") elements have been extensively studied. A PVH element may modulate a light based on Bragg reflection. Orientations of LC molecules in the PVH element may exhibit rotations in three dimensions and, accordingly, an optic axis of the PVH element may exhibit rotations in three dimensions. PVH elements have features such as flatness, compactness, high efficiency, high aperture ratio, absence of on-axis aberrations, flexible design, simple fabrication, and low cost, etc. Thus, PVH elements can be implemented in various applications such as portable or wearable optical devices or systems.

The PVH element may be reflective or transmissive. A reflective PVH element may be based on self-organized cholesteric liquid crystals ("CLCs"), and may also be referred to as a slanted or patterned CLC element. A conventional CLC or reflective PVH element may selectively reflect an input light when the wavelength of the input light is within a Bragg band. The conventional CLC or reflective PVH element may experience a light leakage due to the anisotropic effective refractive index for an input light having a wavelength range outside of the Bragg band. The light leakage may result in a low extinction ratio, and a ghost image when the conventional CLC or reflective PVH element is implemented into an imaging device (e.g., a lens or a lens assembly). The light leakage may increase as the incident angle increases. Further, the conventional CLC or reflective PVH element may have issues of haze and slow response, and the optical performance of the conventional CLC or reflective PVH element may be poor in some applications. In addition, the choices for the material for fabricating a conventional transmissive PVH element may be limited, and a conventional transmissive PVH element with a large thickness may be difficult to fabricate.

In view of the limitations in the conventional technologies, the present disclosure provides liquid crystal polarization hologram ("LCPH") elements fabricated based on a blue phase liquid crystal ("BPLC") material. Such LCPH elements may also be referred to as BPLC polarization hologram elements. A BPLC material may include a nematic liquid crystal ("LC") host of about 70-90 wt % (weight percentage) and chiral dopants of about 5-10 wt %. Blue phase (including BP I, BP II, and BP III) is an LC phase between the chiral nematic phase (or cholesteric phase) and the isotropic phase. As shown in FIG. 1A, a figure adapted from Li Y., et al., "Polymer-Stabilized Blue Phase Liquid Crystals for Photonic Applications," Advanced Materials Technologies, 2016, 1, 1600102, BPLCs may have self-assembled double twist cylinders ("DTCs") that are symmetrically arranged in three dimensions ("3D"). FIG. 1A also shows a perspective view of a DTC with two helical axes, h1 and h2. In each DTC, LC directors (i.e., directors of LC molecules 112) may be twisted from about −45° to about +45° along a diameter direction of the cylinder, with a total rotation of 90° along the diameter direction. The helical pitch may be defined as a distance along the diameter direction over which the LC director rotates by 360°.

Depending on the packing symmetry of the DTCs, BPLCs are categorized into two types of periodic structures with body-centered cubic (BP I) and simple cubic (BP II) symmetry, each of which possesses a lattice constant of a few hundred nanometers. This structure may result in circular polarization selective Bragg reflection from the ultraviolet to the visible wavelength range. The lattice constant of the BPLCs may be determined, in part, by the concentration of the chiral dopants and the helical twist power of the chiral dopants. The lattice constant of BP I may be the same as the helical pitch, and the lattice constant of BP II may be about half of the helical pitch.

Due to the 3D helical structure formed by DTCs having a lattice constant of a few hundred nanometers, BPLCs may exhibit a circular polarization selective Bragg reflection from the ultraviolet to the visible wavelength range. BPLCs may exhibit an omnidirectional polarization-selective Bragg reflection for an input light having a wavelength range within the Bragg band, and an optical isotropy for an input light having a wavelength range outside of the Bragg band. The Bragg band may be blue-shifted or red-shifted as the incident angle varies. A wavelength range may be within the Bragg band at a first incident angle, while outside of the Bragg band at a different, second incident angle. BPLCs may have a high reflectance for an input light when the wavelength range of the input light is within the Bragg band at the first incident angle, and have a high transmittance for the input light when the wavelength range of the input light is outside of the Bragg band at the second incident angle.

BPLCs with varying lattice constants in a thickness direction of a BPLC layer may have a high reflectance and a low light leakage over a wide incident angle range (e.g., from 0° to an angle that is greater than 60°, 70°, or 80°), thereby providing a wide viewing angle. In high concentration (or high purity) BPLCs (also referred to "pure" BPLCs for convenience of discussion), defects (or disclination lines) may occur at the points where the DTCs are in contact with one another. As a result, blue phase (including BP I, BP II) may be stable only within a substantially narrow temperature range $\Delta T$ (typically, $\Delta T<5°$ C.).

Figure 1C:
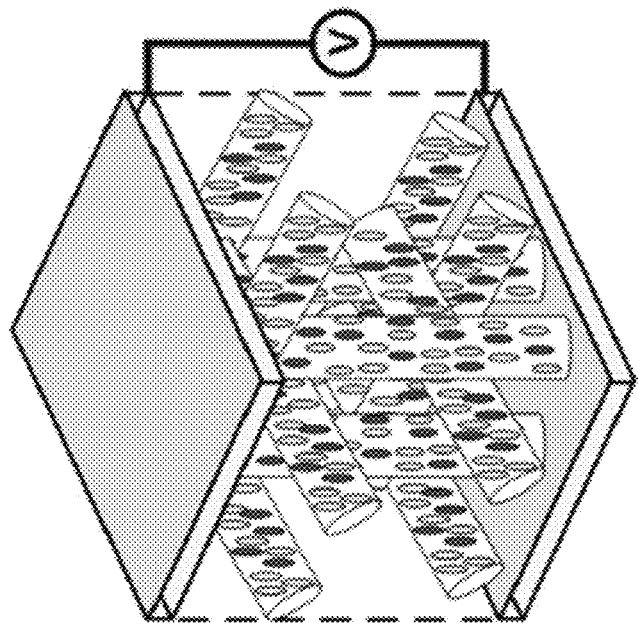
FIG. 1C schematically illustrates a PS-BPLC element at a voltage-on state.
Figure 1B:
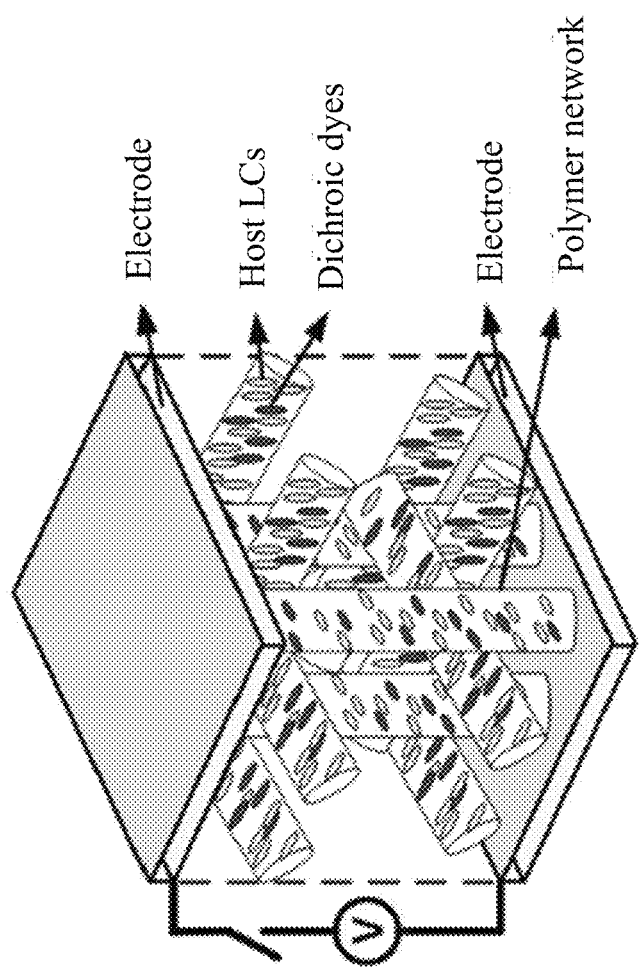
FIG. 1B schematically illustrates a polymer stabilized blue phase liquid crystal ("PS-BPLC") element at a voltage-off state.

Polymer-stabilized BPLCs ("PS-BPLCs") may have a broader blue phase temperature range (e.g., −20° C. to 70° C., and $\Delta T$=about 90° C.) than pure BPLCs. PS-BPLCs may be fabricated by doping monomers in a BPLC mixture (e.g., a nematic LC host of about 70-90 wt % and chiral dopants of about 5-10 wt %), then curing (e.g., via a UV light) the BPLC mixture doped with the monomers at the blue phase temperature. As shown in FIG. 1B, a figure adapted from Li Y., et al., "Polymer-Stabilized Blue Phase Liquid Crystals for Photonic Applications," Advanced Materials Technologies, 2016, 1, 1600102, cross-linked polymer network may be concentrated at the disclination lines and, thus, the DTC structure may be stabilized with a wide blue phase temperature range.

A PS-BPLC element may be electrically tunable. When an electric field less than a predetermined field (which may be referred to as a critical field) of the PS-BPLC element is applied to the PS-BPLC element, local re-orientations of LC molecules inside the DTCs of the PS-BPLC element may occur. For example, as shown in FIG. 1C, a figure adapted from Li Y., et al., "Polymer-Stabilized Blue Phase Liquid Crystals for Photonic Applications," Advanced Materials Technologies, 2016, 1, 1600102, the LC molecules inside the DTCs of the PS-BPLC element may tend to be aligned parallel with the direction of the electric field when the PS-BPLC element includes a positive nematic LC host (e.g., dielectric anisotropy $\Delta \varepsilon>0$), unwinding the DTCs. When the PS-BPLC element includes a negative nematic LC host (e.g., dielectric anisotropy $\Delta \varepsilon<0$), the LC molecules inside the DTCs of the PS-BPLC element may tend to be aligned perpendicular to the direction of the electric field, unwinding the DTCs. During the local re-orientation process, the LC molecules may be primarily confined with the DTCs with a diameter of about several hundred nanometers. Due to the short coherent length, the response time of the PS-BPLC element may be in the level of sub-milliseconds, which is much faster than conventional nematic LC devices. In some cases, when the electric field is increased, the polymer network may be deformed, and the 3D lattice structures of BPLCs may be distorted accordingly. For example, the lattice constant of the BPLCs may increase as the applied voltage increases, resulting in a red shift of the Bragg reflection wavelength. Due to the fast response time and the self-assembly (without relying on surface alignments (e.g., alignment layers)), PS-BPLCs have been used to achieve high contrast ratio and wide viewing angle displays.

The present disclosure provides BPLC polarization hologram elements for non-display photonic applications, i.e., applications in which the BPLC polarization hologram elements provide optical functions other than displaying images. The BPLC polarization hologram element disclosed herein may include patterned polymer stabilized blue phase structures. The BPLC polarization hologram element disclosed herein may include a PS-BPLC layer configured with predetermined surface alignments or surface alignment patterns (e.g., via alignment layers). Depending on the surface alignment pattern of the BPLC layer, the BPLC polarization hologram element may function as a reflective polarizer, a waveplate or phase retarder, a transmissive or reflective PVH element (e.g., a transmissive or reflective grating, a transmissive or reflective PVH lens, a transmissive or reflective freeform PVH phase plate, etc.). The BPLC polarization hologram element disclosed herein may have a wide viewing angle, a reduced light leakage for an input light at a large incident angle, tunable or switchable optical responses, and a fast switching speed (e.g., about 1 millisecond or less).

The BPLC polarization hologram elements described herein may be fabricated based on various methods, such as holographic interference, laser direct writing, ink-jet printing, and various other forms of lithography. Thus, a "hologram" described herein is not limited to fabrication by holographic interference, or "holography."

Figure 2A:
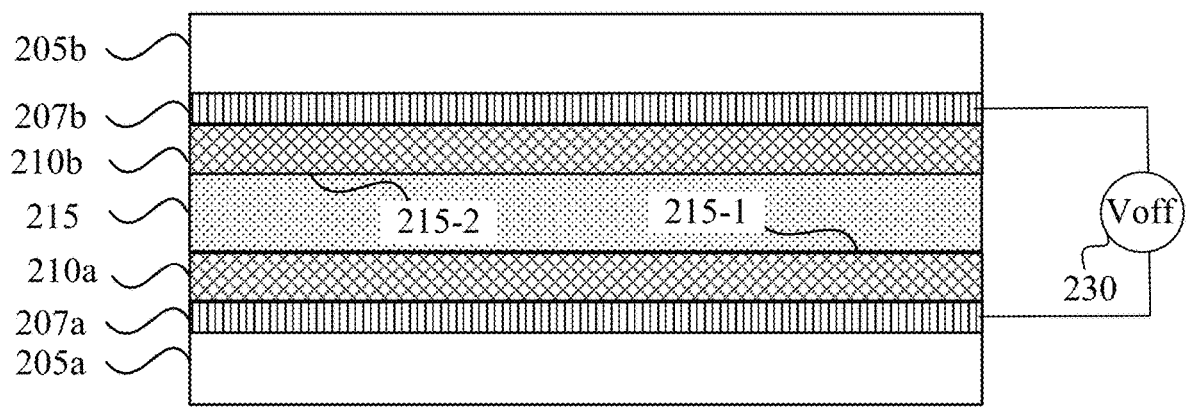
FIG. 2A schematically illustrates a BPLC polarization hologram element, according to an embodiment of the present disclosure.
Figure 2A:
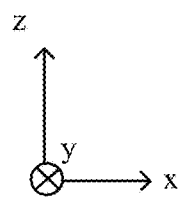

FIG. 2A illustrates an x-z sectional view of a BPLC polarization hologram element 200, according to an embodiment of the present disclosure. As shown in FIG. 2A, the BPLC polarization hologram element 200 may include a first substrate 205a and a second substrate 205b, and a BPLC layer 215 disposed between the first and second substrates 205a and 205b. The BPLC polarization hologram element 200 may include a first alignment structure 210a and a second alignment structure 210b, which may be disposed at two inner surfaces of the first and second substrates 205a and 205b that face each other, respectively. The BPLC layer 215 may be in contact with both of the first and second alignment structures 210a and 210b.

The BPLC polarization hologram element 200 may be a passive element or an active element (e.g., an electrically tunable element). When the BPLC polarization hologram element 200 is an active element, as shown in FIG. 2A, the BPLC polarization hologram element 200 may also include a first electrode layer 207a and a second electrode layer 207b disposed at the first substrate 205a and the second substrate 205b, respectively. The first and second electrodes 207a and 207b may be configured to apply a driving voltage provided by a power source 230 to the BPLC layer 215. In some embodiments, the BPLC polarization hologram element 200 may be a passive element, and the first electrode layer 207a and the second electrode layer 207b may be omitted.

The substrates 205a and 205b may be configured to provide support and/or protection to various layers, films, and/or structures disposed at (e.g., on or between) the substrate 205a and 205b. In some embodiments, at least one of the first substrate 205a or the second substrate 205b may be optically transparent (e.g., having a light transmittance of about 60% or more) in at least a visible spectrum (e.g., wavelength ranging from about 380 nm to about 700 nm). In some embodiments, at least one of the first substrate 205a or the second substrate 205b may also be transparent in at least a portion of the infrared ("IR") spectrum (e.g., wavelength ranging from about 700 nm to about 1 mm). In some embodiments, the substrates 205a and 205b may include a suitable material that is substantially transparent to lights of the above-listed wavelength ranges, such as, a glass, a plastic, a sapphire, a polymer, a semiconductor, or a combination thereof, etc. The substrates 205a and 205b may be rigid, semi-rigid, flexible, or semi-flexible. In some embodiments, the substrates 205a and 205b may have one or more surfaces in a flat, convex, concave, asphere, or freeform shape. In some embodiments, at least one of the first substrate 205a or the second substrate 205b may be a part of another optical element or device, or a part of another opto-electrical element or device. For example, at least one of the first substrate 205a or the second substrate 205b may be a solid optical lens or a part of a solid optical lens, or a part of a functional device (e.g., a display screen).

The BPLC layer 215 may be a PS-BPLC layer including PS-BPLCs, in which LC molecules may be arranged in a suitable 3D orientation pattern. The BPLC layer 215 may have a first surface 215-1 and an opposing second surface 215-2. In some embodiments, the first surface 215-1 and the second surface 215-2 may be substantially parallel surfaces. In some embodiments, the first surface 215-1 may function as an interface between the BPLC layer 215 and the first alignment structure 210a, and the second surface 215-2 may function as an interface between the BPLC layer 215 and the second alignment structure 210b. Although the body of the BPLC layer 215 is shown as flat for illustrative purposes, the body of the BPLC layer 215 may have a curved shape. For example, at least one (e.g., each) of the first surface 215-1 and the second surface 215-2 may be curved.

The first alignment structure 210a and the second alignment structure 210b may be configured to provide a surface alignment to the LC molecules of the BPLC layer 215 that are within a film plane (e.g., in a plane in close proximity to or at a contacting surface) of the respective alignment structure (or respective interface). In some embodiments, the first alignment structure 210a and the second alignment structure 210b may be configured to provide parallel surface alignments, anti-parallel surface alignments, or hybrid surface alignments (e.g., one providing a homogeneous surface alignment and the other providing a homeotropic surface alignment) to the LC molecules in contact with the alignment structures.

At least one (e.g., each) of the first alignment structure 210a or the second alignment structure 210b may be configured to provide a predetermined, suitable surface alignment pattern to the LC molecules of the BPLC layer 215 within a film plane (e.g., within a plane in close proximity to or at at least one of the first surface 215-1 or the second surface 215-2) of the BPLC layer 215, thereby aligning the LC molecules within the film plane of the BPLC layer 215 in the predetermined surface alignment pattern. Thus, the orientations of the LC directors of LC molecules within the film plane of the BPLC layer 215 may exhibit the predetermined in-plane orientation pattern according to the predetermined surface alignment pattern.

The predetermined in-plane orientation pattern may be a uniform in-plane orientation pattern, or a non-uniform in-plane orientation pattern, etc. The non-uniform in-plane orientation pattern means that the orientations of the LC directors of the LC molecules distributed along one or more in-plane directions may change in the one or more in-plane directions, and in some embodiments, the change of the orientations of the LC directors in the one or more in-plane directions may exhibit a rotation with a predetermined rotation direction, e.g., a clockwise or counter-clockwise rotation direction.

The first and second alignment structures 210a and 210b shown in FIG. 2A may be any suitable alignment structures. For example, at least one (e.g., each) of the first alignment structure 210a or the second alignment structure 210b may include a polyimide layer, a photo-alignment material ("PAM") layer, a plurality of nanostructures or microstructures, an alignment network, or any combination thereof. For example, in some embodiments, at least one (e.g., each) of the first alignment structure 210a or the second alignment structure 210b may include a PAM layer. In some embodiments, at least one (e.g., each) of the first alignment structure 210a or the second alignment structure 210b may include a polymer layer with anisotropic nano-imprint. In some embodiments, at least one (e.g., each) of the first alignment structure 210a or the second alignment structure 210b may include a polymer layer with anisotropic nano-imprint. In some embodiments, at least one (e.g., each) of the first alignment structure 210a or the second alignment structure 210b may include a plurality of microstructures, such as a surface relief grating ("SRG") coated with or without additional alignment materials (e.g., polyimides). In some embodiments, at least one (e.g., each) of the first alignment structure 210a or the second alignment structure 210b may include a ferroelectric or ferromagnetic material configured to provide a surface alignment in a presence of a magnetic field or an electric field.

The first electrode layer 207a and the second electrode layer 207b may be configured to provide a voltage to the BPLC layer 215 to control an operation state of the BPLC polarization hologram element 200. In some embodiments, as shown in FIG. 2A, the first electrode layer 207a may be disposed between the first substrate 205a and the first alignment structure 210a, and the second electrode layer 207b may be disposed between the second substrate 205b and the second alignment structure 210b. At least one (e.g., each) of the first electrode layer 207a or the second electrode layer 207b may be a continuous planar electrode layer, a patterned planar electrode layer, a protrusion electrode layer, or any other suitable type of electrode layer.

In some embodiments, both of the first electrode layer 207a and the second electrode layer 207b may be disposed at the same substrate (e.g., at the first substrate 205a or the second substrate 205b) with an electrical insulating layer disposed therebetween. One of the first electrode layer 207a and the second electrode layer 207b may be a continuous planar electrode layer, and the other may be a patterned planar electrode layer, or a protrusion electrode layer. In some embodiments, the BPLC polarization hologram element 200 may include a single electrode layer. That is, one of the first electrode layer 207a and the second electrode layer 207b may be omitted. The single electrode layer may include interdigitated electrodes, such as two individually addressable comb-like microelectrode array strips.

At least one (e.g., each) of the first electrode layer 207a or the second electrode layer 207b may include an indium tin oxide ("ITO") electrode, or any other suitable conductive electrode. In some embodiments, at least one (e.g., each) of the first electrode layer 207a or the second electrode layer 207b may include a flexible transparent conductive layer, such as ITO disposed on a plastic film. In some embodiments, the plastic film may include polyethylene terephthalate ("PET"). In some embodiments, the plastic film may include cellulose triacetate ("TAC"), which is a type of flexible plastic with a substantially low birefringence. For illustrative purposes, FIG. 2A shows that both of the first electrode layer 207a and the second electrode layer 207b are planar electrode layers disposed at different substrates 205a and 205b.

FIGS. 2B-2F illustrate x-y sectional views of a portion of the BPLC layer 215 shown in FIG. 2A, showing exemplary in-plane orientation patterns of the LC directors of the LC molecules located within a film plane of the BPLC layer 215, according to various embodiments of the present disclosure. In some embodiments, the LC molecules located within the film plane of the BPLC layer 215 may have other suitable surface alignment patterns different from those shown in FIGS. 2B-2F.

Figure 2B:
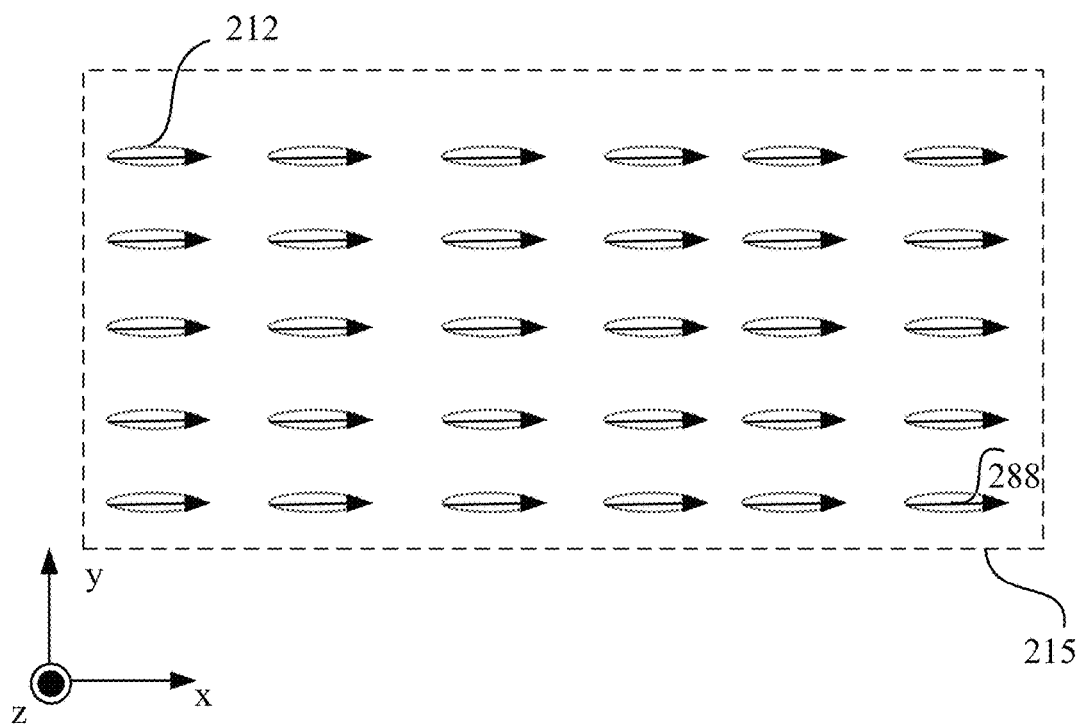
FIGS. 2B-2F schematically illustrate various views of in-plane orientations of liquid crystal molecules in the BPLC polarization hologram element shown in FIG. 2A, according to various embodiments of the present disclosure.

In the embodiment shown in FIG. 2B, at least one (e.g., each) of the first alignment structure 210a or the second alignment structure 210b may be configured to provide spatially uniform alignments to LC molecules 212 that are located within the film plane. That is, the LC directors of the LC molecules 212 that are located within the film plane of the BPLC layer 215 may be substantially uniformly aligned (e.g., along an x-axis direction shown in FIG. 2B). Accordingly, the orientations of the LC directors of the LC molecules located within the film plane of the BPLC layer 215 may exhibit a uniform in-plane orientation pattern. In some embodiments, the BPLC polarization hologram element 200 including the BPLC layer 215 having the in-plane orientation pattern shown in FIG. 2B may function as a reflective polarizer, or a waveplate (or phase retarder), etc.

In some embodiments, at least one (e.g., each) of the first alignment structure 210a or the second alignment structure 210b may be configured to provide spatially non-uniform surface alignments. Thus, the orientations of the LC directors of the LC molecules 212 located within the film plane of the BPLC layer 215 may exhibit a non-uniform in-plane orientation pattern. For example, orientations of the LC directors of the LC molecules located within the film plane of the BPLC layer 215 may periodically or non-periodically vary in at least one in-plane direction within the film plane, such as a linear direction, in a radial direction, in a circumferential (e.g., azimuthal) direction, or a combination thereof. Accordingly, the BPLC layer 215 may provide different optical functions. For example, the BPLC layer 215 may function as a grating, a prism, a lens, a segmented waveplate or a segmented phase retarder, a lens array, a prism array, etc. Exemplary non-uniform alignment patterns of the LC molecules that are located with the film plane of the BPLC layer 215 are shown in FIGS. 2C-2F. In some embodiments, the LC molecules located within the film plane may have suitable non-uniform alignment patterns that are not shown in FIGS. 2C-2F.

Figure 2C:
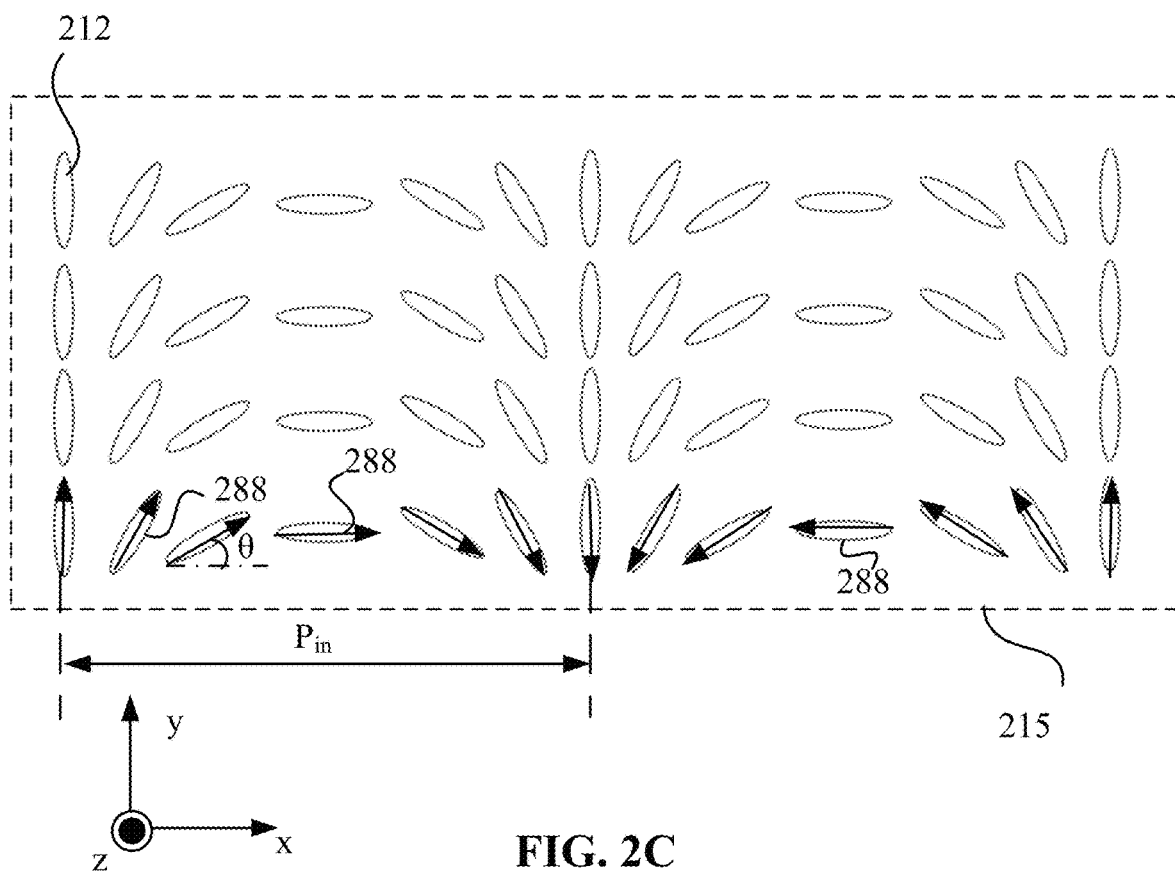

In the embodiment shown in FIG. 2C, the directors of the LC molecules 212 within the film plane of the BPLC layer 215 may exhibit a continuous rotation in a predetermined in-plane direction within the film plane, e.g., the x-axis direction. The continuous rotation of the LC directors may form a periodic rotation pattern with a uniform (e.g., same) in-plane pitch $P_{in}$. Thus, the orientation of the optic axis of the BPLC layer 215 may vary periodically in the in-plane direction (e.g., the x-axis direction) with the constant (or same) in-plane pitch $P_{in}$. It is noted that the predetermined in-plane direction may be any other suitable direction within the film plane, such as the y-axis direction, the radial direction, or the circumferential direction within the x-y plane. The in-plane pitch (or horizontal pitch) $P_{in}$ may be defined as a distance along the predetermined in-plane direction (e.g., the x-axis) over which the orientations of the LC directors exhibit a rotation by a predetermined angle (e.g., 180°). The periodically varying in-plane orientations of the LC directors shown in FIG. 2C may be referred to as a grating pattern, and the BPLC polarization hologram element 200 including the BPLC layer 215 having the grating pattern shown in FIG. 2C may function as a polarization selective, reflective or transmissive grating.

In addition, within the film plane of the BPLC layer 215, the orientations of the directors of the LC molecules 212 may rotate in a predetermined rotation direction, e.g., a clockwise direction or a counter-clockwise direction. Accordingly, the rotation of the orientations of the directors of the LC molecules 212 may exhibit a handedness, e.g., right handedness or left handedness. For discussion purposes, FIG. 2C shows that the orientations of the directors of the LC molecules 212 may exhibit a rotation in a clockwise direction. Accordingly, the rotation of the orientations of the directors of the LC molecules 212 may exhibit a left handedness.

Although not shown in FIG. 2C, in some embodiments, within the film plane of the BPLC layer 215, the orientations of the directors of the LC molecules 212 may exhibit a rotation in a counter-clockwise direction. Accordingly, the rotation of the orientations of the directors of the LC molecules 212 may exhibit a right handedness. Although not shown, in some embodiments, within the film plane of the BPLC layer 215, domains in which the orientations of the directors of the LC molecules 212 exhibit a rotation in a clockwise direction (referred to as domains $D_L$) and domains in which the orientations of the directors of the LC molecules 212 exhibit a rotation in a counter-clockwise direction (referred to as domains $D_R$) may be alternatingly arranged in two in-plane directions, e.g., in x-axis and y-axis directions.

Figure 2D:
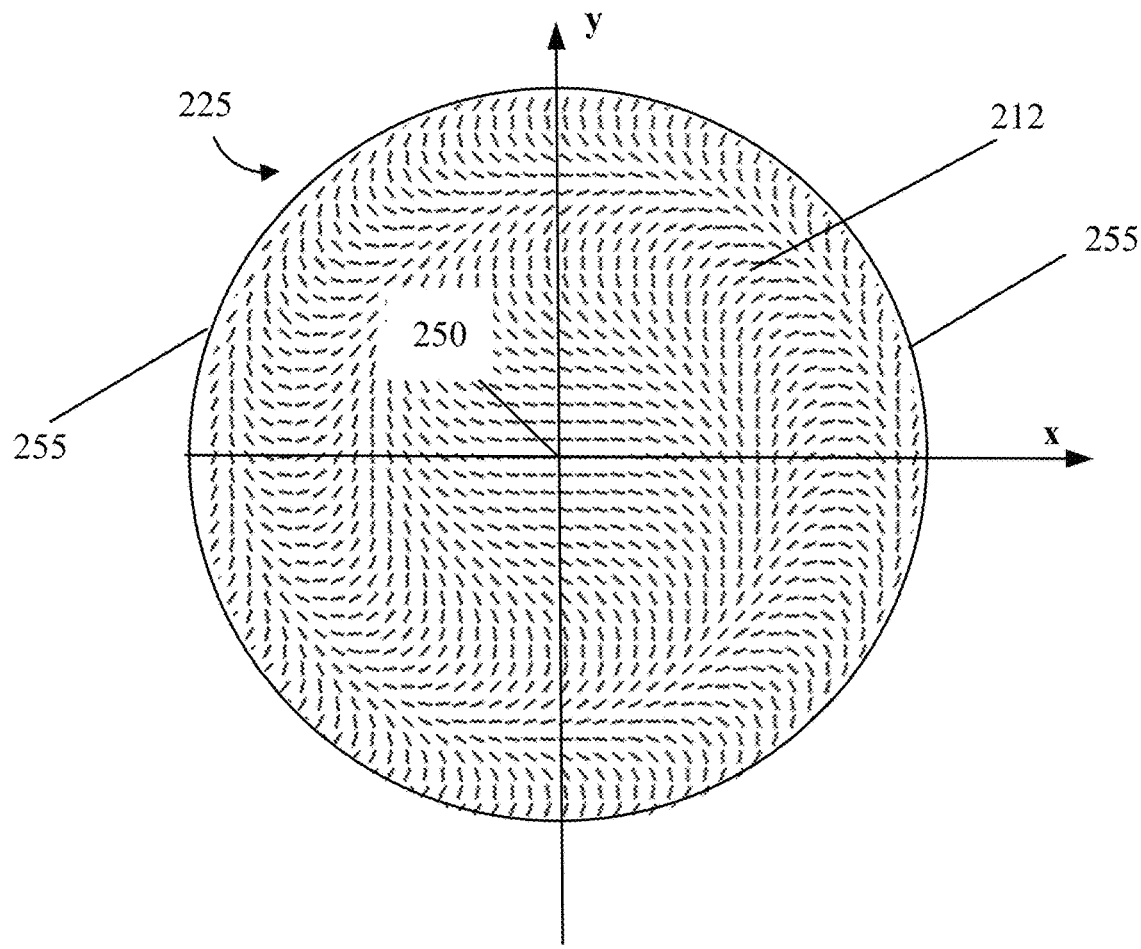

The in-plane orientation pattern of the LC directors shown in FIG. 2D may be referred to as a lens pattern (e.g., a spherical lens pattern), and the BPLC polarization hologram element 200 including the BPLC layer 215 shown in FIG. 2D may function as a polarization selective, reflective or transmissive lens (e.g., spherical lens). The orientations of the LC directors of LC molecules 212 located within the film plane of the BPLC layer 215 may exhibit a continuous rotation in at least two opposite in-plane directions from a lens pattern center 250 to opposite lens pattern peripheries 255 with a varying pitch. The orientations of the LC directors may exhibit a rotation in the same rotation direction (e.g., clockwise, or counter-clockwise) from the lens pattern center 250 to the opposite lens pattern peripheries 255. Thus, the orientation of the optic axis of the BPLC layer 215 may exhibit a continuous rotation in at least two opposite in-plane directions in from the lens pattern center 250 to the opposite lens pattern peripheries 255 with the varying pitch.

Figure 2E:
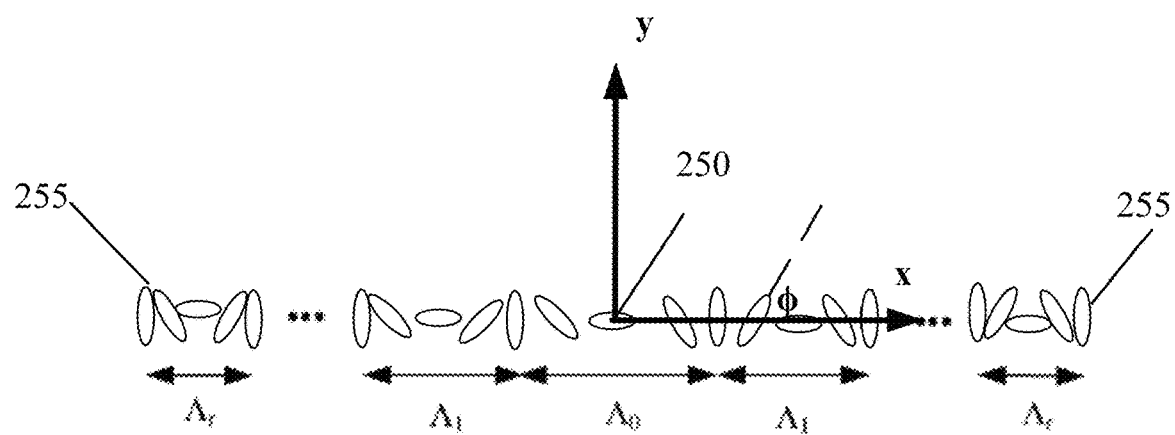

The pitch A of the in-plane orientation pattern may be defined as a distance in the in-plane direction (e.g., a radial direction) over which the orientations of the LC directors (or azimuthal angles φ of the LC molecules 212) change by a predetermined angle (e.g., 180°) from a predetermined initial state. FIG. 2E illustrates a section of the in-plane orientation pattern taken along an x-axis in the BPLC layer 215 shown in FIG. 2D, according to an embodiment of the present disclosure. As shown in FIG. 2E, according to the LC director field along the x-axis direction, the pitch A may be a function of the distance from the lens pattern center 250. The pitch A may monotonically decrease from the lens pattern center 250 to the lens pattern peripheries 255 in the at least two opposite in-plane directions (e.g., two opposite radial directions) in the x-y plane, e.g., $\Lambda_0 > \Lambda_1 > \ldots > \Lambda_r$. $\Lambda_0$ is the pitch at a central region of the lens pattern, which may be the largest. The pitch $\Lambda_r$ is the pitch at a periphery region (e.g., lens pattern periphery 255) of the lens pattern, which may be the smallest. In some embodiments, the azimuthal angle φ of the LC molecule 212 may change in proportional to the distance from the lens pattern center 250 to a local point of the BPLC layer 215 at which the LC molecule 212 is located.

Figure 2F:
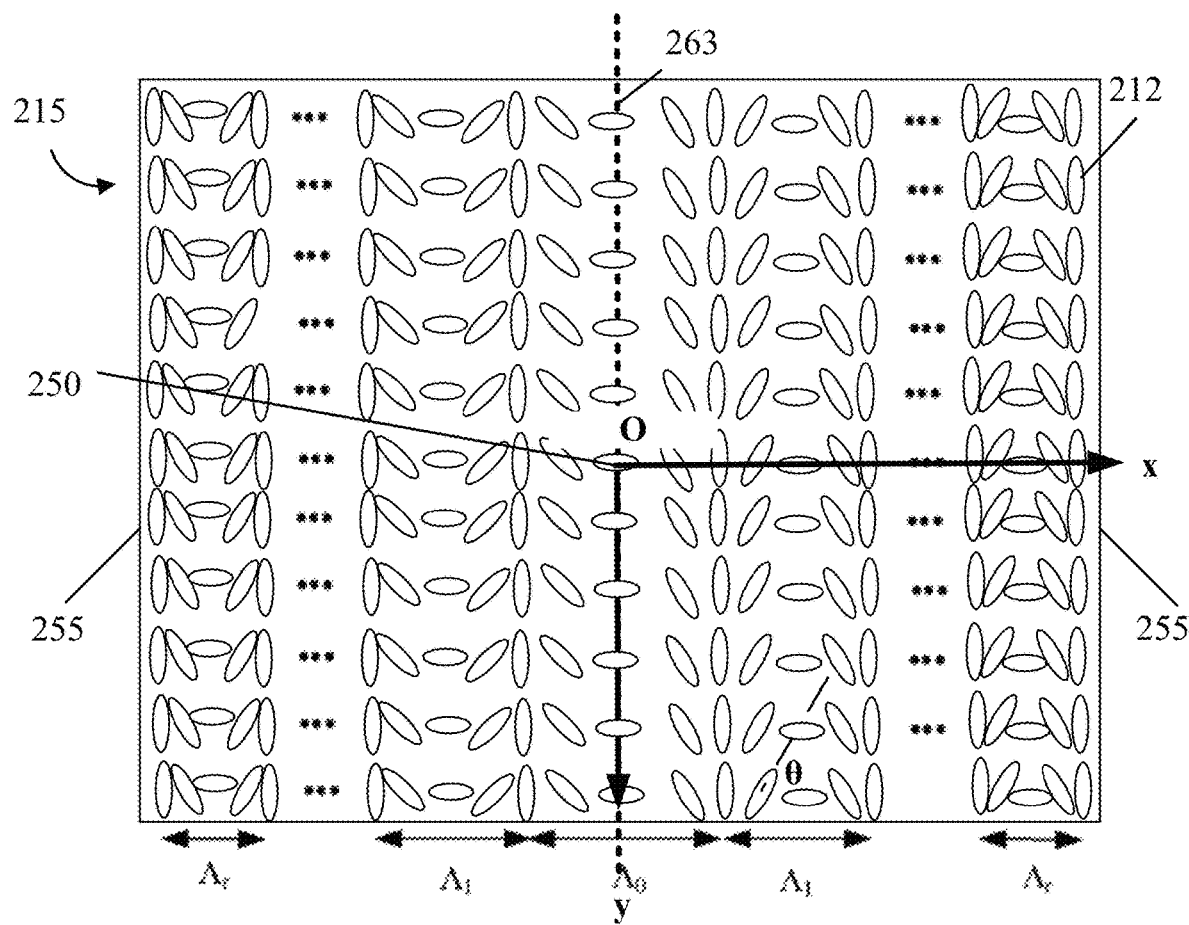

In the embodiment shown in FIG. 2F, the BPLC polarization hologram element 200 is shown as having a rectangular shape (or a rectangular lens aperture). A width direction of BPLC polarization hologram element 200 may be referred to as a lateral direction (e.g., an x-axis direction in FIG. 2F), and a length direction of the BPLC polarization hologram element 200 may be referred to as a longitudinal direction (e.g., a y-axis direction in FIG. 2F).

In the embodiment shown in FIG. 2F, the orientations of the LC molecules 212 located within a film plane (e.g., within a plane that is in close proximity to or at a surface) of the BPLC layer 215 may be configured with an in-plane orientation pattern having a varying pitch in at least two opposite lateral directions, from the lens pattern center ("$O_L$") 250 to the opposite lens pattern peripheries 255. The orientations of the LC directors of the LC molecules 212 located on the same side of an in-plane lens pattern center axis 263 and at a same distance from the in-plane lens pattern center axis 263 may be substantially the same. The rotations of the orientations of the LC directors from the lens pattern center ("$O_L$") 250 to the opposite lens pattern peripheries 255 in the two opposite lateral directions may exhibit a same handedness (e.g., right, or left handedness).

In the embodiment shown in FIG. 2F, the directors of the LC molecules 212 (or azimuthal angles of the LC molecules 212) may be configured with a continuous in-plane rotation pattern with a varying pitch ($\Lambda_0, \Lambda_1, \ldots, \Lambda_r$) from the lens pattern center ("$O_L$") 250 to opposite lens pattern peripheries 255 in the two opposite lateral directions. As shown in FIG. 2F, the pitch of the lens pattern may vary with the distance to the in-plane lens pattern center axis 263 in the lateral direction. In some embodiments, the pitch of the lens pattern may monotonically decrease as the distance to the in-plane lens pattern center axis 263 in the lateral direction increases, i.e., $\Lambda_0 > \Lambda_1 > \ldots > \Lambda_r$, where $\Lambda_0$ is the pitch at a central portion of the lens pattern, which may be the largest. The pitch $\Lambda_r$ is the pitch at an edge or periphery region of the lens pattern, which may be the smallest.

The BPLC polarization hologram element 200 including the BPLC layer 215 having the surface alignment pattern shown in FIG. 2F may function as an on-axis focusing cylindrical lens, which may focus a beam into a line (e.g., a line of focal points or a line focus). The cylindrical lens with the in-plane orientation pattern shown in FIG. 2F may be considered as a 1D example of the spherical lens with the in-plane orientation pattern shown in FIGS. 2D and 2E, and the at least two opposite in-plane directions in the BPLC polarization hologram element 200 may include at least two opposite lateral directions (e.g., the +x-axis and −x-axis directions).

Figure 2G:
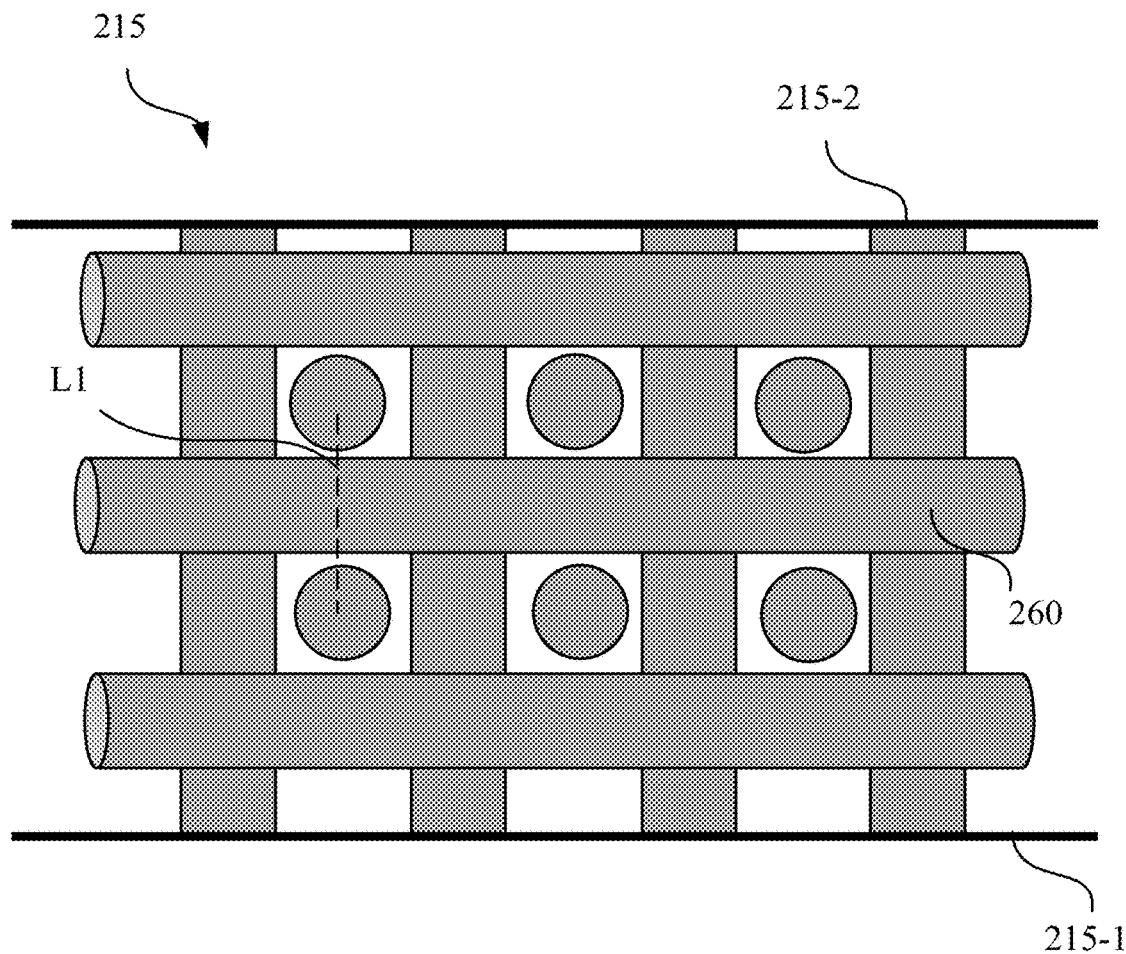
FIGS. 2G-2L schematically illustrate various views of double twist cylinders in the BPLC polarization hologram element shown in FIG. 2A, according to various embodiments of the present disclosure.
Figure 2H:
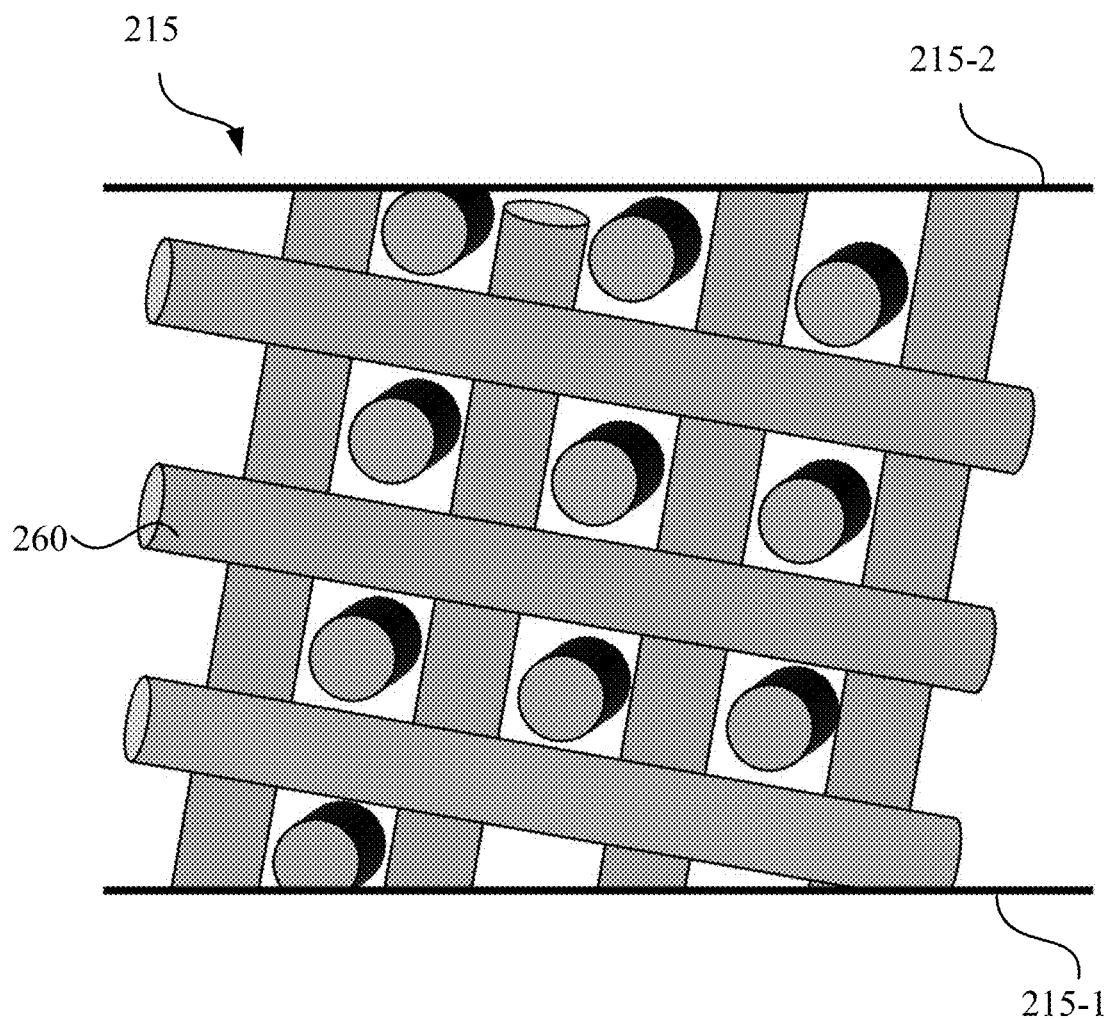
Figure 2I:
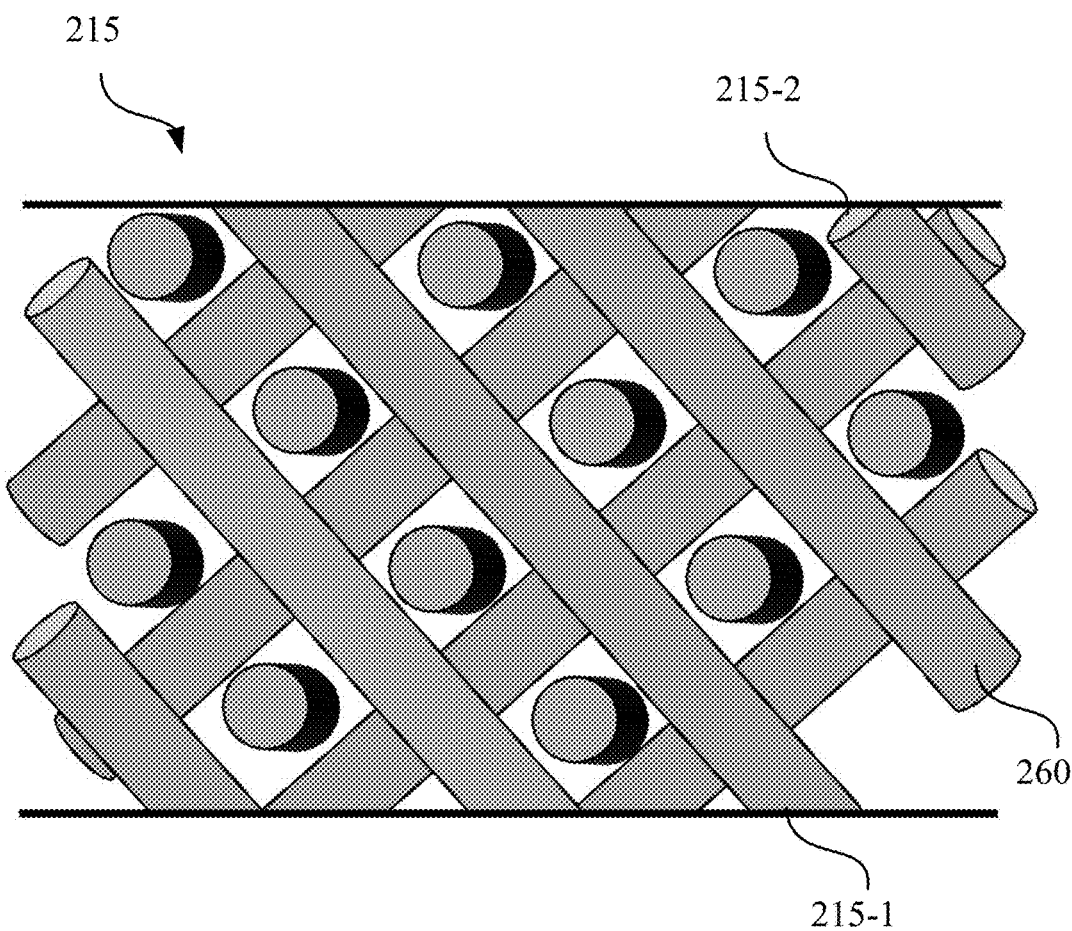
Figure 2I:
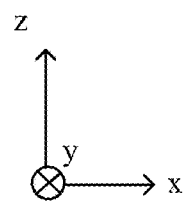

FIGS. 2G-2L schematically illustrate x-z sectional views of polymer stabilized double twist cylinders ("DTCs") 260 in the BPLC polarization hologram element 200 shown in FIG. 2A, according to various embodiments of the present disclosure. For discussion purposes, the BPLCs in the BPLC polarization hologram element 200 are presumed to have BP II. As shown in FIG. 2G, the DTCs 260 as a whole may be parallel to the surface (e.g., at least one of the first surface 215-1 or the second surface 215-2) of the BPLC layer 215. As shown in FIGS. 2H and 2I, the DTCs 260 as a whole may be tilted with an angle with respect to the surface (e.g., at least one of the first surface 215-1 or the second surface 215-2) of the BPLC layer 215. The DTCs 260 as a whole shown in FIG. 2H may be tilted with a relatively small angle (e.g., less than 45°) with respect to the surface of the BPLC layer 215, while the DTCs 260 as a whole shown in FIG. 2I may be tilted with a relatively large angle (e.g., greater than 45°) with respect to the surface of the BPLC layer 215. The tilt angle may be determined, in part, by the lattice constant L1 (or helical pitch) of the BPLCs shown in FIG. 2G, and the in-plane pitch of the in-plane orientation pattern of the BPLCs.

For discussion purposes, FIGS. 2G-2I show that the DTCs 260 in the BPLC layer 215 have a lattice constant L1 that is uniform (or the same) across the volume of the BPLC layer 215, e.g., the lattice constant L1 is uniform (or the same) in the thickness direction and within the film plane of the BPLC layer 215. In some embodiments, the BPLC layer 215 having the uniform lattice constant L1 across the volume may have a narrow reflection band. In some embodiments, to broaden the reflection band of the BPLC layer 215, the DTCs 260 in the BPLC layer 215 may be configured to have a varying lattice constant (or a varying helical pitch). That is, lattice constants at different portions of the BPLC layer 215 may be different. The variation of the lattice constant may be in at least one direction across the BPLC layer 215, such as the thickness direction of the BPLC layer 215, and/or one or more in-plane directions within the film plane of the BPLC layer 215, etc.

Figure 2J:
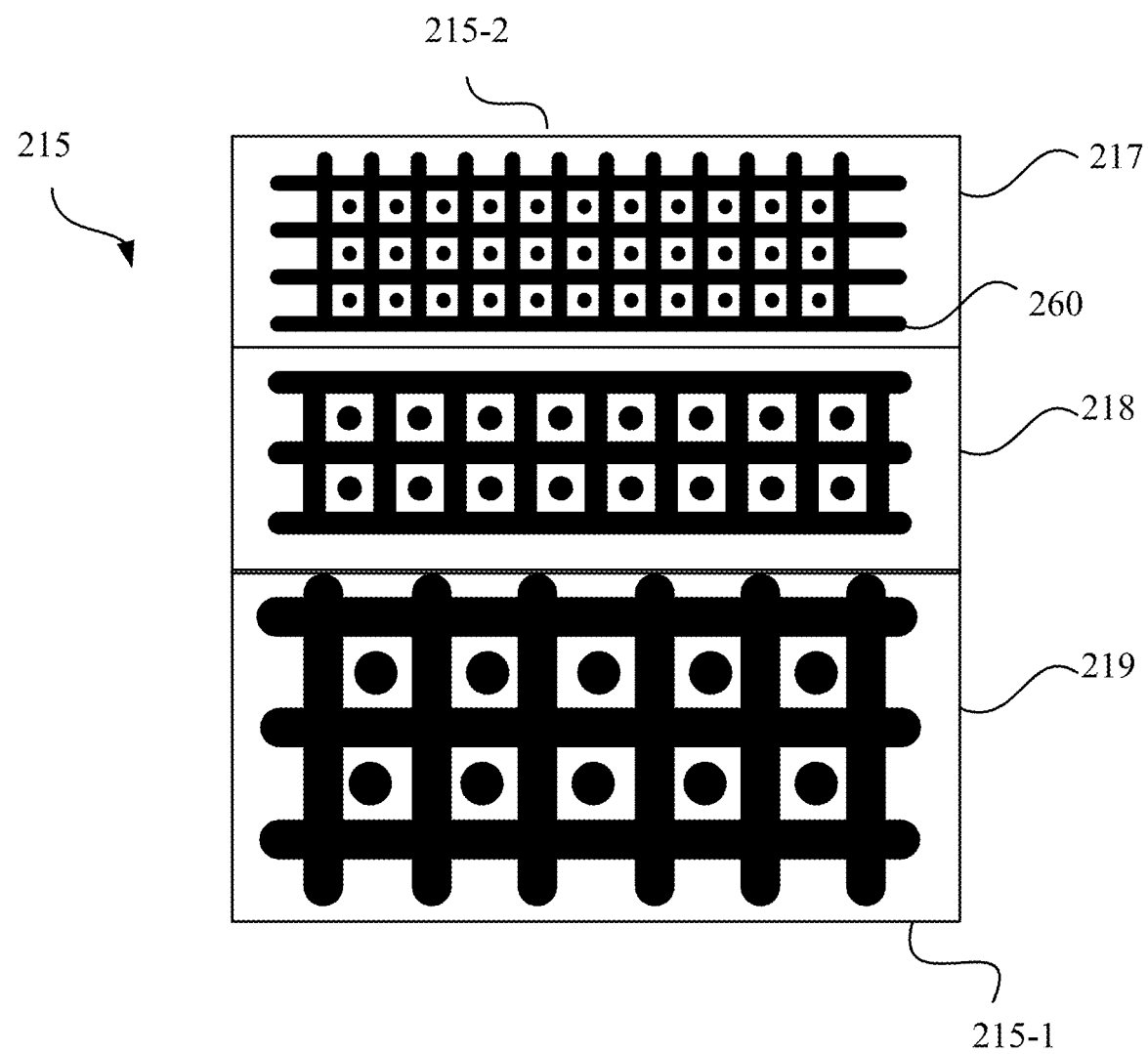

For example, as shown in FIG. 2J, the BPLC layer 215 may include a plurality of sub-layers (e.g., 217, 218, and 219) arranged in a stacked configuration. The sub-layers 217, 218, and 219 may be individually fabricated and stacked together, or one sub-layer may be fabricated on another sub-layer. Each of the sub-layers 217, 218, and 219 may include DTCs 260 having a lattice constant (or helical pitch), and for each sub-layer, the lattice constant (or the helical pitch) may be the same throughout the sub-layer. At least two of the sub-layers 217, 218, and 219 may have different lattice constants. In some embodiments, all three lattice constants for the sub-layers 217, 218, and 219 may be different. For discussion purposes, FIG. 2J shows that the lattice constants (or the helical pitches) of the sub-layers 217, 218, and 219 gradually decrease from the first surface 215-1 to the second surface 215-2 in a predetermined direction (e.g., in a thickness direction of the BPLC layer 215 shown in FIG. 2J). The sub-layers 217, 218, and 219 may have varying concentration and/or helical twist power of the chiral dopants in the BPLCs.

Figure 2K:
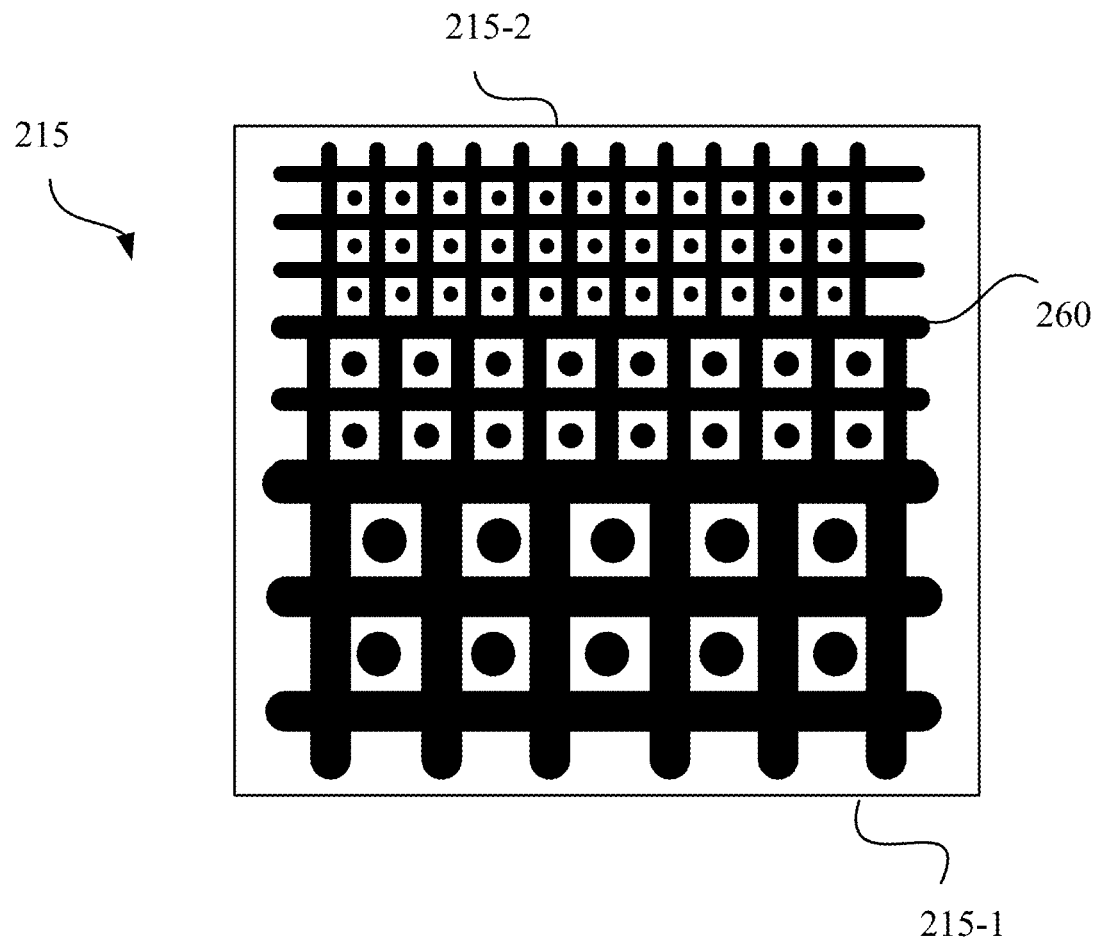

As shown in FIG. 2K, the BPLC layer 215 may not include sub-layers, and the BPLC layer 215 itself may be configured to have a varying (e.g., non-constant) lattice constant or (helical pitch) of the DTCs 260 in a predetermined direction (e.g., in a thickness direction of the BPLC layer 215 shown in FIG. 2K). For illustrative purposes, FIG. 2K shows that the varying lattice constant or (helical pitch) of the DTCs 260 gradually decreases from the first surface 215-1 to the second surface 215-2 in the thickness direction of the BPLC layer 215 shown in FIG. 2K. The varying lattice constant or (helical pitch) of the DTCs 260 shown in FIG. 2K may be obtained by varying the concentration and/or helical twist power of the chiral dopants in the BPLCs.

Figure 2L:
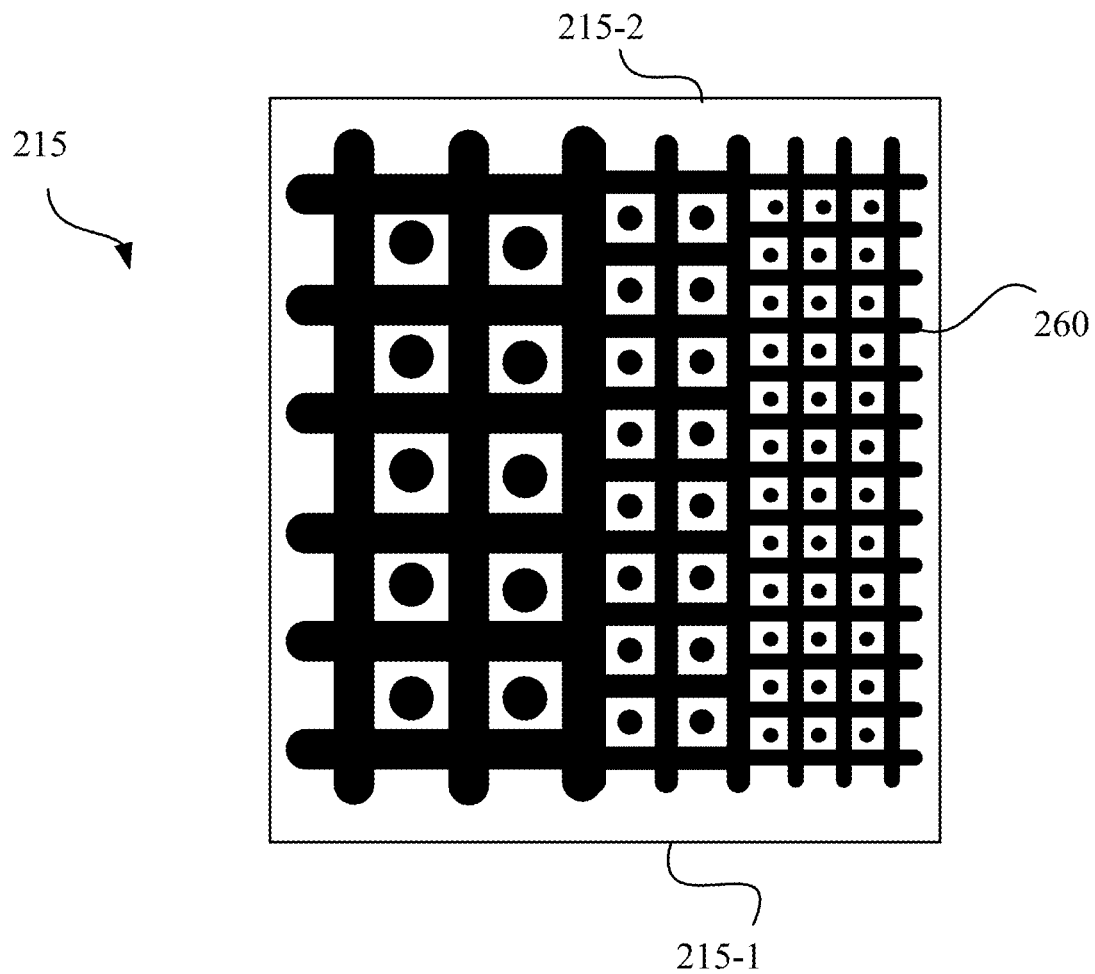

As shown in FIG. 2L, the BPLC layer 215 may be configured to have a varying (e.g., non-constant) lattice constant of the DTCs 260 in a predetermined in-plane direction (e.g., in an x-axis direction in FIG. 2L). For illustrative purposes, FIG. 2L shows that the varying lattice constant of the DTCs 260 gradually decreases along the +x-axis direction. The varying lattice constant of the DTCs 260 shown in FIG. 2L may be obtained by varying the concentration and/or helical twist power of the chiral dopants in the BPLCs. In some embodiments, although not shown, the BPLC layer 215 may be configured to have a varying lattice constant of the DTCs 260 in a predetermined in-plane direction (e.g., in the x-axis direction in FIG. 2L) and a varying lattice constant or of the DTCs 260 in a predetermined out-of-plane direction (e.g., the thickness direction of the BPLC layer 215 shown in FIG. 2K).

In some embodiments, the BPLC layer 215 having a spatially varying lattice constant of the DTCs 260 (e.g., in at least one of the thickness direction or an in-plane direction within the film plane) may be fabricated by pixelated printing birefringence mixtures having spatially varying concentrations of chiral dopants. In some embodiments, the BPLC layer 215 having a spatially varying lattice constant of the DTCs 260 (e.g., in at least one of the thickness direction or an in-plane direction within the film plane) may be fabricated by exposing a birefringence mixture including chiral dopants to a polymerization irradiation (e.g., UV irradiation) having a spatially varying intensity. The polymerization irradiation (e.g., UV irradiation) having the spatially varying intensity may result in a spatially varying polymerization rate within the birefringence mixture, which, in turn, may result in a spatially varying concentration of the chiral dopants within the birefringence mixture. In some embodiments, the BPLC layer 215 having a spatially varying lattice constant of the DTCs 260 (e.g., in at least one of the thickness direction or an in-plane direction within the film plane) may be fabricated by exposing a birefringence mixture including photo-responsive chiral dopants to a polymerization irradiation (e.g., UV irradiation) having a spatially varying intensity. The helical twist power ("HTP") of the photo-responsive chiral dopants may vary with the intensity of the polymerization irradiation.

Figure 3A:
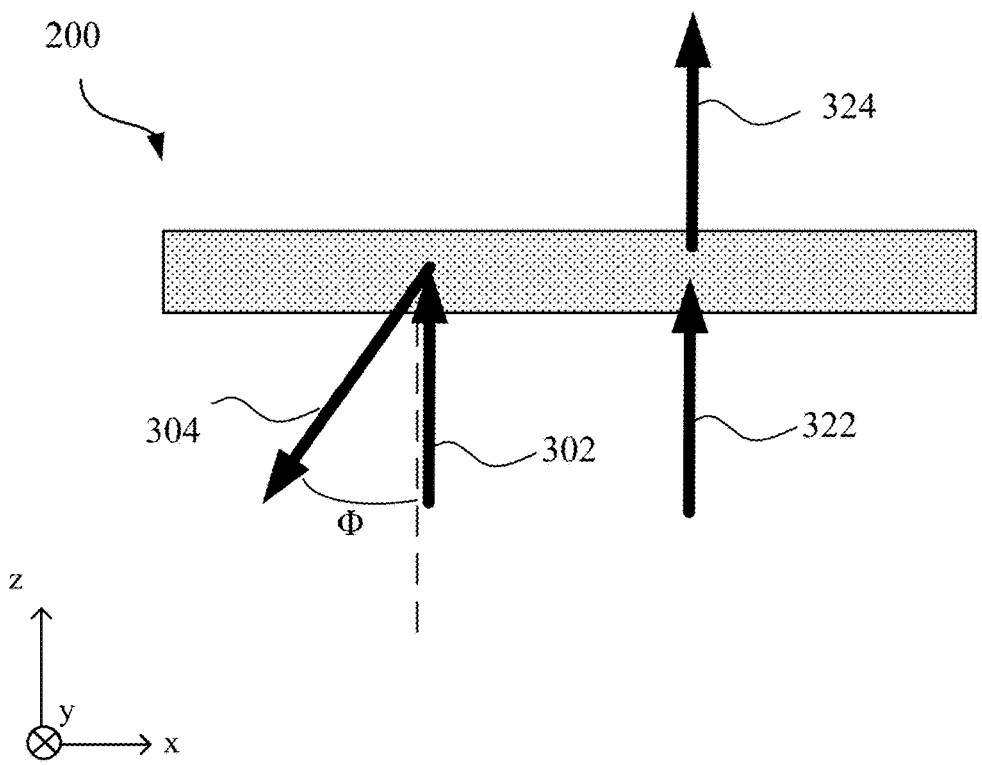
FIG. 3A illustrates polarization selective deflection of an input light by a reflective BPLC polarization hologram element, according to an embodiment of the present disclosure.

The BPLC polarization hologram element disclosed herein may be a transmissive or reflective element. FIG. 3A illustrates a polarization selective deflection of the BPLC polarization hologram element 200 shown in FIG. 2A functioning as a reflective PVH element, according to an embodiment of the present disclosure. As show in FIG. 3A, for input lights having a wavelength range within the Bragg band of the BPLC polarization hologram element 200, the BPLC polarization hologram element 200 may substantially backwardly deflect (e.g., via backward diffraction) a circularly polarized input light 302 having a predetermined handedness as a circularly polarized output light 304. A deflection angle $\phi$ (the angle of the light 304 with respect to a surface normal of the BPLC polarization hologram element 200) may be determined by various factors, such as the incidence wavelength, the in-plane pitch of the in-plane orientation pattern of the BPLCs, and the slant degree of the DTCs 260 as a whole with respect to the surface of the BPLC layer 215, etc. The BPLC polarization hologram element 200 may substantially transmit, with negligible deflection, a circularly polarized input light 322 having a handedness that is opposite to the predetermined handedness as a circularly polarized output light 324.

Figure 3B:
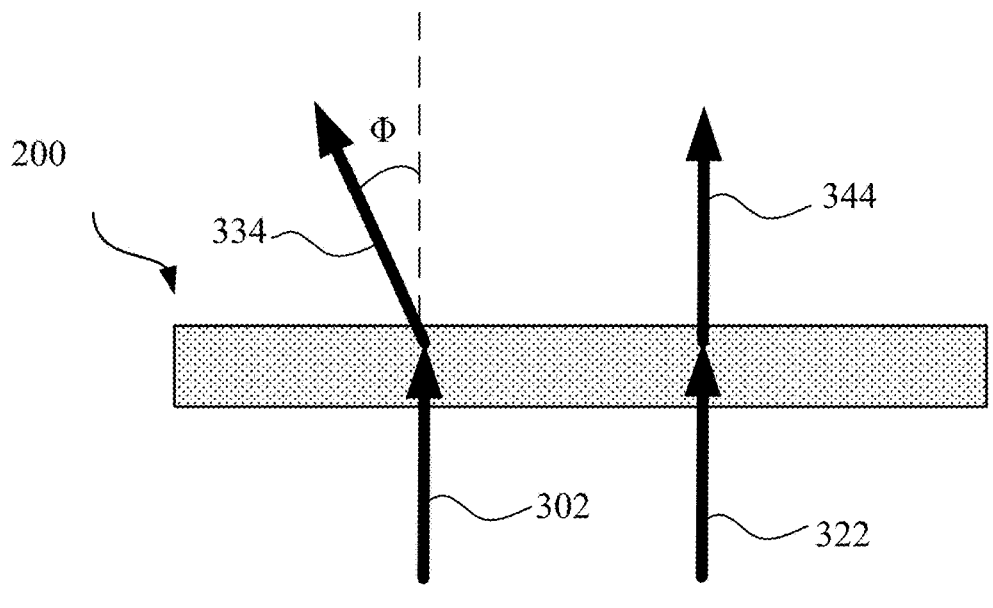
FIG. 3B illustrates polarization selective deflection of an input light by a transmissive BPLC polarization hologram element, according to an embodiment of the present disclosure.

FIG. 3B illustrates a polarization selective deflection of the BPLC polarization hologram element 200 shown in FIG. 2A functioning as a transmissive PVH element, according to an embodiment of the present disclosure. As show in FIG. 3B, for input lights having a wavelength range within the Bragg band, the BPLC polarization hologram element 200 may substantially forwardly deflect (e.g., via forward diffraction) a circularly polarized input light 302 having a predetermined handedness as a circularly polarized output light 334. A deflection angle $\phi$ (the angle of the light 334 with respect to a surface normal of the BPLC polarization hologram element 200) may be determined by various factors, such as the incidence wavelength, the in-plane pitch of the in-plane orientation pattern of the BPLCs, and the slant degree of the DTCs 260, etc. The BPLC polarization hologram element 200 may substantially transmit, with negligible deflection, a circularly polarized input light 322 having a handedness that is opposite to the predetermined handedness as a circularly polarized output light 344.

In some embodiments, when a voltage is applied to the BPLC layer 215, the local orientations of the LC molecules in the DTCs may be re-orientated, and/or the in-plane orientation pattern of the LC molecules within the film plane of the BPLC layer 215 may be changed. Accordingly, the optical response of the BPLC polarization hologram element 200 shown in FIG. 2A may be changed. For example, the deflection angle, the optical power, the phase shift, the reflection band, and/or the reflection wavelength, etc., of the BPLC polarization hologram element 200 may be adjustable through adjusting the voltage applied to the BPLC layer 215.

Figure 4A:
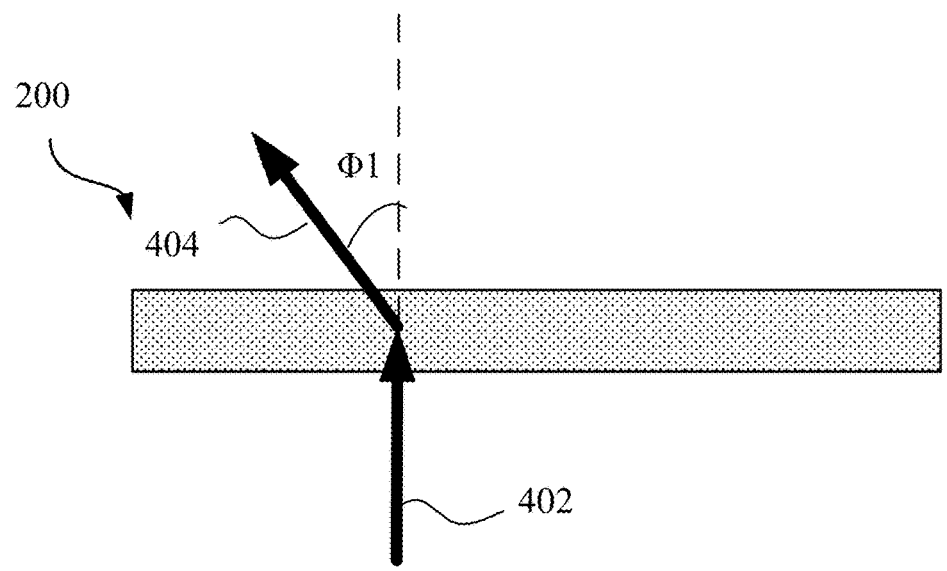
FIGS. 4A-4C illustrate an electrical tuning of a BPLC polarization hologram element, according to various embodiments of the present disclosure.
Figure 4B:
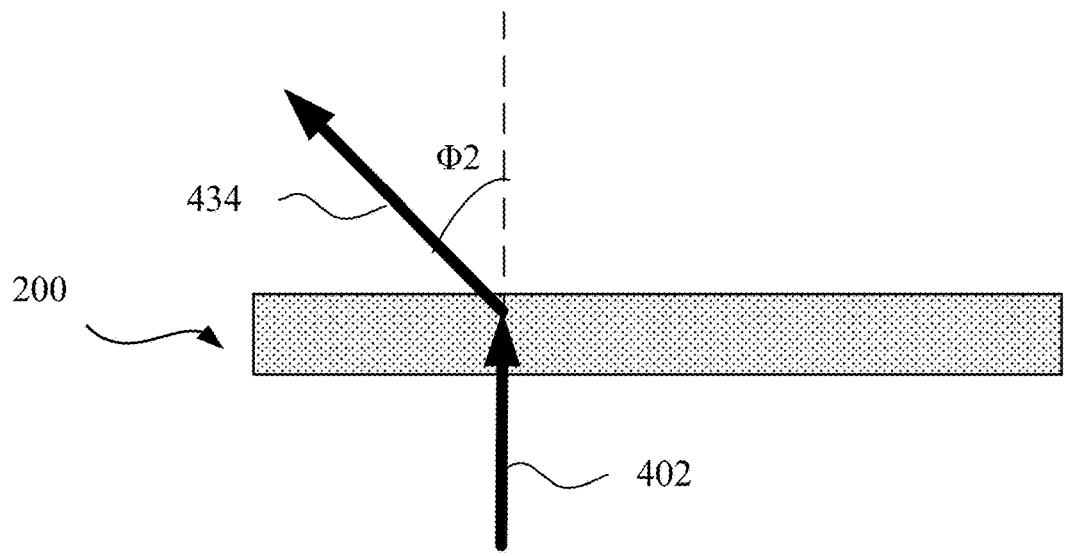

FIGS. 4A and 4B illustrates an electrical tuning of the BPLC polarization hologram element 200 shown in FIG. 2A, according to an embodiment of the present disclosure. For discussion purposes, FIGS. 4A and 4B show that the BPLC polarization hologram element 200 functions as a transmissive PVH element. As shown in FIG. 4A, at a voltage-off state (power source is not shown), the BPLC polarization hologram element 200 may substantially forwardly deflect (e.g., via forward diffraction) a circularly polarized input light 402 having a predetermined handedness as a circularly polarized output light 404, in a first deflection angle $\phi1$ (the angle of the light 404 with respect to a surface normal of the BPLC polarization hologram element 200). As shown in FIG. 4B, at a voltage-on state (power source is not shown), the BPLC polarization hologram element 200 may substantially forwardly deflect (e.g., via forward diffraction) the circularly polarized input light 402 having the predetermined handedness as a circularly polarized output light 434, in a second deflection angle $\phi2$ (the angle of the light 434 with respect to a surface normal of the BPLC polarization hologram element 200). For discussion purposes, FIGS. 4A and 4B show that as the applied voltage increases (here from voltage-off state to voltage-on state) the deflection angle of the BPLC polarization hologram element 200 may increase accordingly. Thus, the BPLC polarization hologram element 200 may function as or may be implemented into a beam steering device. After the voltage is removed, the BPLC polarization hologram element 200 may return to the initial state shown in FIG. 4A in a level of sub-milliseconds.

Figure 4C:
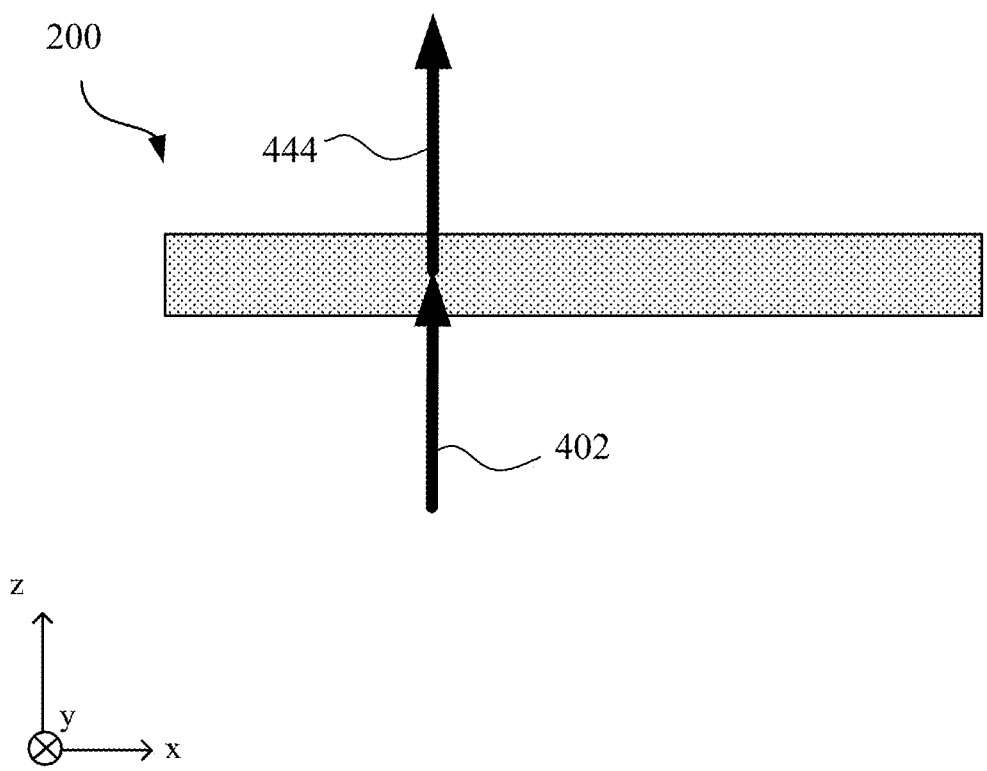

In some embodiments, when the voltage applied to the BPLC layer 215 is sufficiently high, the LC molecules may be substantially aligned in the electric field direction, and the DTCs may be unwound. In this case, as shown in FIG. 4C, the BPLC polarization hologram element 200 may not deflect the circularly polarized input light 402. Instead, the BPLC polarization hologram element 200 may transmit the circularly polarized input light 402 as a circularly polarized output light 444. In some embodiments, the polymer network in the BPLC layer 215 may be deformed. After the voltage is removed, the BPLC polarization hologram element 200 may return to the initial state shown in FIG. 4A in a few milliseconds or less.

FIGS. 5A-5D schematically illustrate processes for fabricating a BPLC polarization hologram element and a fabricated BPLC polarization hologram element, according to an embodiment of the present disclosure. The fabrication process shown in FIGS. 5A-5D may include holographic recording of an alignment pattern in a photo-aligning film, aligning a BPLC material by the photo-aligning film, and polymerizing the BPLC material. For illustrative purposes, the substrate and different layers, films, or structures formed thereon are shown as having flat surfaces. In some embodiments, the substrate and different layers or films or structures may have curved surfaces.

Figure 5A:
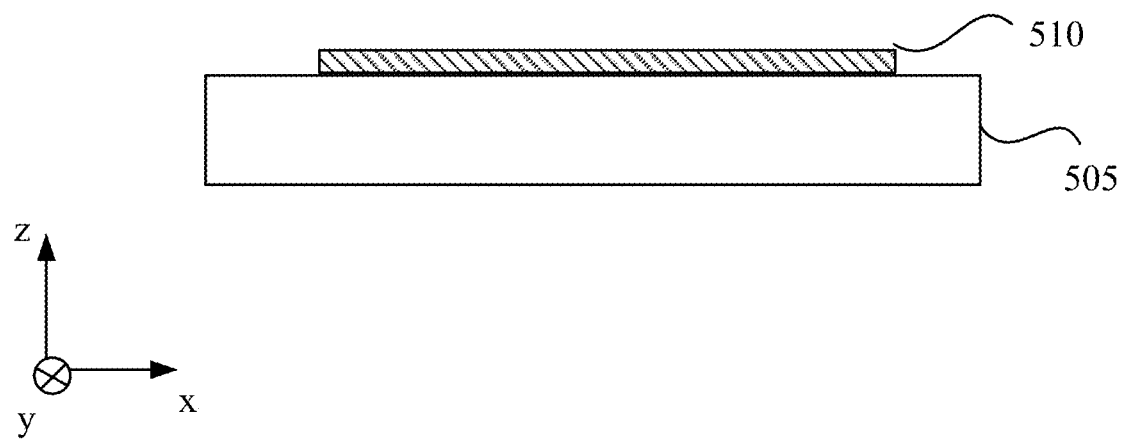
FIGS. 5A-5D schematically illustrate processes for fabricating a BPLC polarization hologram element and a fabricated BPLC polarization hologram element, according to an embodiment of the present disclosure.

As shown in FIG. 5A, a recording medium layer 510 may be formed on a surface (e.g., a top surface) of a substrate 505 by dispensing, e.g., coating or depositing, a polarization sensitive material on the surface. Thus, the recording medium layer 510 may be referred to as a polarization sensitive recording medium layer. The polarization sensitive material included in the recording medium layer 510 may be an optically recordable polarization sensitive material (e.g., a photo-alignment material) configured to have a photo-induced optical anisotropy when exposed to a polarized light irradiation. Molecules (or fragments) and/or photo-products of the optically recordable polarization sensitive material may be configured to generate an orientational ordering under the polarized light irradiation. In some embodiments, the polarization sensitive material may be dissolved in a solvent to form a solution. The solution may be dispensed on the substrate 505 using any suitable solution coating process, e.g., spin coating, slot coating, blade coating, spray coating, or jet (ink-jet) coating or printing. The solvent may be removed from the coated solution using a suitable process, e.g., drying, or heating, thereby leaving the polarization sensitive material on the substrate 505 to form the recording medium layer 510.

The substrate 505 may be similar to the substrate 205a or 205b shown in FIG. 2A. In some embodiments, the substrate 505 may be used to fabricate, store, or transport the fabricated BPLC polarization hologram element. In some embodiments, the substrate 505 may be detachable or removable from the fabricated BPLC polarization hologram element after the BPLC polarization hologram element is fabricated or transported to another place or device. That is, the substrate 505 may be used in fabrication, transportation, and/or storage to support the BPLC polarization hologram element provided on the substrate 505, and may be separated or removed from the BPLC polarization hologram element when the fabrication of the BPLC polarization hologram element is completed, or when the BPLC polarization hologram element is to be implemented in an optical device. In some embodiments, the substrate 505 may not be separated from the BPLC polarization hologram element.

Figure 5B:
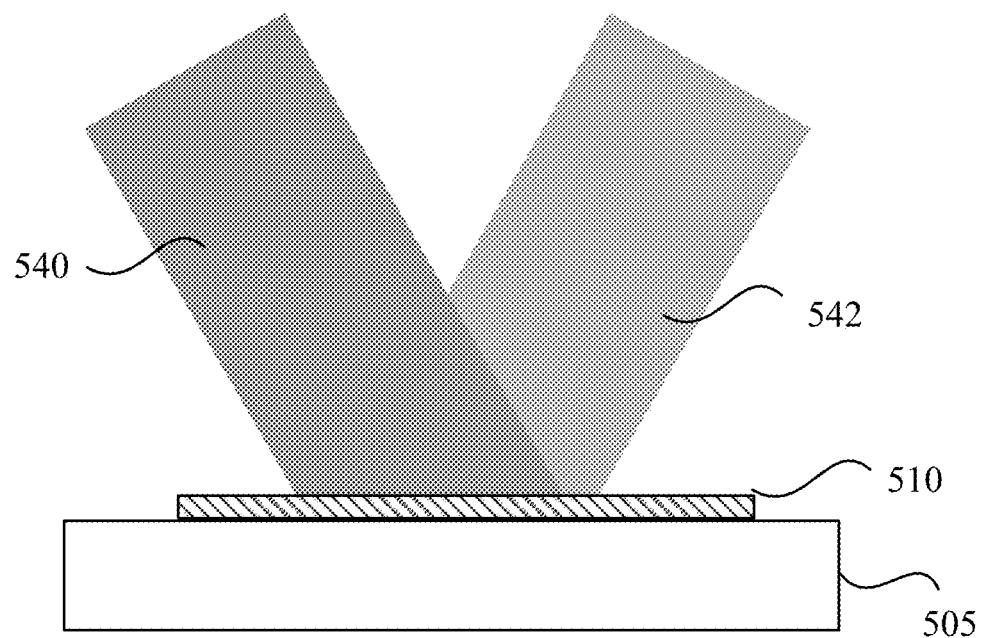

After the recording medium layer 510 is formed on the substrate 505, as shown in FIG. 5B, the recording medium layer 510 may be exposed to an irradiation to record a surface alignment pattern. For example, the recording medium layer 510 may be exposed to a linearly polarized light having a constant linear polarization direction, and a uniform surface alignment pattern may be recorded into the recording medium layer 510. For discussion purposes, FIG. 5B shows the process to record a spatially non-uniform surface alignment pattern into the recording medium layer 510, via exposure to a polarization interference pattern generated based on two recording beams 540 and 542. The polarization interference pattern may have a substantially uniform intensity and spatially varying orientations (or polarization directions) of linear polarizations. In some embodiments, as shown in FIG. 5B, the two recording beams 540 and 542 may be two coherent, circularly polarized beams with opposite handednesses, and may be incident onto the same surface of the recording medium layer 510. In some embodiments, the two recording beams 540 and 542 may be two coherent, circularly polarized beams with the same handedness, and may be incident onto the opposite surfaces of the recording medium layer 510.

The recording medium layer 510 may be optically patterned when exposed to the polarization interference pattern generated based on the two recording beams 540 and 542 during the polarization interference exposure process. An orientation pattern of an optic axis of the recording medium layer 510 in an exposed region may be defined by the polarization interference pattern to which the recording medium layer 510 is exposed. In some embodiments, different regions of the recording medium layer 510 may be exposed to the same or different polarization interference patterns. The same or different orientation patterns of the optic axis of the recording medium 510 may be defined in respective exposed regions during the respective polarization interference exposure processes.

In some embodiments, the recording medium layer 510 may include elongated anisotropic photo-sensitive units (e.g., small molecules or fragments of polymeric molecules). After being subject to a sufficient exposure of the polarization interference pattern generated based on the two recording beams 540 and 542, local alignment directions of the anisotropic photo-sensitive units may be induced in the recording medium layer 510 by the polarization interference pattern, resulting in an alignment pattern (or in-plane modulation) of an optic axis of the recording medium layer 510 due to a photo-alignment of the anisotropic photo-sensitive units. In some embodiments, multiple alignment patterns (which may be the same or different) may be recorded in different portions or regions of the recording medium layer 510 through multiple polarization interference exposure processes. After the recording medium layer 510 is optically patterned, the recording medium layer 510 may be referred to as a patterned recording medium layer with an alignment pattern, which may function as the alignment structure 210a or 210b shown in FIG. 2A.

Figure 5C:
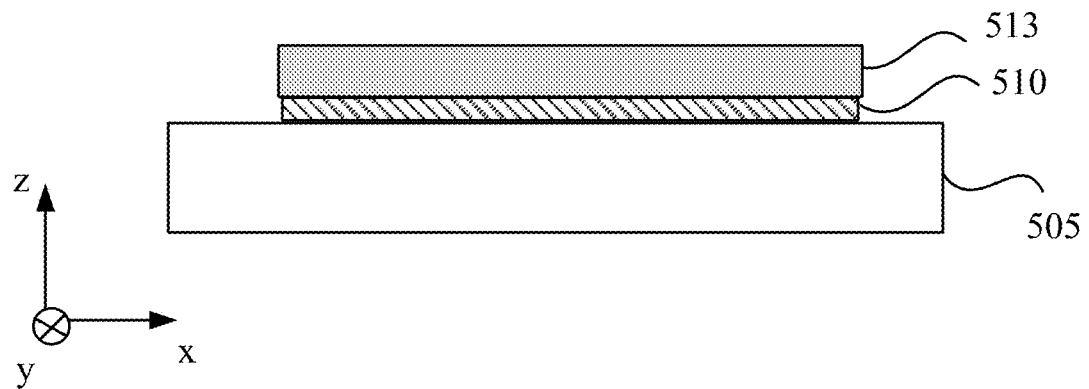

In some embodiments, as shown in FIG. 5C, a layer of a BPLC material 513 may be formed on the patterned recording medium layer 510 by dispensing, e.g., coating or depositing, the BPLC material 513 onto the patterned recording medium layer 510. The BPLC material 513 may include a BPLC mixture and monomers (e.g., reactive mesogens) doped into the BPLC mixture. In some embodiments, the BPLC mixture may include a nematic LC host of about 70-90 wt % and chiral dopants of about 5-10 wt %. In some embodiments, the monomers may include chiral reactive mesogens. In some embodiments, the BPLC material 513 may also include or be mixed with other ingredients, such as solvents, initiators (e.g., photo-initiators or thermal initiators), or surfactants, etc. In some embodiments, the BPLC material 513 may be dispensed onto the patterned recording medium layer 510 at a temperature at which the BPLC material 513 has the isotropic phase, and then may be cooled to a temperature at which the BPLC material 513 has BP II (phase transitioned from the isotropic phase to the blue phase II). For discussion purposes, the layer of the BPLC material 513 formed on the patterned recording medium layer 510 may also be referred to a BPLC material layer 513.

The patterned recording medium layer 510 may be configured to provide a surface alignment (e.g., planar alignment, or homeotropic alignment, etc.) to optically anisotropic molecules (e.g., LC molecules) in the BPLC material layer 513. For example, the patterned recording medium layer 510 may at least partially align the LC molecules in the BPLC material layer 513 that are in contact with the patterned recording medium layer 510 to form a grating pattern, or a lens pattern, etc. In other words, the LC molecules located within the film plane of the BPLC material layer 513 may be at least partially aligned along the local alignment directions of the anisotropic photo-sensitive units in the patterned recording medium layer 510 to form the grating pattern, or the lens pattern, etc. Thus, the surface alignment pattern recorded in the patterned recording medium layer 510 may be transferred to the LC molecules located within a film plane (e.g., in a plane in close proximity to or at a surface) of the BPLC material layer 513.

Figure 5D:
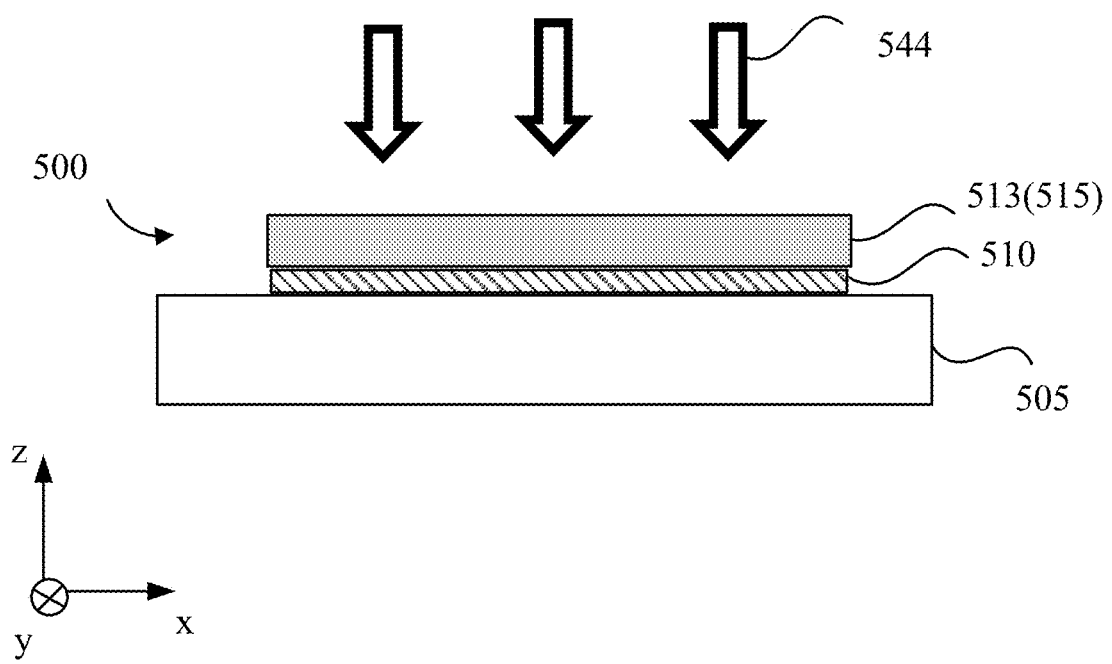

In some embodiments, as shown in FIG. 5D, the monomers in the BPLC material layer 513 may be polymerized, e.g., thermally polymerized or photo-polymerized. In some embodiments, as shown in FIG. 5D, the BPLC material layer 513 may be irradiated with, e.g., a UV light 544. Under a sufficient UV light irradiation, the monomers in the BPLC material layer 513 may be polymerized, stabilizing the orientations of the LC molecules. The defects in the DTCs in the BPLC material layer 513 may be reduced, and the DTCs in the BPLC material layer 513 may be stabilized. After the polymerization, a BPLC layer 515 (similar to the BPLC layer 215 shown in FIG. 2A) may be obtained. The BPLC layer 515 may include patterned, polymer-stabilized blue phase structures. The BPLC layer 515 may also be referred to as a polymerized BPLC layer 515. Thus, a BPLC polarization hologram element 500 may be obtained.

In some embodiments, the BPLC polarization hologram element 500 fabricated based on the fabrication processes shown in FIGS. 5A-5D may be a passive BPLC polarization hologram element, e.g., a passive PVH element, etc. The passive BPLC polarization hologram element 500 may be a transmissive or reflective BPLC polarization hologram element.

In some embodiments, as shown in FIG. 5D, the substrate 505 and/or the recording medium layer 510 may be used to fabricate, store, or transport the BPLC polarization hologram element 500. In some embodiments, the substrate 505 and/or the recording medium layer 510 may be detachable or removable from other portions of the BPLC polarization hologram element 500 after the other portions of the BPLC polarization hologram element 500 are fabricated or transported to another place or device. That is, the substrate 505 and/or the patterned recording medium layer 510 may be used in fabrication, transportation, and/or storage to support the BPLC material layer 513, and may be separated or removed from the BPLC material layer 513 when the fabrication of the BPLC polarization hologram element 500 is completed, or when the BPLC polarization hologram element 500 is to be implemented in an optical device. In some embodiments, the substrate 505 and/or the recording medium layer 510 may not be separated from the BPLC polarization hologram element 500.

Figure 6A:
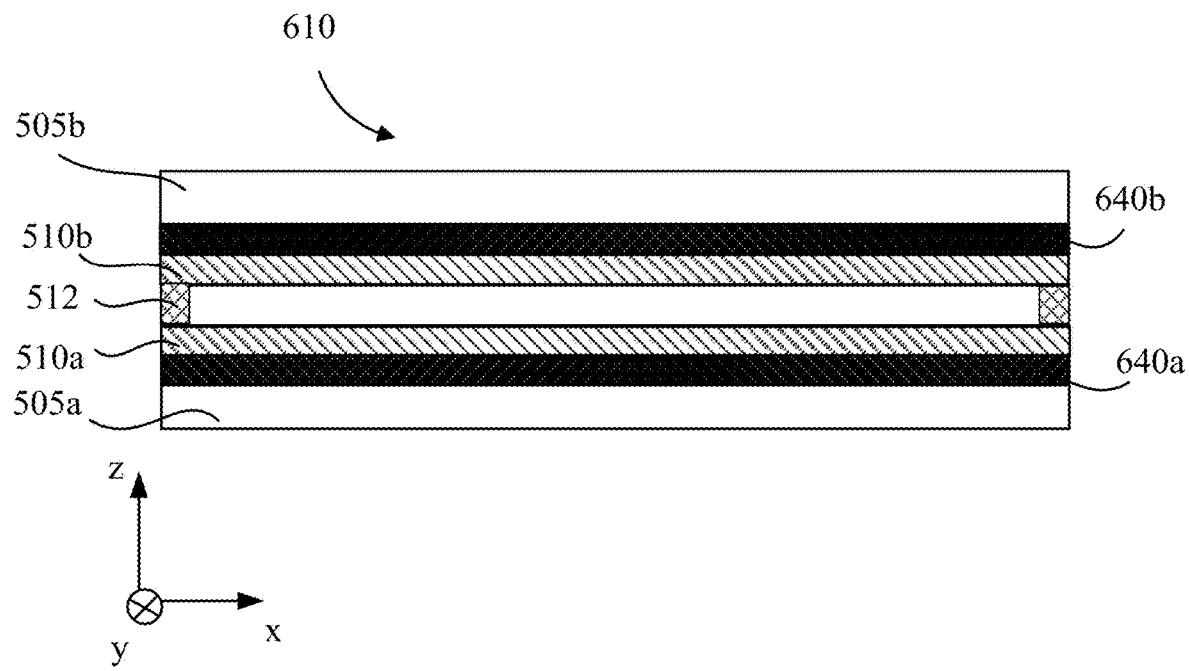
FIGS. 6A-6C schematically illustrate processes for fabricating a BPLC polarization hologram element and a fabricated BPLC polarization hologram element, according to an embodiment of the present disclosure.
Figure 6B:
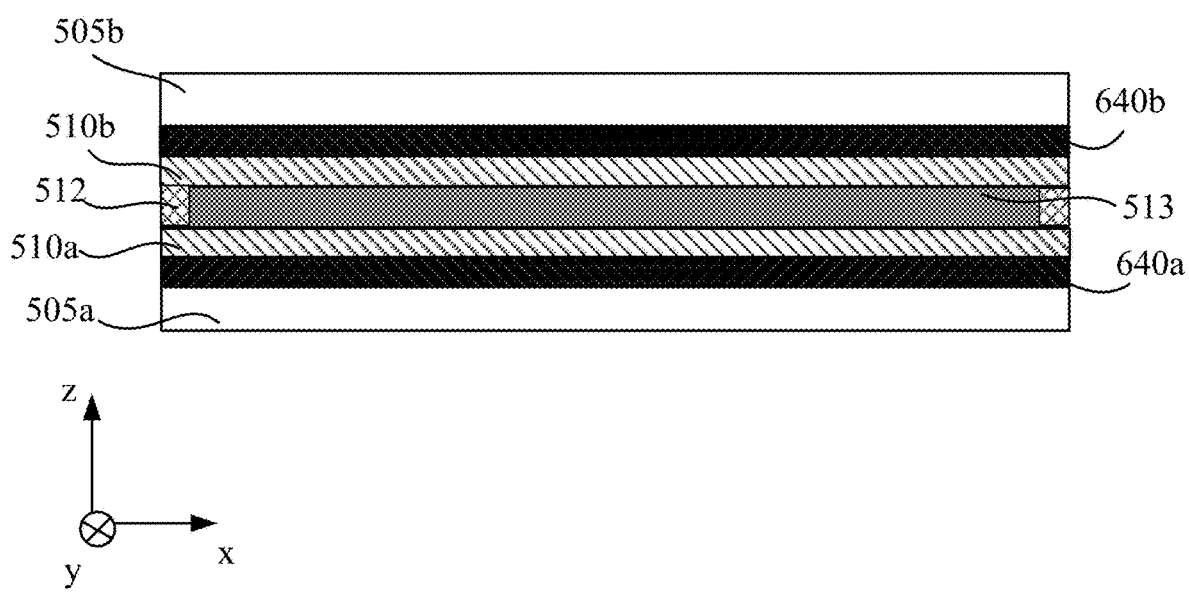
Figure 6C:
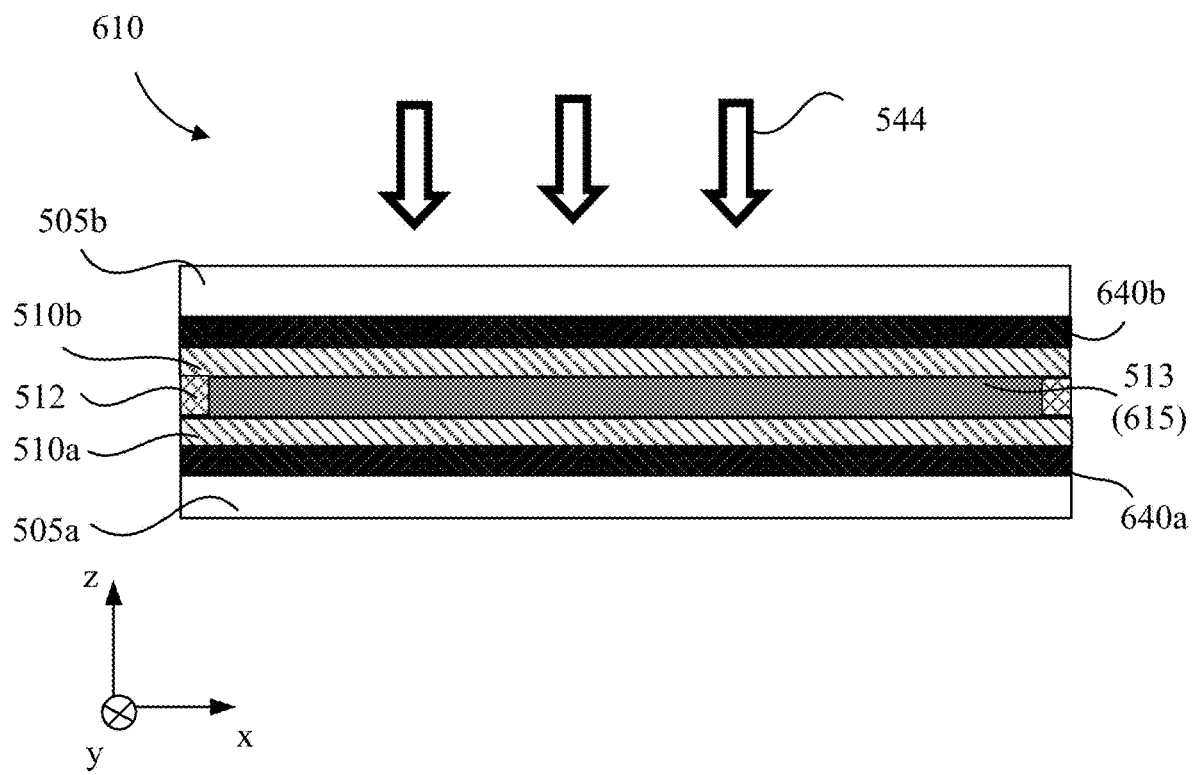

FIGS. 6A-6C schematically illustrate processes for fabricating a BPLC polarization hologram element 600, according to an embodiment of the present disclosure. The fabrication processes shown in FIGS. 6A-6C may include steps or processes similar to those shown in FIGS. 5A-5D. The BPLC polarization hologram element 600 fabricated based on the processes shown in FIGS. 6A-6C may include elements similar to those included in the BPLC polarization hologram element 500 fabricated based on the processes shown in FIGS. 5A-5D. Descriptions of the similar steps and similar elements can refer to the descriptions rendered above in connection with FIGS. 5A-5D.

The BPLC polarization hologram element 600 fabricated based on the fabrication processes shown in FIGS. 6A and 6B may be an active BPLC polarization hologram element, such as an active PVH element, etc. The active BPLC polarization hologram element 500 may be a transmissive or reflective BPLC polarization hologram element. Although the substrate and layers are shown as having flat surfaces, in some embodiments, the substrate and layers formed thereon may have curved surfaces.

As shown in FIG. 6A, two substrates, a first substrate 505a and a second substrate 505b, may be assembled to form an LC cell 610. For example, the two substrates 505a and 505b may be bonded to each other via an adhesive 512 (e.g., optical adhesive 512) to form the LC cell 610. At least one (e.g., each) of the two substrates 505a and 505b may be provided with one or more conductive electrode layers and a patterned recording medium layer. For example, two conductive electrode layers 640a and 640b may be formed at opposing surfaces of the substrates 505a and 505b, and two patterned recording medium layer 510a and 510b may be formed on opposing surfaces of the two conductive electrode layers 640a and 640b. The patterned recording medium layers 510a and 510b may be fabricated at the opposing surfaces of the conductive electrode layers 640a and 640b following steps or processes similar to those shown in FIGS. 5A and 5B. The conductive electrode layer 640a or 640b may be transmissive or reflective at least in the same spectrum band as the substrate 505a or 505b. The conductive electrode layer 640a or 640b may be a planar continuous electrode layer or a patterned electrode layer. As shown in FIG. 6A, a gap or space may exist between the patterned recording medium layers 510a and 510b.

After the LC cell 610 is assembled, as shown in FIG. 6B, the BPLC material may be filled into the LC cell 610, i.e., into the space formed between the patterned recording medium layers 510a and 510b, forming the BPLC material layer 513. The patterned recording medium layer 510a or 510b may function as a PAM layer for the BPLC material filled into the LC cell 610. The LC cell 610 filled with the BPLC material may be sealed via, e.g., the adhesive 512. In some embodiments, the BPLC material may be filled into the cell 600 at a temperature at which the BPLC material has the isotropic phase, and then may be cooled to a temperature at which the BPLC material has the BP II (phase transitioned from the isotropic phase to the blue phase II).

As shown in FIG. 6C, after the BPLC material 513 is filled into the cell 600, the BPLC material layer 513 may be polymerized, e.g., thermally polymerized or photo-polymerized. In some embodiments, as shown in FIG. 5D, the BPLC material layer 513 may be irradiated with, e.g., the UV light 544. Under a sufficient UV light irradiation, the monomers in the BPLC material layer 513 may be polymerized, stabilizing the orientations of the LC molecules. The defects in the DTCs in the BPLC material layer 513 may be reduced, and the DTCs in the BPLC material layer 513 may be stabilized. After the polymerization, a BPLC layer 615 (similar to the BPLC layer 215 shown in FIG. 2A) may be obtained. The BPLC layer 615 may include patterned, polymer-stabilized blue phase structures. The BPLC layer 615 may also be referred to as a polymerized BPLC layer 615. Thus, an active BPLC polarization hologram element 600 may be obtained. The active BPLC polarization hologram element 600 may be switchable by a voltage (power source not shown) applied to the conductive electrode layers 640a and 640b.

For illustrative purposes, FIGS. 6A-6C show that conductive electrode layers 640a and 640b may be disposed at the two substrates 505a and 505b. The conductive electrode layer (640a or 640b) may be disposed between the patterned recording medium layer (510a or 510b) and the substrate (505a or 505b). In the embodiment shown in FIGS. 6A-6C, each of the conductive electrode layers 640a and 640b may be a continuous planar electrode layer. A driving voltage (power source not shown) may be applied to the conductive electrode layers 640a and 640b to generate a vertical electric field to reorient the LC molecules, thereby switching the optical properties of the active BPLC polarization hologram element 610.

In some embodiments, the two conductive electrode layers 640a and 640b may be disposed at the same side of the BPLC layer 615. For example, one substrate 505b (e.g., an upper substrate) may not be provided with a conductive electrode layer, while the other substrate 505a (e.g., a lower substrate) may be provided with two conductive electrode layers with an electrically insulating layer disposed therebetween. In other words, the two conductive electrode layers may be disposed at the same side of the BPLC layer 615. The two conductive electrode layers may include a continuous planar electrode layer and a patterned electrode layer. The patterned electrode layer may include a plurality of striped electrodes arranged in parallel in an interleaved manner. A voltage may be applied between the continuous planar electrode layer and the patterned electrode layer disposed at the same side of the BPLC layer 615 to generate a horizontal electric field to reorient the LC molecules, thereby switching the optical properties of the fabricated active BPLC polarization hologram element.

In some embodiments, one substrate 505b (e.g., an upper substrate) may not be provided with a conductive electrode layer, while the other substrate 505a (e.g., a lower substrate) may be provide with a conductive electrode layer. The conductive electrode layer may include interdigitated electrodes, which may include two individually addressable comb-like microelectrode array strips. A voltage may be applied between the comb-like microelectrode array strips to generate a horizontal electric field to reorient the LC molecules in the BPLC layer 615.

The BPLC polarization hologram element disclosed herein may have a wide viewing angle, a reduced light leakage for an input light at a large incident angle, tunable or switchable optical responses, and a fast switching speed (e.g., 1 ms or less). The BPLC polarization hologram elements described herein may be implemented in systems or devices for imaging, sensing, communication, biomedical applications, etc. For example, the BPLC polarization hologram elements described herein may be implemented in various systems for augmented reality ("AR"), virtual reality ("VR"), and/or mixed reality ("MR") applications, e.g., near-eye displays ("NEDs"), head-up displays ("HUDs"), head-mounted displays ("HMDs"), smart phones, laptops, televisions, vehicles, etc. For example, the disclosed BPLC polarization hologram element may be implemented as a passive or active reflective polarizer in a path-folding lens assembly (e.g., a pancake lens assembly), implemented as a light guide image combiner in a light guide display assembly, implemented as an input or output coupler (or in-coupling element or out-coupling element) in a light guide illumination assembly, or implemented as a retinal projection combiner in a retinal projection display assembly, etc. The disclosed BPLC polarization hologram element may also be used to provide multiple image planes, pupil steered AR, VR, and/or MR display systems (e.g., holographic near eye displays, retinal projection eyewear, and wedged waveguide displays), smart glasses for AR, VR, and/or MR applications, compact illumination optics for projectors, light-field displays, etc.

Figure 7A:
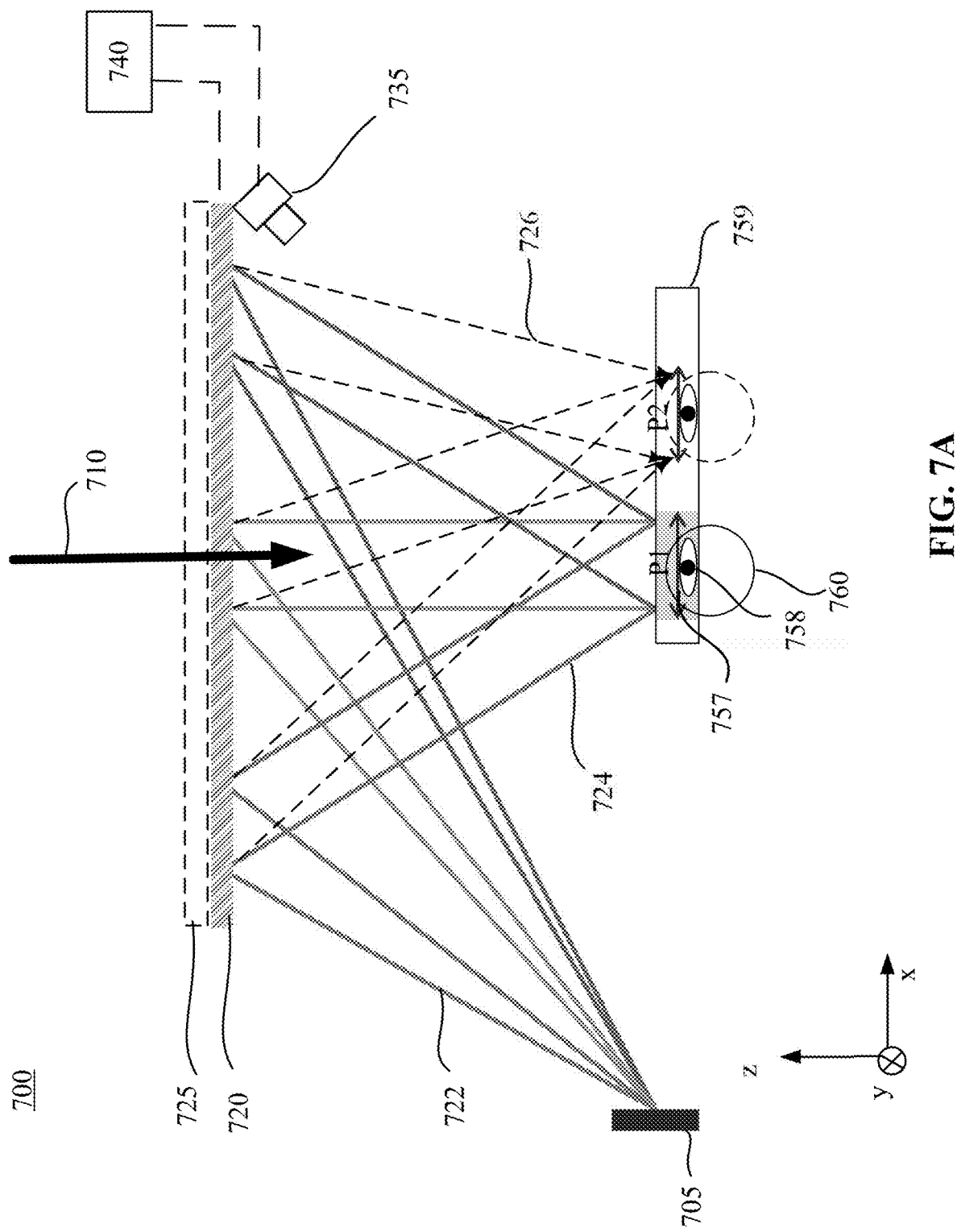
FIG. 7A schematically illustrates a system including one or more BPLC polarization hologram elements, according to an embodiment of the present disclosure.

Exemplary applications of the disclosed BPLC polarization holograms in AR, VR, and/or MR systems will be explained. The various systems including one or more disclosed BPLC polarization holograms may be a part of a system for VR, AR, and/or MR applications (e.g., an NED, an HUD, an HMD, a smart phone, a laptop, or a television, etc.). FIG. 7A schematically illustrates an x-y sectional view of a system 700, according to an embodiment of the present disclosure. As shown in FIG. 7A, the system 700 may include a display element 705 configured to generate an image light (or beam) 722 representing a virtual image, and an off-axis combiner 720 configured to direct the image light 722 toward an eyebox 759 of the system 700. The system 700 may further include an eye tracking device 735 and a controller 740. The controller 740 may be communicatively coupled with one or more devices in the system 700, such as the display element 705, the eye tracking device 735, and the off-axis combiner 720. The controller 740 may receive signals from the one or more devices, and may control the operations of the one or more devices.

In some embodiments, the display element 705 may include a projector (e.g., retinal projection display) configured to output the image light 722. In some embodiments, the display element 705 may be an off-axis display element configured to provide an off-axis projection with respective to the off-axis combiner 720. For example, the image light 722 may be an off-axis light with respective to the off-axis combiner 720.

In some embodiments, the off-axis combiner 720 may include one or more BPLC polarization hologram elements disclosed herein, such as the BPLC polarization hologram element 200 shown in FIG. 2A. In some embodiments, the off-axis combiner 720 may function as an off-axis reflective lens configured to focus the off-axis image light 722 to one or more spots at one or more exit pupils 757 within the eyebox 759 of the system 700. An exit pupil 757 may be a portion of the eyebox 759, where an eye pupil 758 of a user may be positioned to receive the image light. The size of a single exit pupil 757 may be larger than and comparable with the size of the eye pupil 758. The exit pupils 757 may be sufficiently spaced apart, such that when one of the exit pupils 757 substantially coincides with the position of the eye pupil 758, the remaining one or more exit pupils 757 may be located beyond the position of the eye pupil 758 (e.g., outside of the eye pupil 758). For example, as shown in FIG. 7A, the off-axis combiner 720 may focus the off-axis image light 722 as an image light 722 propagate through one or more exit pupils 757 at the eyebox 759.

When configured for AR or MR applications, the off-axis combiner 720 may also combine the image light 722 received from the display element 705 and a light (or beam) 710 from a real-world environment (referred to as a real-world light 710), and direct both of the lights 710 and 722 toward the eyebox 759. Thus, the off-axis combiner 720 may also be referred to as an off-axis image combiner. In some embodiments, the system 700 may include a compensator 725 coupled with (e.g., stacked with) the off-axis combiner 720. The off-axis combiner 720 may be disposed between the compensator 725 and the eyebox 759. The real-world light 710 may be incident onto the compensator 725 before being incident onto the off-axis combiner 720. In some embodiments, the controller 740 may be configured to control the compensator 725 and the off-axis combiner 720 to provide opposite steering effects and lensing effects to the real-world light 710. For example, when the optical powers provided by the compensator 725 and the off-axis combiner 720 may have opposite signs and a substantially same absolute value, the steering provided by the compensator 725 and the off-axis combiner 720 may have opposite directions. Thus, the compensator 725 may compensate for the distortion of the real-world light 710 caused by the off-axis combiner 720, such that images of real-world objects viewed through the system 700 may be substantially unaltered. In some embodiments, the compensator 725 may include a BPLC polarization hologram element disclosed herein, such as a disclosed BPLC polarization hologram element functioning as a transmissive PVH lens. In some embodiments, when the system 700 is configured for VR applications, the compensator 725 may be omitted.

In some embodiments, the off-axis combiner 720 may be a passive element that is not tunable by an external field. In some embodiments, the off-axis combiner 720 may be an active element that is tunable by an external field. For example, the optical power of the off-axis combiner 720 may be tunable by an applied voltage. In some embodiments, the BPLC layer included in the off-axis combiner 720 may include a plurality of sub-layers stacked together. The plurality of sub-layers may be configured to have high diffraction efficiencies at a plurality of wavelengths, (e.g., red, green, and blue wavelength ranges), thereby enabling a full color display. For example, the off-axis image light 722 may be a visible polychromatic light, and the respective sub-layers may be configured to focus the respective portions of the off-axis image light 722 associated with different wavelength ranges to the same exit pupil 757.

In some embodiments, the BPLC layer included in the off-axis combiner 720 may include a plurality of sub-layers stacked together, and different sub-layers may be configured to reflect and focus the off-axis image light 722 to propagate through different exit pupils 757. That is, different sub-layers may be configured to steer the off-axis image light 722 by different steering angles to propagate through different exit pupils 757. In some embodiments, the plurality of sub-layers may function as passive elements, each of which may be configured to simultaneously reflect and focus the off-axis image light 722 to propagate through one of the exit pupils 757 with a relatively low efficiency. The plurality of sub-layers may be configured to simultaneously reflect and focus the off-axis image light 722 to propagate through a plurality of exit pupils 757 forming the eyebox 759. For discussion purposes, each exit pupil 757 may also referred to as a sub-eye box, and the eyebox 759 formed by the plurality of exit pupils 757 may also be referred to as an uncompressed eyebox, which is relatively large.

In some embodiments, the plurality of sub-layers may function as active elements, each of which may be configured to operate in an active state to reflect the off-axis image light 722 to an exit-pupil 757 with a relatively high efficiency, and operate in an non-active state to transmit the off-axis image light 722. In some embodiments, one or more (not all) of the sub-layers may be configured to operate in the active state to focus the off-axis image light 722 to propagate through one or more exit pupils 757 (or one or more sub-eye boxes), forming a compressed eyebox having a size smaller than a size of the uncompressed eyebox. The remaining sub-layers may operate in the non-active state to transmit the off-axis image light 722. In some embodiments, the controller 740 may be communicatively coupled with one or more power sources (not shown) to adjust the voltages applied to the respective sub-layers included in the off-axis combiner 720.

In some embodiments, the eye tracking device 735 may include one or more light sources (e.g., infrared light sources) and one or more optical sensors. The one or more light sources may be configured to emit IR lights to illuminate one or both eyes of the user, and the optical sensors may be configured to receive the IR light reflected from the eyes. In some embodiments, the optical sensors may be configured to generate image data of one or both eyes of the user based on the received IR lights. For example, the optical sensors may be imaging devices, such as cameras. In some embodiments, a processor included in the eye tracking device 735 may be configured to obtain, in real time, the eye-tracking information relating to the eye pupil 758 by analyzing the captured images of the eye pupil 758.

The eye-tracking information may include at least one of a position (or location), a moving direction, a size, or a viewing direction of the eye pupil 758. The position, moving direction, size, or viewing direction of the eye pupil 758 may be dynamically changing. Thus, the eye tracking device 735 may dynamically capture the images of the eye pupil 758 and dynamically obtain and/or provide the eye-tracking information in real time. In some embodiments, the eye tracking device 735 may measure or determine (e.g., through the processor) the position and/or movement of the eye pupil 758 up to six degrees of freedom (i.e., 3D position, roll, pitch, and yaw).

In some embodiments, the eye tracking device 735 may transmit, through a transmitter included in the eye tracking device 735, the eye-tracking information to the controller 740. In some embodiments, the eye tracking device 735 may transmit the images (i.e., image data) of the eye pupil 758 to the controller 740, and the controller 740 may analyze the images to obtain the eye-tracking information in real time. In some embodiments, the controller 740 may determine, based on one or more types of the eye-tracking information (e.g., based on the position of the eye pupil 758), the operation state of the off-axis combiner 720, such as, the operation states of the active sub-layers included in the off-axis combiner 720.

According to the eye-tracking information, the off-axis combiner 720 may provide different steering angles to the off-axis image light 722 to focus the off-axis image light 722 to propagate through different exit pupils 757. In other words, the off-axis combiner 720 may function as a pupil steering element that provide a pupil steering function. For example, during an operation, based on the eye-tracking information, the controller 740 may control one or more of the sub-layers included in the off-axis combiner 720 to operate in the active state, and the remaining sub-layers to operate in the non-active state. For illustrative purposes, FIG. 7A shows two operation states of the off-axis combiner 720. For example, at a first time instance, the eye tracking device 735 may detect that the eye pupil 758 of the user is located at a position P1 at the eyebox 759. Based on the eye-tracking information, the controller 740 may control a first sub-layer in the off-axis combiner 720 to operate in the active state while the remaining sub-layers to operate in the non-active state. The first sub-layer may reflect and focus the off-axis image light 722 as an image light 724, which propagates through to an exit pupil 757 (e.g., a first sub-eye box) that substantially coincides with the position P1 of the eye pupil 758.

At a second time instance, the eye tracking device 735 may detect that the eye pupil 758 of the user has moved to a new position P2 at the eyebox 759 in the x-axis direction from the previous position P1. Based on new eye-tracking information relating to the new position P2, the controller 740 may control a second, different sub-layer in the off-axis combiner 720 to operate in the active state while the remaining sub-layers to operate in the non-active state. The second sub-layer may reflect and focus the off-axis image light 722 as an image light 726 (represented by dashed lines), which propagates through an exit pupil 757 (e.g., a second sub-eye box) that substantially coincides with the position P2 of the eye pupil 758.

For discussion purposes, FIG. 7A shows that the off-axis combiner 720 provides a 1D pupil steering, e.g., steering the exit pupil 757 in the x-axis direction shown in FIG. 7A. In some embodiments, although not shown, the off-axis combiner 720 may provide a 2D pupil steering, e.g., steering the exit pupil 757 in two different directions (e.g., the x-axis direction and the y-axis direction shown in FIG. 7A). In some embodiments, although not shown, the off-axis combiner 720 may provide a 3D pupil steering, e.g., steering the exit pupil 757 in three different directions (e.g., the x-axis direction, the y-axis direction, and the z-axis direction shown in FIG. 7A). For example, the off-axis combiner 720 may include three BPLC layers configured to steer the exit pupil 757 in the x-axis direction, the y-axis direction, and the z-axis direction, respectively.

Figure 7B:
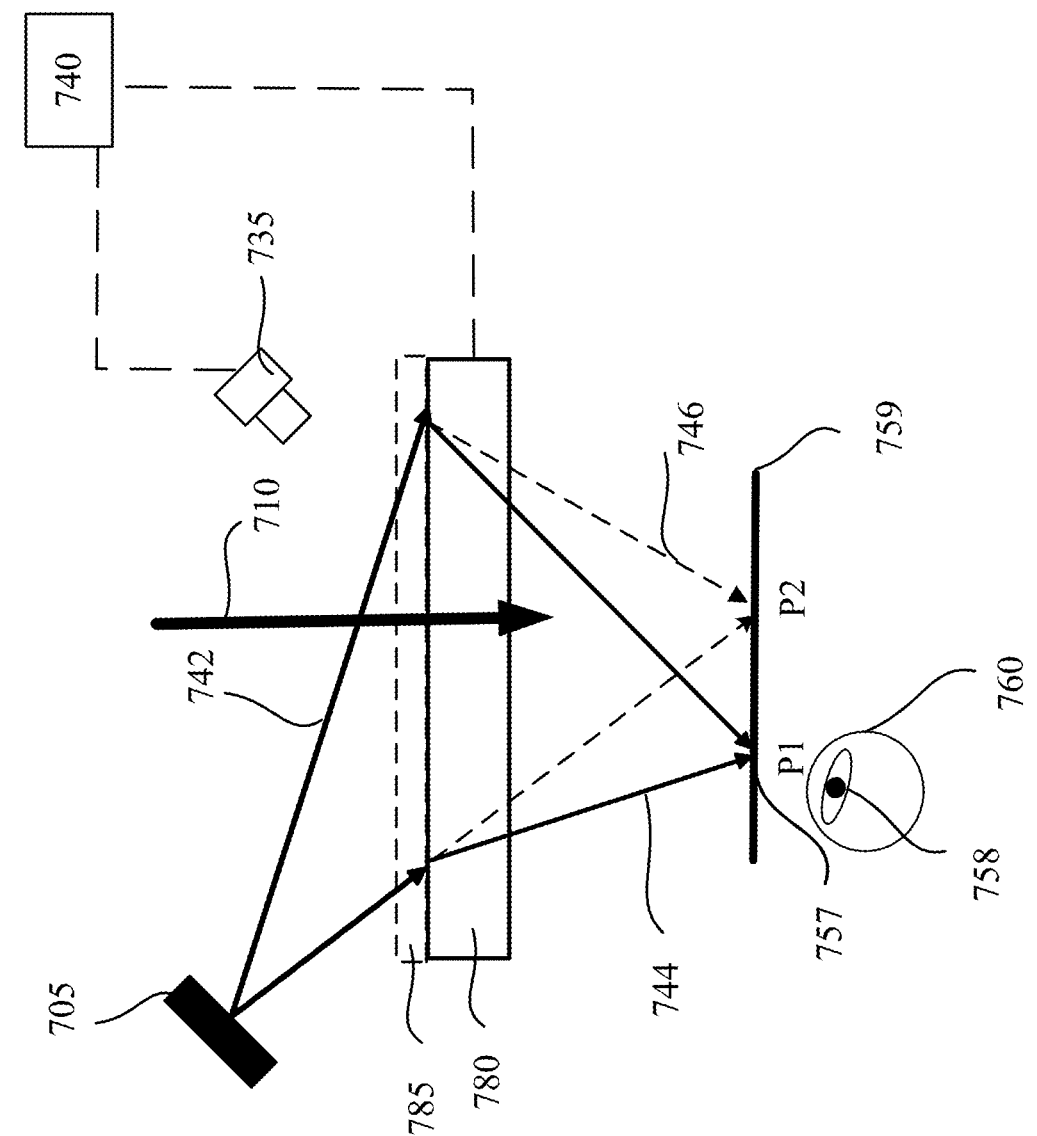
FIG. 7B schematically illustrates a system including one or more BPLC polarization hologram elements, according to an embodiment of the present disclosure.

FIG. 7B schematically illustrates an x-y sectional view of an optical system 750, according to an embodiment of the present disclosure. The system 750 may include elements that are similar to or the same as those included in the system 700 shown in FIG. 7A. Descriptions of the same or similar elements or features can refer to the above corresponding descriptions, including those rendered in connection with FIG. 7A. As shown in FIG. 7B, the optical system 750 may include the display element 705 and an off-axis combiner 780. The optical system 750 may further include the eye tracking device 735 and the controller 740.

In some embodiments, the display element 705 may be configured to provide an off-axis projection with respective to the off-axis combiner 780, e.g., an image light 742 output by the display element 705 may be an off-axis light with respective to the off-axis combiner 780. The off-axis combiner 780 may be similar to the off-axis combiner 720 shown in FIG. 7A, but may be configured to operate in a transmissive mode, while the off-axis combiner 720 shown in FIG. 7A may be configured to operate in a reflective mode. In some embodiments, the off-axis combiner 780 may function as an off-axis transmissive lens configured to focus the off-axis image light 722 to one or more spots at one or more exit pupils 757 within the eyebox 759 of the optical system 750. In some embodiments, the off-axis combiner 780 may include one or more BPLC polarization hologram elements disclosed herein, such as a disclosed BPLC polarization hologram that functions as a transmissive PVH element, e.g., a transmissive PVH lens.

When configured for AR or MR applications, the off-axis combiner 780 may also combine the image light 742 received from the display element 705 and the real-world light 710, and direct both lights 710 and 742 toward the eyebox 759. Thus, the off-axis combiner 780 may also be referred to as an off-axis image combiner. In some embodiments, the optical system 750 may include a compensator 785 coupled with the off-axis combiner 780. The off-axis combiner 780 may be disposed between the compensator 785 and the eyebox 759. The controller 740 may be configured to control the compensator 785 and the off-axis combiner 780 to provide opposite steering effects and lensing effects to the real-world light 710. For example, when the optical powers provided by the compensator 785 and the off-axis combiner 780 may have opposite signs and a substantially same absolute value, the steering provided by the compensator 785 and the off-axis combiner 780 may have opposite directions. Thus, the compensator 785 may compensate for the distortion of the real-world light 710 caused by the off-axis combiner 780, such that images of real-world objects viewed through the optical system 750 may be substantially unaltered. In some embodiments, the compensator 785 may include a BPLC polarization hologram element disclosed herein, such as a disclosed BPLC polarization hologram element functioning as a transmissive PVH lens. In some embodiments, when the optical system 750 is configured for VR applications, the compensator 785 may be omitted.

In some embodiments, the off-axis combiner 780 may be a passive element that is not tunable by an external field. In some embodiments, the off-axis combiner 780 may be an active element that is tunable by an external field. For example, the optical power of the off-axis combiner 780 may be tunable by an applied voltage. In some embodiments, the BPLC layer included in the off-axis combiner 780 may include a plurality of sub-layers stacked together. The plurality of sub-layers may be configured to have high diffraction efficiencies at a plurality of wavelengths, (e.g., red, green, and blue wavelength ranges), thereby enabling a full color display. For example, the off-axis image light 742 may be a visible polychromatic light, and the respective sub-layers may be configured to focus the respective portions of the off-axis image light 742 associated with different wavelength ranges to the same exit pupil 757.

In some embodiments, the BPLC layer included in the off-axis combiner 780 may include a plurality of sub-layers stacked together, and different sub-layers may be configured to transmit and focus the off-axis image light 742 to propagate through different exit pupils 757. That is, different sub-layers may be configured to steer the off-axis image light 742 by different steering angles to propagate through different exit pupils 757. In some embodiments, the plurality of sub-layers may function as passive elements, each of which may be configured to simultaneously transmit and focus the off-axis image light 742 to propagate through an exit pupil 757 with a relatively low efficiency. The plurality of sub-layers may be configured to simultaneously transmit and focus the off-axis image light 742 to propagate through the plurality of exit pupils 757 forming the eyebox 759.

In some embodiments, the plurality of sub-layers may function as active elements, each of which may be configured to operate in an active state to reflect the off-axis image light 742 to an exit-pupil 757 with a relatively high efficiency, and operate in an non-active state to transmit the off-axis image light 742. In some embodiments, one or more (not all) of the sub-layers may be configured to operate in the active state to focus the off-axis image light 742 to propagate through one or more exit pupils 757 (or one or more sub-eye boxes), forming a compressed eyebox having a size smaller than a size of the uncompressed eyebox. The remaining sub-layers may operate in the non-active state to transmit the off-axis image light 742. In some embodiments, the controller 740 may be communicatively coupled with one or more power sources (not shown) to adjust the voltages applied to the respective sub-layers included in the off-axis combiner 780.

In some embodiments, according to the eye-tracking information, the off-axis combiner 780 may provide different steering angles to the off-axis image light 742 to focus the off-axis image light 742 to propagate through different exit pupils 757. In other words, the off-axis combiner 780 may function as a pupil steering element to provide a pupil steering function. For example, during an operation, based on the eye-tracking information, the controller 740 may control one or more of the sub-layers included in the off-axis combiner 780 to operate in the active state, and the remaining sub-layers to operate in the non-active state. For illustrative purposes, FIG. 7B shows two operation states of the off-axis combiner 780. For example, at a first time instance, the eye tracking device 735 may detect that the eye pupil 758 of the user is located at a position P1 at the eyebox 759. Based on the eye-tracking information, the controller 740 may control a first sub-layer in the off-axis combiner 780 to operate in the active state while the remaining sub-layers to operate in the non-active state. The first sub-layer may focus the off-axis image light 742 as the image light 724, which propagates through to an exit pupil 757 (e.g., a first sub-eye box) that substantially coincides with the position P1 of the eye pupil 758.

At a second time instance, the eye tracking device 735 may detect that the eye pupil 758 of the user has moved to a new position P2 at the eyebox 759 in the x-axis direction from the previous position P1. Based on new eye-tracking information relating to the new position P2, the controller 740 may control a second, different sub-layer in the off-axis combiner 780 to operate in the active state while the remaining sub-layers to operate in the non-active state. The second sub-layer may focus the off-axis image light 742 as an image light 746 (represented by dashed lines), which propagates through an exit pupil 757 (e.g., a second sub-eye box) that substantially coincides with the position P2 of the eye pupil 758.

For discussion purposes, FIG. 7B shows that the off-axis combiner 780 provides a 1D pupil steering, e.g., steering the exit pupil 757 in the x-axis direction shown in FIG. 7B. In some embodiments, although not shown, the off-axis combiner 780 may provide a 2D pupil steering, e.g., steering the exit pupil 757 in two different directions (e.g., the x-axis direction and the y-axis direction shown in FIG. 7B). In some embodiments, although not shown, the off-axis combiner 780 may provide a 3D pupil steering, e.g., steering the exit pupil 757 in three different directions (e.g., the x-axis direction, the y-axis direction, and the z-axis direction shown in FIG. 7). For example, the off-axis combiner 780 may include three BPLC layers configured to steer the exit pupil 757 in the x-axis direction, the y-axis direction, and the z-axis direction, respectively.

Figure 8A:
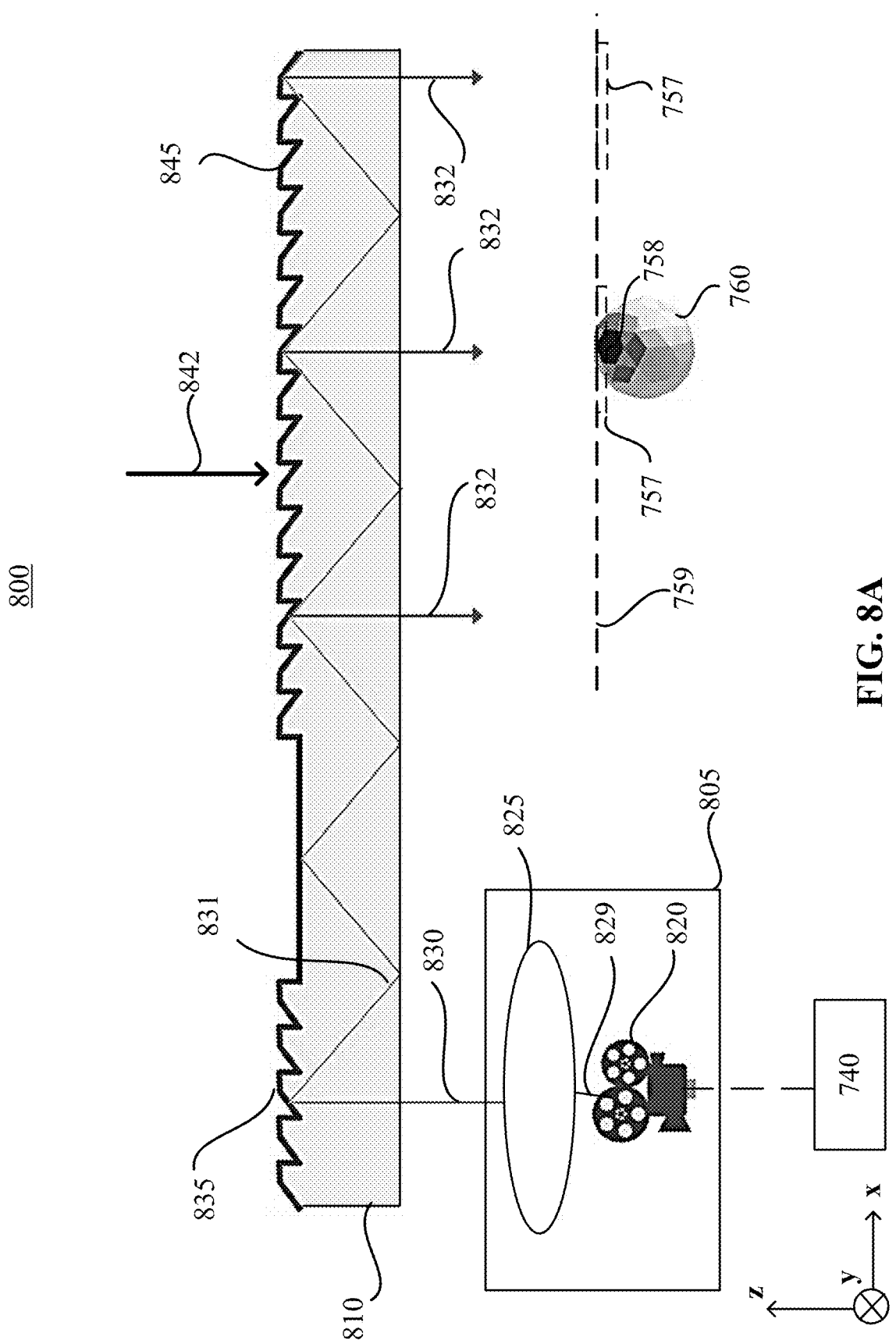
FIG. 8A schematically illustrates a system including one or more BPLC polarization hologram elements, according to an embodiment of the present disclosure.

FIG. 8A schematically illustrates a diagram of a system 800, according to an embodiment of the present disclosure. The system 800 may also be referred to as a light guide display system or assembly. As shown in FIG. 8A, the system 800 may include a light source assembly 805 that includes a display element (e.g., a display panel) 820 and a collimating lens 825, a light guide 810 coupled with an in-coupling element (or input coupler) 835 and an out-coupling element (or output coupler) 845, and the controller 740. The light guide 810 coupled with the in-coupling element 835 and the out-coupling element 845 may also be referred to as a light guide image combiner.

The display panel 820 may output an image light 829 representing a virtual image (having a predetermined image size associated with a linear size of the display panel 820) toward the collimating lens 825. The image light 829 may be a divergent image light including a bundle of rays. For illustrative purposes, FIG. 8A shows a single ray of the image light 829. The collimating lens 825 may transmit the image light 829 as an image light 830 having a predetermined input FOV (e.g., α) toward an input side of the light guide 810. The collimating lens 825 may transform or convert a linear distribution of the pixels in the virtual image formed by the image light 829 into an angular distribution of the pixels in the image light 830 having the predetermined input FOV. Each ray in the in the image light 830 may represent an FOV direction of the input FOV. For illustrative purposes, FIG. 8A shows a single ray (e.g., central ray) of the image light 830 that is normally incident onto the in-coupling element 835, and the single ray of the image light 830 may represent a single FOV direction (e.g., 0° FOV direction) of the input FOV.

The in-coupling element 835 may couple the image light 830 into the light guide 810 as an in-coupled image light 831, which may propagate inside the light guide 810 toward the out-coupling element 845 via total internal reflection ("TIR"). The out-coupling element 845 may couple the in-coupled image light 831 out of the light guide 810 as a plurality of output image lights 832 at different locations along the longitudinal direction (e.g., x-axis direction) of the light guide 810, each of which may have an output FOV that may be substantially the same as the input FOV (e.g., as represented by an angle α). For discussion purposes, FIG. 8A shows three output image lights 832, and shows a single ray (e.g., central ray) of each output image light 832. At least one of the in-coupling element 835 or the out-coupling element 845 may include a BPLC polarization hologram element disclosed herein, such as the BPLC polarization hologram element 200 shown in FIG. 2A. In some embodiments, the BPLC polarization hologram element may be configured to function as a grating that couples the image light into the light guide 810 or out of the light guide 810 via diffraction.

Each output image light 832 may include the same image content as the virtual image displayed on the display panel 820. Thus, the light guide 810 coupled with the in-coupling element 835 and the out-coupling element 845 may replicate the image light 830 at the output side of the light guide 810, to expand an effective pupil of the system 800. For discussion purposes, FIG. 8A shows a one-dimensional pupil expansion along the x-axis direction in FIG. 8A. In some embodiments, the system 800 may also provide a two-dimensional pupil expansion, e.g., along both the x-axis direction and the y-axis direction in FIG. 8A. For example, in some embodiments, although not shown, the system 800 may also include a redirecting element (or folding element) coupled to the light guide 810, and configured to redirect the in-coupled image light 831 to the out-coupling element 845. The redirecting element may be configured to expand the input image light 830 in a first direction, e.g., the y-axis direction, and the out-coupling element 845 may be configured to expand the input image light 830) in a second, different direction, e.g., the x-axis direction. In some embodiments, the redirecting element may include a BPLC polarization hologram element functioning as a grating that redirects the in-coupled image light 831 to the out-coupling element 845.

The plurality of image lights 832 may propagate through the exit pupils 757 located in the eyebox 759 of the system 800. The size of a single exit pupil 757 may be larger than and comparable with the size of the eye pupil 758. The exit pupils 757 may be sufficiently spaced apart, such that when one of the exit pupils 757 substantially coincides with the position of the eye pupil 758, the remaining one or more exit pupils 757 may be located beyond the position of the eye pupil 758 (e.g., falling outside of the eye pupil 758). The light guide 810 and the out-coupling element 845 may also transmit a light 842 from a real-world environment (referred to as a real-world light 842), combining the real-world light 842 with the output image light 832 and delivering the combined light to the eye 760. Thus, the eye 760 may observe the virtual scene optically combined with the real world scene.

Figure 8B:
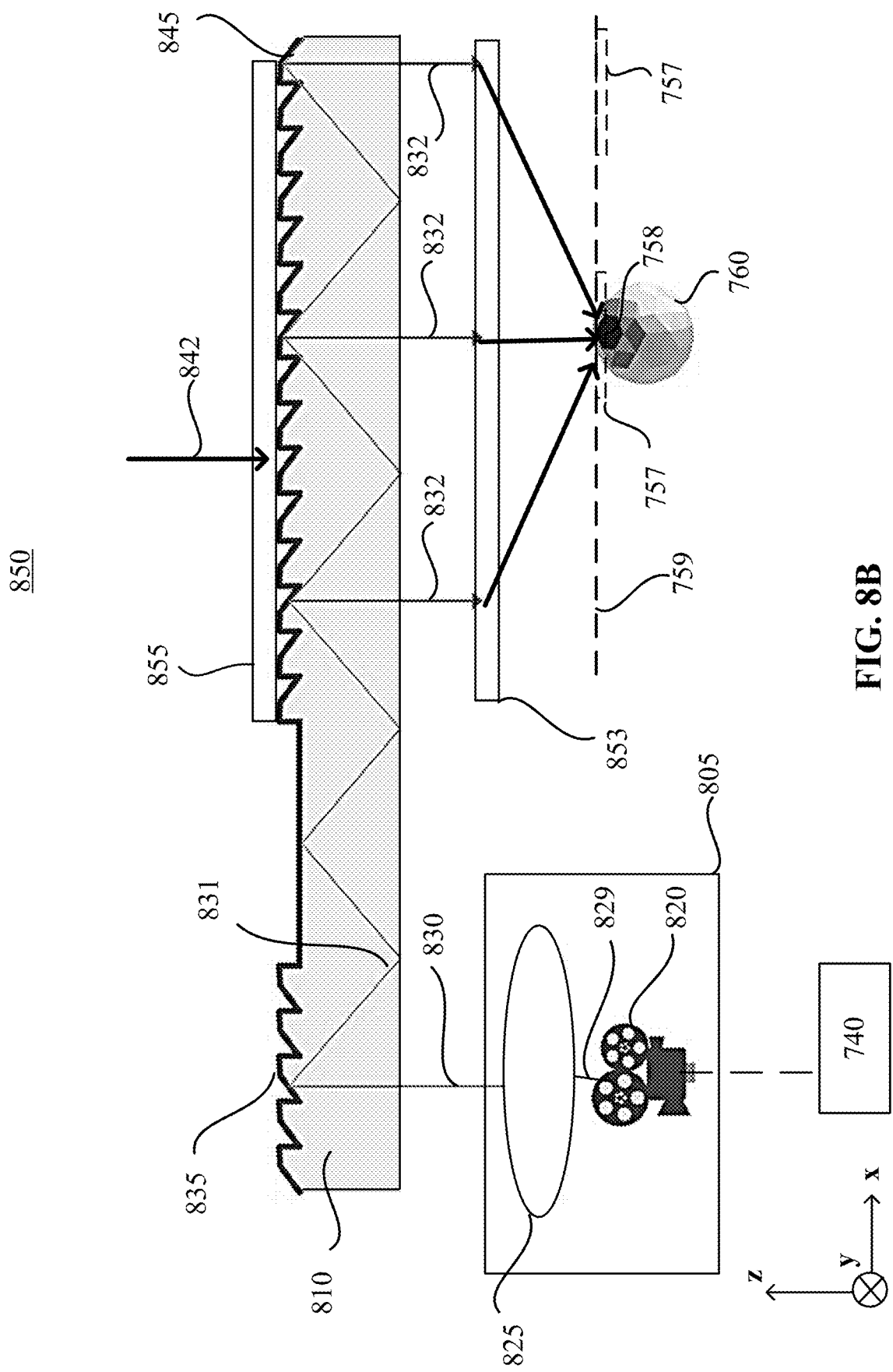
FIG. 8B schematically illustrates a system including one or more BPLC polarization hologram elements, according to an embodiment of the present disclosure.

In the embodiment shown in FIG. 8A, the light guide image combiner may generate an image of the display element 820 at an image plane that has an infinite depth (or image plane distance) with respect to the eye pupil 758 positioned at the eyebox 759. In some embodiments, the light guide image combiner may generate an image of the display element 820 at an image plane that has a finite depth (or image distance) with respect to the eye pupil 758 positioned at the eyebox 759. FIG. 8B schematically illustrates a diagram of a system 850, according to an embodiment of the present disclosure. The system 850 may also be referred to as a light guide display system or assembly. The system 850 may include elements that are similar to or the same as those included in the system 800 shown in FIG. 8A. Descriptions of the same or similar elements or features can refer to the above corresponding descriptions, including those rendered in connection with FIG. 8A.

As shown in FIG. 8B, the system 850 may include the light source assembly 805, and the light guide 810 coupled with the in-coupling element 835 and the output-coupling element 845 (also referred to as the light guide image combiner). The system 800 may also include a lens or lens assembly 853 disposed between the light guide image combiner and the eyebox 759. The lens assembly 853 may include one or more BPLC polarization hologram elements disclosed herein, such as the BPLC polarization hologram element 200 shown in FIG. 2A. In some embodiments, the lens assembly 853 may include a disclosed BPLC polarization hologram element that functions as a transmissive PVH lens. The lens assembly 853 may be configured to provide at least one of an adjustable optical power or an adjustable steering angle to the output image lights 832.

In some embodiments, based on the eye tracking information from the eye tracking system (not shown), the controller 740 may be configured to control the lens assembly 853 to steer and focus the plurality of output image lights 832 to an image plane within the eyebox 759, where one or more exit pupils 757 are located. In some embodiments, the lens assembly 853 may be configured to provide a 3D beam steering to the output image lights 832. For example, the lens assembly 853 may be configured to laterally steer (or shift) the focus of the output image lights 832 in one or two dimensions (e.g., an x-axis direction and/or a y-axis direction). In some embodiments, the lens assembly 853 may also be configured to vertically shift the image plane, at which the output image lights 832 are focused, in a third dimension (e.g., in a z-axis direction). Thus, a continuous or discrete shift of the exit pupil 757 of the system 850 may be provided in a 3D space to cover an expanded eyebox based on the eye tracking information.

In some embodiments, the vertical distance of the image plane of the display element 820 with respect to the eyebox 759 may be adjusted for addressing the vergence accommodation conflict. Accordingly, the user experience of the system 850 may be improved. For example, the display element 820 may display a virtual image. Based on the eye tracking information provided by the eye tracking system (not shown), the controller 740 may determine a virtual object within the virtual image at which the eyes 760 are currently looking. The controller 740 may determine a vergence depth ($d_v$) of the gaze of the user based on the gaze point or an estimated intersection of gaze lines determined by the eye tracking system. The gaze lines may converge or intersect at the distance $d_v$, where the virtual object is located. The controller 740 may control the lens assembly 853 to adjust the optical power to provide an accommodation that matches the vergence depth ($d_v$) associated with the virtual object at which the eyes 760 are currently looking, thereby reducing the accommodation-vergence conflict in the system 850. For example, the controller 740 may control the lens assembly 853 to operate in a desirable operation state to provide an optical power corresponding to a focal plane (or an image plane) that matches the vergence depth ($d_v$).

In some embodiments, when used for AR and/or MR applications, in addition to the lens assembly 853 (referred to as a first lens assembly 853), the system 850 may further include a second lens assembly 855. The second lens assembly 855 may include one or more BPLC polarization hologram elements disclosed herein, such as the BPLC polarization hologram element 200 shown in FIG. 2A. In some embodiments, the second lens assembly 855 may include a disclosed BPLC polarization hologram element that functions as a transmissive PVH lens. The first lens assembly 853 and the second lens assembly 855 may be disposed at two sides of the light guide 810. The controller 740 may be communicatively coupled with the second lens assembly 855. In some embodiments, when used for AR and/or MR applications, the controller 740 may be configured to control the first lens assembly 853 and the second lens assembly 855 to provide opposite steering effects and lensing effects to the real-world light 842. For example, the optical powers provided by the first lens assembly 853 and the second lens assembly 855 may have opposite signs and a substantially same absolute value, the steering provided by the first lens assembly 853 and the second lens assembly 855 may have opposite directions. Thus, the second lens assembly 855 may be configured to compensate for the distortion of the real-world light 842 caused by the first lens assembly 853, such that images of the real-world objects viewed through the system 850 may be substantially unaltered.

In some embodiments, each of the first lens assembly 853 and the second lens assembly 855 may be an active element. For example, the steering effect and lensing effect of the first lens assembly 853 or the second lens assembly 855 may be adjustable by an external field. When the BPLC layer included in the first lens assembly 853 or the second lens assembly 855 includes a plurality of sub-layers, the steering effect and lensing effect of each sub-layer may be adjustable by an external field.

In some embodiments, each of the first lens assembly 853 and the second lens assembly 855 may be a passive element. Each of the first lens assembly 853 and the second lens assembly 855 may be coupled with a switchable halfwave plate. The switchable halfwave plate may control the polarization of a light that is to be incident onto the first lens assembly 853 or the second lens assembly 855. The steering effect and lensing effect of the first lens assembly 853 or the second lens assembly 855 may be adjustable by controlling the switchable halfwave plate. When the BPLC layer included in the first lens assembly 853 or the second lens assembly 855 includes a plurality of sub-layers, each sub-layer may be coupled with a switchable halfwave plate, and the steering effect and lensing effect of each sub-layer may be adjustable controlling the switchable halfwave plate.

Figure 9A:
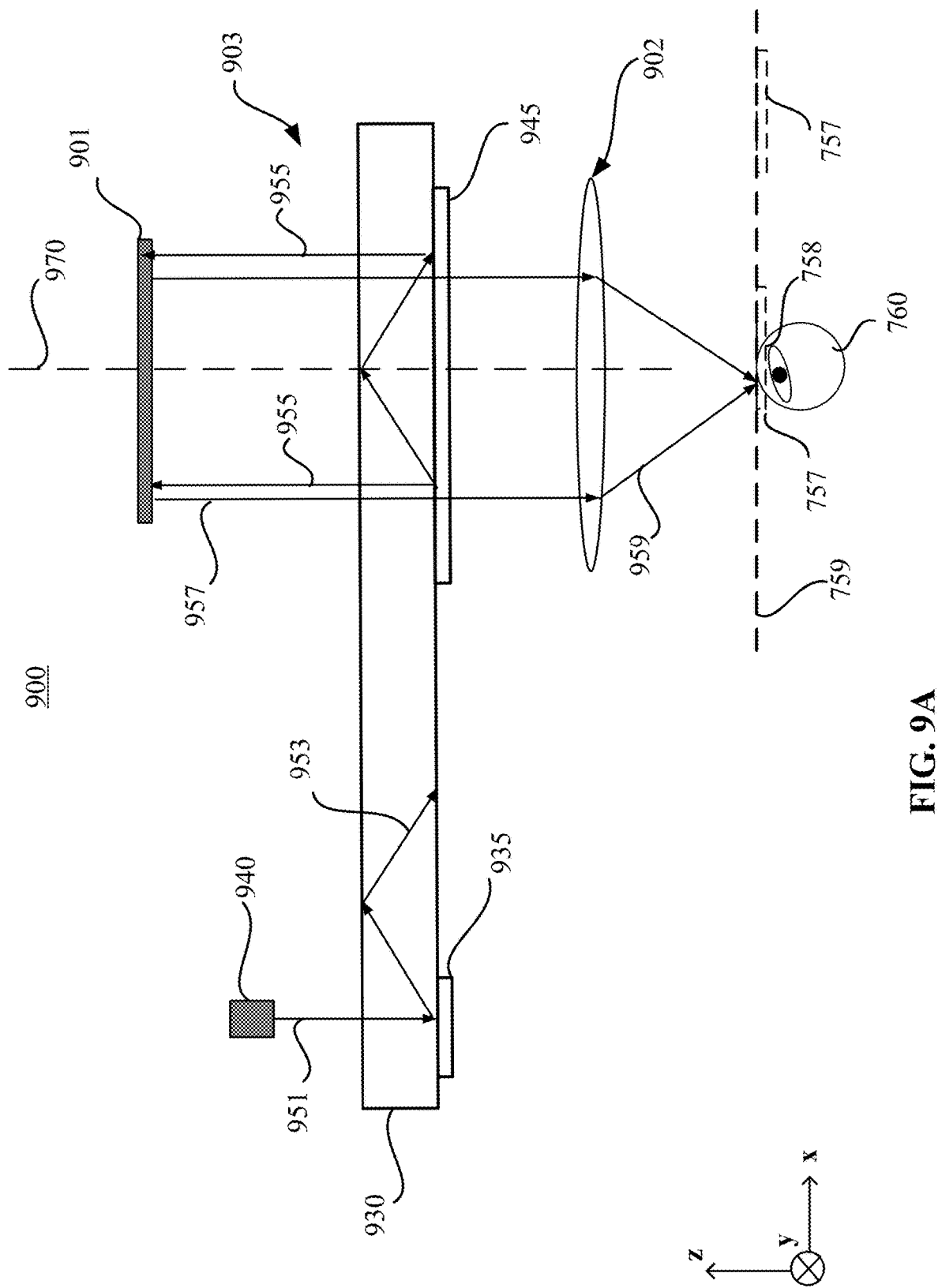
FIG. 9A schematically illustrates a system including one or more BPLC polarization hologram elements, according to an embodiment of the present disclosure.

FIG. 9A schematically illustrates a diagram of a system 900, according to an embodiment of the present disclosure. As shown in FIG. 9A, the system 900 may include a light guide illumination assembly 903, a display panel 901, and a lens assembly 902. The light guide illumination assembly 903 may include a light source assembly 940, and a light guide 930 coupled with an in-coupling element 935 and an out-coupling element 945. The display panel 901 and the lens assembly 902 may be disposed at opposite sides of the light guide 930. The display panel 901 and the lens assembly 902 may be arranged in parallel, and may be aligned on a same axis 970. The axis 970 may be an optical axis of the lens assembly 902, or an axis of symmetry of the display panel 901. The light guide 930 may be arranged in parallel with the display panel 901 and the lens assembly 902, with the surface normal of the light guide 930 being parallel with the axis 70. The light source assembly 940 may output a light 951 toward the light guide 930. The light source assembly 940 may include a light emitting diode ("LED"), a superluminescent diode ("SLED" or "SLD"), a laser diode, or a combination thereof, etc.

The light 951 may be guided by the light guide 930 to the display panel 901 for illuminating the display panel 901. The in-coupling element 935 may couple the light 951 into the light guide 930 as an in-coupled light 953 that prorogates along the light guide 930 toward the out-coupling element 945 via total internal reflection ("TIR"). The out-coupling element 945 may couple the in-coupled light 953 out of the light guide 930 as a light 955 propagating toward the display panel 901 to illuminate the display panel 901. Thus, the light 955 may also be referred to as an illuminating light 955. In some embodiments, the in-coupling element 935 may include a direct edge illumination, an input grating, a prism, a mirror, and/or photonic integrated circuits. In some embodiments, at least one of the in-coupling element 935 or the out-coupling element 945 may include a BPLC polarization hologram element disclosed herein, such as the BPLC polarization hologram element 200 shown in FIG. 2A. In some embodiments, the BPLC polarization hologram element may be configured to function as a grating that couples the illumination light into the light guide 910 or out of the light guide 910 via diffraction.

The light 955 may be normally incident onto the display panel 901. The display panel 901 may modulate and convert the light 955 into an image light 957 that represents a virtual image generated by the display panel 901. The lens assembly 902 may focus the image light 957 to an exit pupil 757 in the eyebox 759. Thus, the eye 760 located at the exit pupil 757 may perceive the image light 959 that represents the virtual image displayed on the display panel 901. The lens assembly 902 may include one or more BPLC polarization hologram elements disclosed herein, such as the BPLC polarization hologram element 200 shown in FIG. 2A. In some embodiments, the lens assembly 902 may include a disclosed BPLC polarization hologram element that functions as a transmissive PVH lens. The lens assembly 902 may be configured to provide at least one of an adjustable optical power or an adjustable steering angle to the image light 959.

The display panel 901 may be a reflective display panel or a transmissive display panel. For illustrative purposes, FIG. 9A shows the display panel 901 as a reflective display panel (e.g., a reflective LCD panel) that modulates and reflects the light 955 into the image light 957. In a system 980 shown in FIG. 9B, a display panel 982 may be a transmissive display panel (e.g., a transmissive LCD panel) that modulates and transmits the light 955 as an image light 987 that represents a virtual image generated by the display panel 982. The display panel 982 may be disposed between the lens assembly 902 and the light guide 930, and the lens assembly 902 may focus the image light 987 to the exit pupil 757 in the eyebox 759.

Figure 9B:
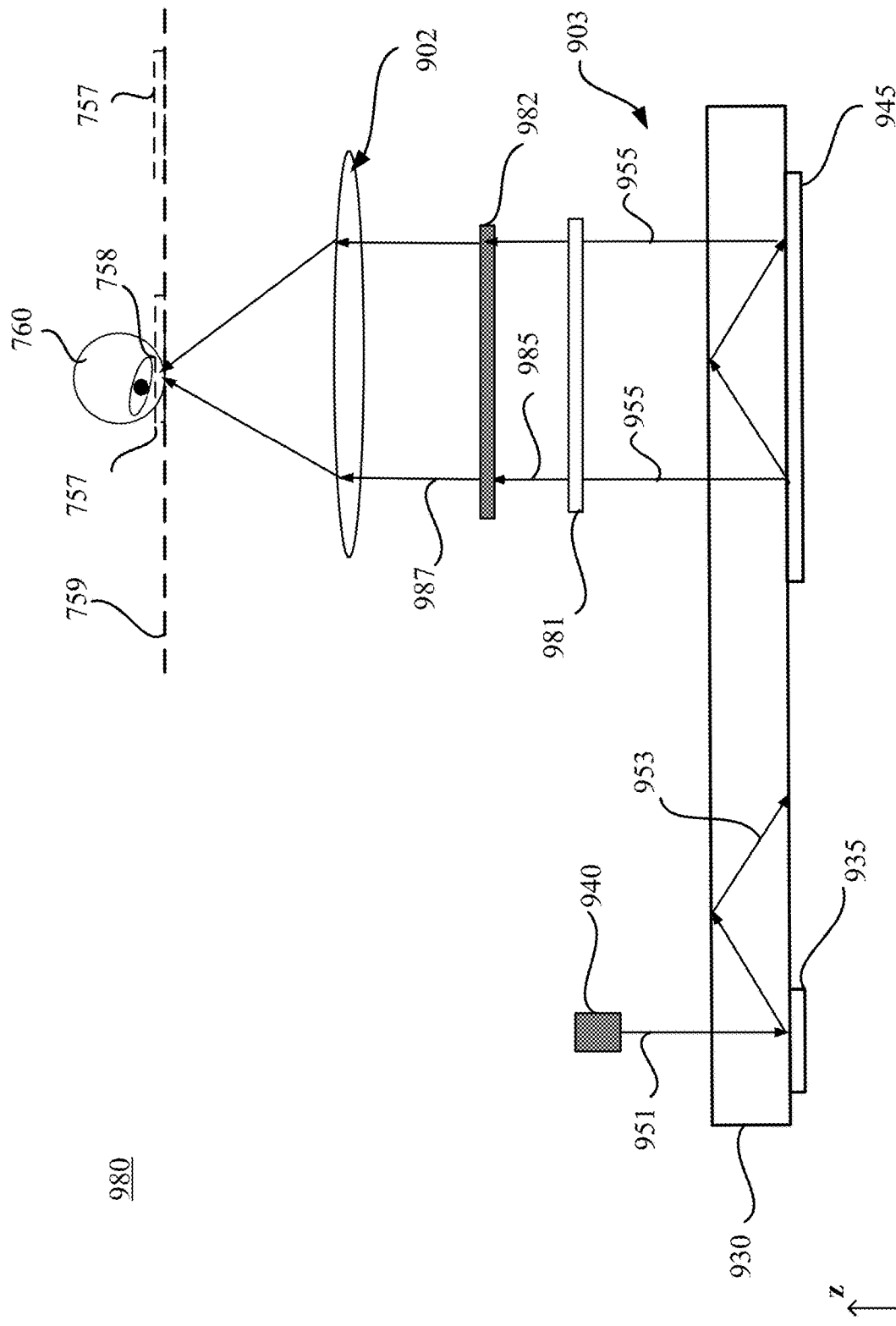
FIG. 9B schematically illustrates a system including one or more BPLC polarization hologram elements, according to an embodiment of the present disclosure.

In some embodiments, as shown in FIG. 9B, the system 980 may also include a polarizer or quarter-wave plate 981 disposed between the display panel 982 and the light guide 930. The polarizer or quarter-wave plate 981 may be configured to convert the illuminating light 955 into an illuminating light 985 having a desired polarization state, e.g., a linear polarization.

Figure 10A:
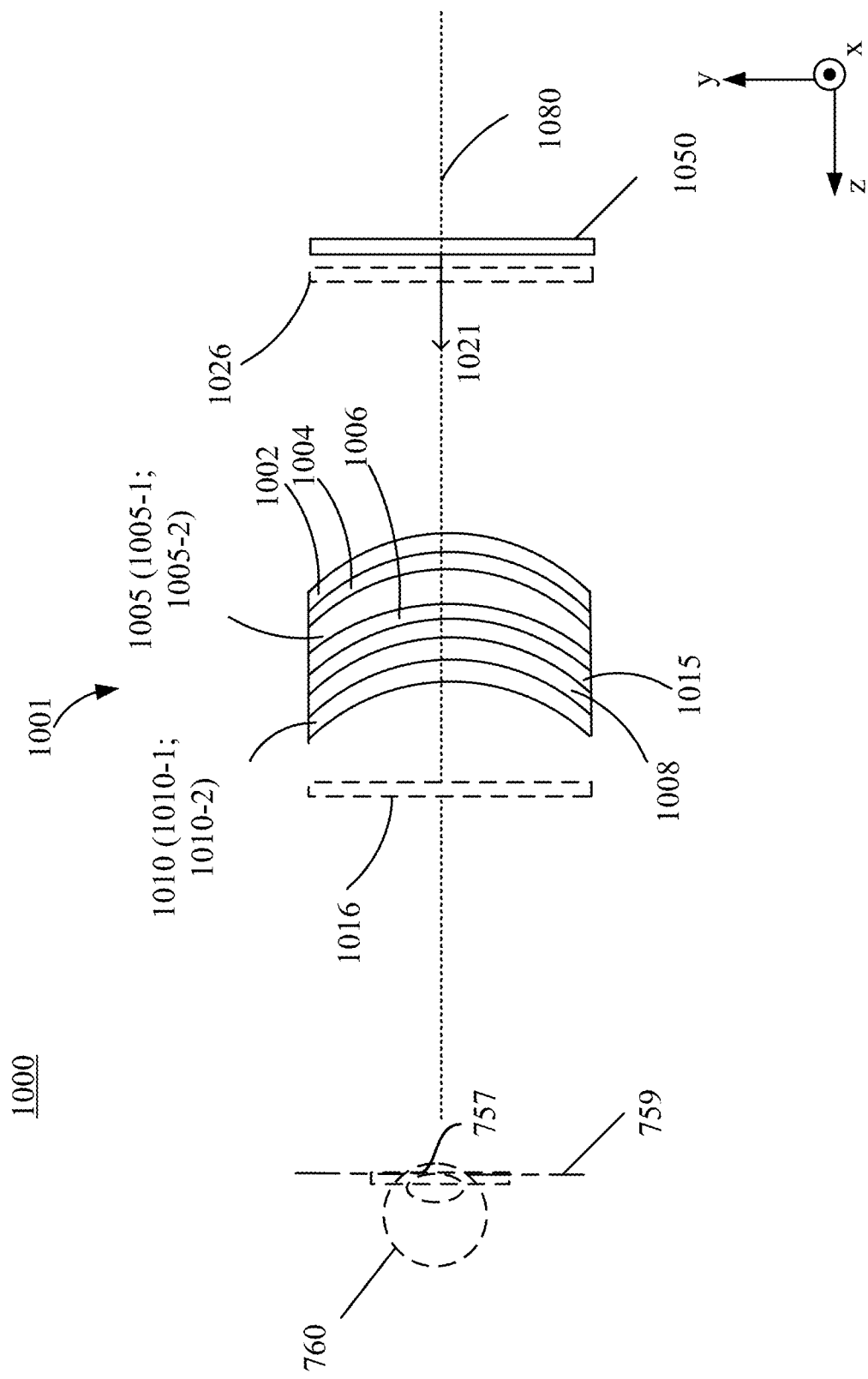
FIG. 10A schematically illustrates a system including one or more BPLC polarization hologram elements, according to an embodiment of the present disclosure.

FIG. 10A schematically illustrates a system 1000, according to an embodiment of the present disclosure. The system 1000 may include a light source assembly (e.g., a display element) 1050 configured to output an image light 1021 (e.g., a divergent image light) representing a virtual image. The system 1000 may also include a path-folding lens assembly (e.g., pancake lens assembly) 1001 configured to fold the optical path of the image light 1021, and transform the rays (forming the divergent image light 1021) emitted from each light outputting unit of the display element 1050 into a bundle of parallel rays that substantially cover one or more exit pupils 757 in the eyebox 759 of the system 1000. Due to the path folding, the lens assembly 1001 may increase a field of view ("FOV") of the system 1000 without increasing the physical distance between the display element 1050 and the eyebox region 759, and without compromising the image quality. The path-folding lens assembly 1001 may include one or more BPLC polarization hologram elements disclosed herein, such as the BPLC polarization hologram element 200 shown in FIG. 2A.

In some embodiments, the display element 1050 may be a monochromatic display that includes a narrowband monochromatic light source (e.g., a 30-nm-bandwidth light source). In some embodiments, the display element 1050 may be a polychromatic display (e.g., a red-green-blue ("RGB") display) that includes a broadband polychromatic light source (e.g., 300-nm-bandwidth light source covering the visible wavelength range). In some embodiments, the display element 1050 may be a polychromatic display (e.g., an RGB display) including a stack of a plurality of monochromatic displays, which may include corresponding narrowband monochromatic light sources respectively.

In some embodiments, the path-folding lens assembly 1001 may include a first optical element (e.g., a first optical lens) 1005 and a second optical element (e.g., a second optical lens) 1010. In some embodiments, the path-folding lens assembly 1001 may be configured as a monolithic pancake lens assembly without any air gaps between optical elements included in the path-folding lens assembly. In some embodiments, one or more surfaces of the first optical element 1005 and the second optical element 1010 may be shaped (e.g., curved) to compensate for field curvature. In some embodiments, one or more surfaces of the first optical element 1005 and/or the second optical element 1010 may be shaped to be spherically concave (e.g., a portion of a sphere), spherically convex, a rotationally symmetric asphere, a freeform shape, or some other shape that can mitigate field curvature. In some embodiments, the shape of one or more surfaces of the first optical element 1005 and/or the second optical element 1010 may be designed to additionally compensate for other forms of optical aberration. The disclosed BPLC polarization hologram element may be formed on one or more curved surfaces of at least one of the first optical element 1005 or the second optical element 1010. In some embodiments, one or more of the optical elements within the path-folding lens assembly 1001 may have one or more coatings, such as an anti-reflective coating, to reduce ghost images and enhance contrast. In some embodiments, the first optical element 1005 and the second optical element 1010 may be coupled together by an adhesive 1015. Each of the first optical element 1005 and the second optical element 1010 may include one or more optical lenses. In some embodiments, at least one of the first optical element 1005 or the second optical element 1010 may have at least one flat surface.

The first optical element 1005 may include a first surface 1005-1 facing the display element 1050 and an opposing second surface 1005-2 facing the eye 760. The first optical element 1005 may be configured to receive an image light at the first surface 1005-1 from the display element 1050 and output an image light with an altered property at the second surface 1005-2. The path-folding lens assembly 1001 may also include a linear polarizer 1002, a waveplate 1004, and a mirror 1006 arranged in an optical series, each of which may be an individual layer, film, or coating disposed at (e.g., bonded to or formed at) the first optical element 1005. The linear polarizer 1002, the waveplate 1004, and the mirror 1006 may be disposed at (e.g., bonded to or formed at) the first surface 1005-1 or the second surface 1005-2 of the first optical element 1005. For illustrative purposes, FIG. 10A shows that the linear polarizer 1002 and the waveplate 1004 are disposed at (e.g., bonded to or formed at) the first surface 1005-1 facing the display element 1050, and the mirror 1006 is disposed at (e.g., bonded to or formed at) the second surface 1005-2 facing the second optical element 1010. Other arrangements are also contemplated.

In some embodiments, the waveplate 1004 may be a quarter-wave plate ("QWP"). A polarization axis of the waveplate 1004 may be oriented relative to the polarization direction of a linearly polarized light to convert the linearly polarized light into a circularly polarized light or vice versa for a visible spectrum and/or an IR spectrum. In some embodiments, for an achromatic design, the waveplate 1004 may include a multilayer birefringent material (e.g., a polymer, liquid crystals, or a combination thereof) to produce quarter-wave birefringence across a wide spectral range. For example, an angle between the polarization axis (e.g., the fast axis) of the waveplate 1004 and the transmission axis of the linear polarizer 1002 may be configured to be in a range of about 35-50 degrees. In some embodiments, for a monochrome design, an angle between the polarization axis (e.g., the fast axis) of the waveplate 1004 and the transmission axis of the linear polarizer 1002 may be configured to be about 45 degrees. In some embodiments, the mirror 1006 may be a polarization non-selective partial reflector that is partially reflective to reflect a portion of a received light. In some embodiments, the mirror 1006 may be configured to transmit about 50% and reflect about 50% of a received light, and may be referred to as a "50/50 mirror." In some embodiments, the handedness of the reflected light may be reversed, and the handedness of the transmitted light may remain unchanged.

The second optical element 1010 may have a first surface 1010-1 facing the first optical element 1005 and an opposing second surface 1010-2 facing the eye 760. The path-folding lens assembly 1001 may also include a reflective polarizer 1008, which may be an individual layer, film, or coating disposed at (e.g., bonded to or formed at) the second optical element 1010. The reflective polarizer 1008 may be configured to primarily reflect a circularly polarized light having a first handedness and primarily transmit a circularly polarized light having a second handedness that is orthogonal to the first handedness.

In the embodiment shown in FIG. 10A, the reflective polarizer 1008 may include a BPLC polarization hologram element disclosed herein. Thus, the light leakage of the reflective polarizer 1008 for an input light having a large incident angle (e.g., greater than or equal to 60°) may be reduced. Accordingly, the ghost image caused by the light leakage may be suppressed. In some embodiments, the reflective polarizer 1008 including a BPLC polarization hologram element disclosed herein may function as a passive reflective polarizer with zero optical power. In some embodiments, the reflective polarizer 1008 including a BPLC polarization hologram element disclosed herein may function as an active reflective polarizer with an adjustable optical power, for addressing the vergence accommodation conflict in the system 1001.

The reflective polarizer 1008 may be disposed at (e.g., bonded to or formed at) the first surface 1010-1 or the second surface 1010-2 of the second optical element 1010 and may receive a light output from the mirror 1006. For illustrative purposes, FIG. 10A shows that the reflective polarizer 1008 is disposed at (e.g., bonded to or formed at) the first surface 1010-1 of the second optical element 1010. That is, the reflective polarizer 1008 may be disposed between the first optical element 1005 and the second optical element 1010. For example, the reflective polarizer 1008 may be disposed between the second surface 1010-2 of the second optical element 1010 and the adhesive layer 1015. In some embodiments, the reflective polarizer 1008 may be disposed at the second surface 1010-2 of the second optical element 1010.

Referring to FIG. 10A, in some embodiments, the image light 1021 emitted from the display element 1050 may be an unpolarized light. The linear polarizer 1002 and the waveplate 1004 may be replaced by a circular polarizer, which may be configured to the convert the unpolarized light into a circularly polarized light, and direct the circularly polarized light toward the mirror 1006. In some embodiments, the image light 1021 emitted from the display element 1050 may be a linearly polarized light, and the linear polarizer 1002 may be omitted. A polarization axis of the waveplate 1004 may be oriented relative to the polarization direction of the linearly polarized light to convert the linearly polarized light into a circularly polarized light or vice versa for a visible spectrum and/or an IR spectrum. In some embodiments, the image light 1021 emitted from the display element 1050 may be a circularly polarized light, and the linear polarizer 1002 and the waveplate 1004 may be omitted.

In some embodiments, one or more of the first surface 1005-1 and the second surface 1005-2 of the first optical element 1005 and the first surface 1010-1 and the second surface 1010-2 of the second optical element 1010 may be curved surface(s) or flat surface(s). In some embodiments, the path-folding lens assembly 1001 may have one of the optical elements 1005 and 1010, or may include more than two optical elements that may be similar to the optical elements 1005 or 1010. In some embodiments, the path-folding lens assembly 1001 may further include other optical elements in addition to the first and second optical elements 1005 and 1010, such as one or more linear polarizers, one or more waveplate, one or more circular polarizers, etc.

Figure 10B:
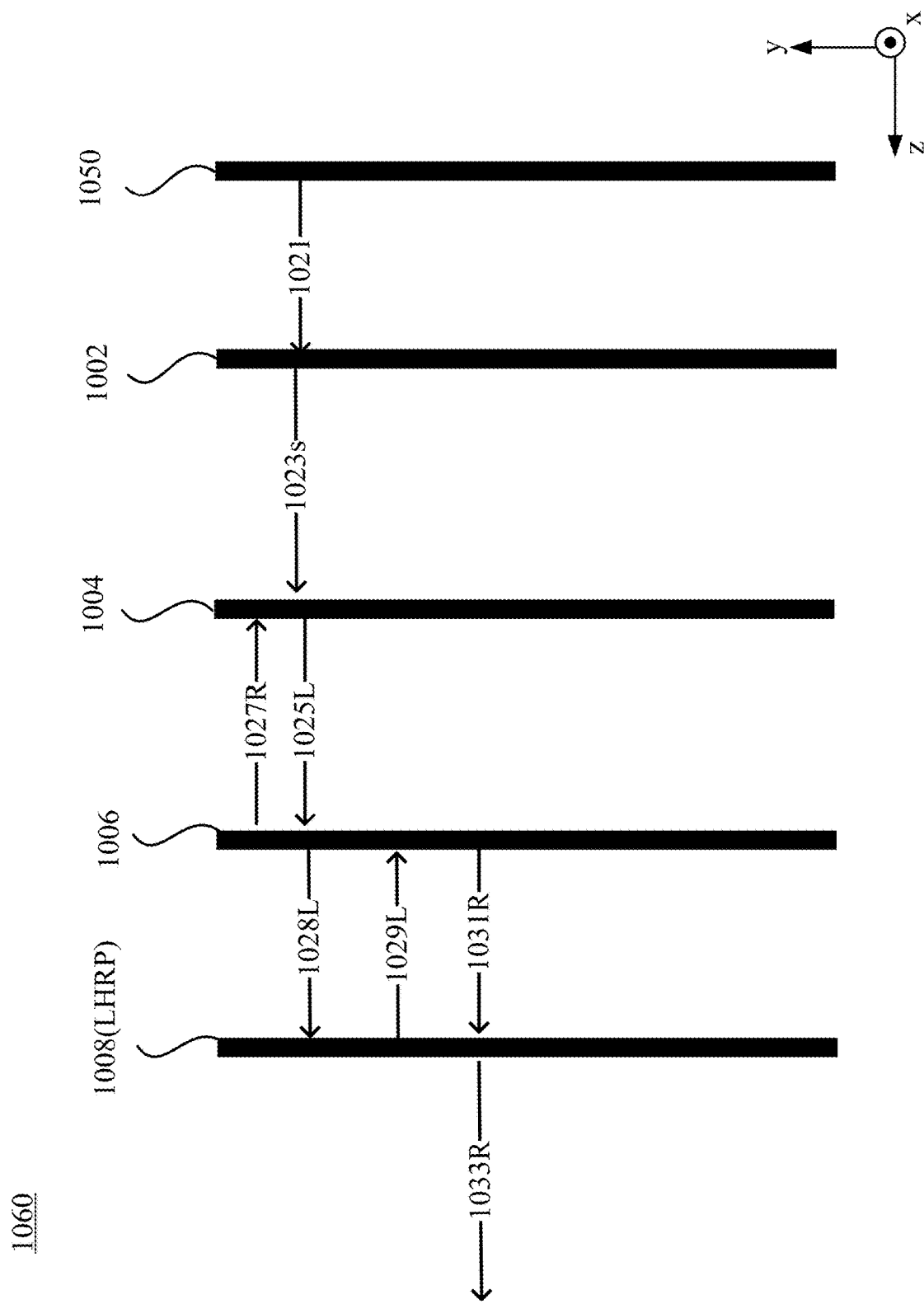
FIG. 10B schematically illustrates an optical path of an image light from a display element to an eyebox of the system shown in FIG. 10A, according to an embodiment of the present disclosure.

FIG. 10B illustrates a schematic cross-sectional view of an optical path 1060 of a light propagating in the path-folding lens assembly 1001 shown in FIG. 10A, according to an embodiment of the present disclosure. In the light propagation path 1060, the change of polarization of the light is shown. Thus, the first optical element 1005 and the second optical element 1010, which are presumed to be lenses that do not affect the polarization of the light, are omitted for the simplicity of illustration. In FIG. 10B, the letter "R" appended to a reference number (e.g., "1027R") denotes a right-handed circularly polarized ("RHCP") light, and the letter "L" appended to a reference number (e.g., "1025L") denotes a left-handed circularly polarized ("LHCP") light, the letter "s" appended to a reference number (e.g., "1023s") denotes an s-polarized light.

For discussion purposes, as shown in FIG. 10B, the linear polarizer 1002 may be configured to transmit an s-polarized light and block a p-polarized light, and the reflective polarizer 1008 may be a left-handed reflective polarizer ("LHRP") configured to reflect an LHCP light and transmit an RHCP light. For illustrative purposes, the display element 1050, the linear polarizer 1002, the waveplate 1004, the mirror 1006, and the reflective polarizer 1008 are illustrated as flat surfaces in FIG. 10B. In some embodiments, one or more of the display element 1050, the linear polarizer 1002, the waveplate 1004, the mirror 1006, and the reflective polarizer 1008 may include a curved surface.

As shown in FIG. 10B, the display element 1050 may generate the unpolarized image light 1021 covering a predetermined spectrum, such as a portion of the visible spectral range or substantially the entire visible spectral range. The unpolarized image light 1021 may be transmitted by the linear polarizer 1002 as an s-polarized image light 1023s, which may be transmitted by the waveplate 1004 as an LHCP image light 1025. A first portion of the LHCP image light 1025 may be reflected by the mirror 1006 as an RHCP image light 1027 toward the waveplate 1004, and a second portion of the LHCP image light 1025 may be transmitted as an LHCP image light 1028 toward the reflective polarizer 1008. The LHCP image light 1028 may be reflected by the reflective polarizer 1008 as an LHCP image light 1029 toward the mirror 1006. The LHCP image light 1029 may be reflected by the mirror 1006 as an RHCP image light 1031, which may be transmitted through the reflective polarizer 1008 as an RHCP image light 1033 toward the eyebox 759.

Referring back to FIG. 10A, in some embodiments, the path-folding lens assembly 1001 may also include a third optical element (or a third optical lens) 1016. The third optical lens 1016 may be a transmissive lens. In the embodiment shown in FIG. 10A, the third optical lens 1016 may be a free-standing flat element disposed between the second optical element 1010 and the eyebox 759. That is, the second optical element 1010 may be disposed between the third optical lens 1016 and the first optical element 1005. In some embodiments, although not shown, the third optical lens 1016 may be an individual layer, film, or coating disposed at (e.g., bonded to or formed at) the second optical element 1010. For example, the third optical lens 1016 may be disposed at (e.g., bonded to or formed at) the first surface 1010-1 or the second surface 1010-2 of the second optical element 1010.

The third optical lens 1016 may include a BPLC polarization hologram element disclosed herein, as a BPLC polarization hologram element that functions as a transmissive PVH lens. In some embodiments, the third optical lens 1016 may be configured to have an adjustable optical power, for addressing the vergence accommodation conflict in the path-folding lens assembly 1001. In some embodiments, the third optical lens 1016 may be an active element. For example, the optical power of the third optical lens 1016 may be adjustable by an external field, e.g., an electric field. When the BPLC layer included in the third optical lens 1016 includes a plurality of sub-layers, the steering effect and lensing effect of each sub-layer may be adjustable by an external field.

In some embodiments, the third optical lens 1016 may be a passive element, which may be coupled with a switchable half-wave plate. The switchable half-wave plate may control the polarization of a light (or beam) that is to be incident onto the third optical lens 1016. The optical power of the third optical lens 1016 may be adjustable by controlling the switchable half-wave plate. When the BPLC layer included in the third optical lens 1016 includes a plurality of sub-layers, each sub-layer may be coupled with a switchable half-wave plate, and the optical power of each sub-layer may be adjustable controlling the corresponding switchable half-wave plate.

Referring to FIG. 10A, in some embodiments, the system 1000 may also include a fourth optical lens 1026 coupled with the display element 1050. The fourth optical lens 1026 may be disposed between the display element 1050 and the first optical lens 1005. The fourth optical lens 1026 may include a BPLC polarization hologram element disclosed herein, such as a BPLC polarization hologram element that functions as a transmissive PVH lens. The fourth optical lens 1026 may be configured to substantially focus a circularly polarized having a predetermined handedness via forward diffraction, and substantially transmit a circularly polarized having an opposite handedness without changing the propagation direction (or with negligible or zero diffraction).

Figure 10C:
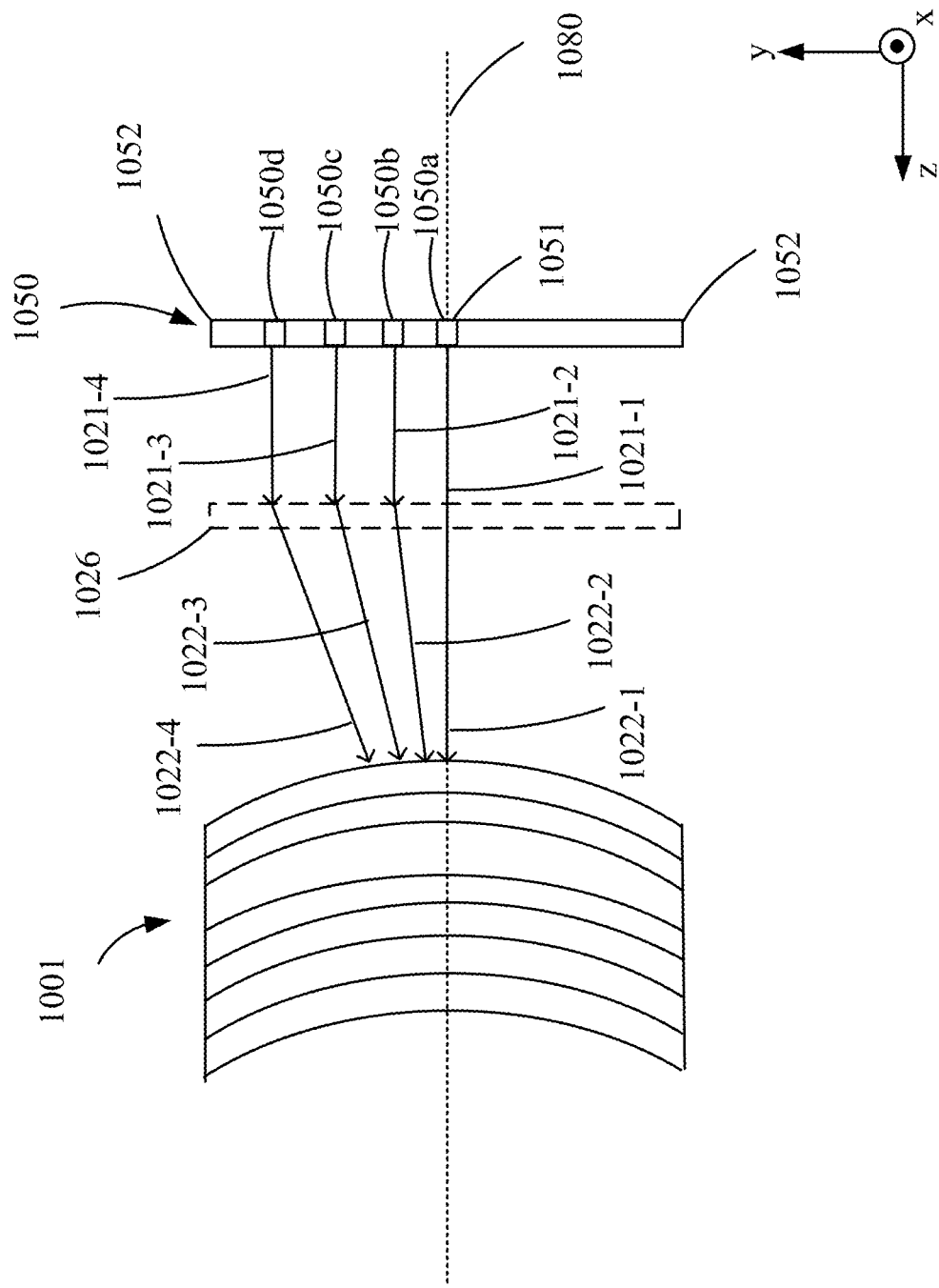
FIG. 10C schematically illustrates an optical path of an image light from a display element to a pancake lens assembly in the system shown in FIG. 10A, according to an embodiment of the present disclosure.

FIG. 10C schematically illustrates an optical path of the image light 1021 from the display element 1050 to the path-folding lens assembly 1001 in the system 1000 shown in FIG. 10A, according to an embodiment of the present disclosure. The peak luminance angle of the display element (e.g., the display panel) 1050 may be uniform across the display panel 1050, and may be substantially close to 0°. That is, rays 1021-1 to 1021-4 that are normally output from the display panel 1050 may have the highest luminance (or brightness). For discussion purposes, FIG. 10C shows four rays 1021-1 to 1021-4 of the image light 1021, which are normally output from four different light outputting units 1050a-1050b of the top portions of the display panel 1050, respectively.

A viewing angle (or the chief-ray-angle) of a user, which is defined as an angle formed between the gaze direction of the user and the surface normal of the display panel 1050 may vary across the display panel 1050. In FIG. 10C, the surface normal of the display panel 1050 is presumed to be parallel with an optical axis 1080 of the system 1000. For example, the viewing angles (or the chief-ray-angles) of the user associated with the four different light outputting units that respectively output rays 1021-1 to 1021-4 may be different. As the gaze direction of the user moves from a center portion 1051 to a periphery portion 1052 of the display panel 1050, the viewing angle (or the chief-ray-angle) of the user may gradually increase, e.g., from substantially 0° to +30° or −30°. Thus, there is a mismatch between the peak luminance angle (e.g., substantially close to 0°) of the display panel 1050 and the viewing angle (or the chief-ray-angle) of the user, and the mismatch may gradually increase as the gaze direction moves from the center portion 1051 to the periphery portion 1052 of the display panel 1050, e.g., from substantially 0° to +30° or −30°. Thus, as the gaze direction moves from the center portion 1051 to the periphery portion 1052 of the display panel 1050, the brightness (or luminance) received by the eye 760 of the user may gradually decrease, resulting in a poor visual effect for the user. For example, although the display panel 1050 displays a virtual image with a uniform brightness, the eye 760 located within the eyebox 759 may perceive a virtual image having a high brightness at the center and a low brightness at the periphery.

The fourth optical lens 1026 may be configured to convert the rays 1021-1 to 1021-4 that are normally output from the light outputting units 1050a-1050d into rays 1021-2 to 1022-4 propagating toward the path-folding lens assembly 1001. Each of the rays 1021-2 to 1022-4 may form an angle with respect to the optical axis 1080 of the system 1000, which may substantially match with the viewing angle (or the chief-ray-angle) of the user associated with the corresponding light outputting unit. For example, the angle formed by the ray 1021-1, 1021-2, 1021-3, or 1021-4 with respect to the optical axis 1080 may be substantially equal to the viewing angles (or chief-ray-angles) of the user associated with the light outputting unit 1050a, 1050b, 1050c, or 1050d. The path-folding lens assembly 1001 may guide the rays 1021-1 to 1021-4 to the eyebox 759. Thus, the mismatch between the peak luminance angle (e.g., substantially close to 0°) of the display panel 1050 and the viewing angle (or the chief-ray-angle) of the user associated with the display panel 1050 may be reduced, and the eye 760 located within the eyebox 759 may perceive a virtual image with an improved brightness uniformity.

Figure 11:
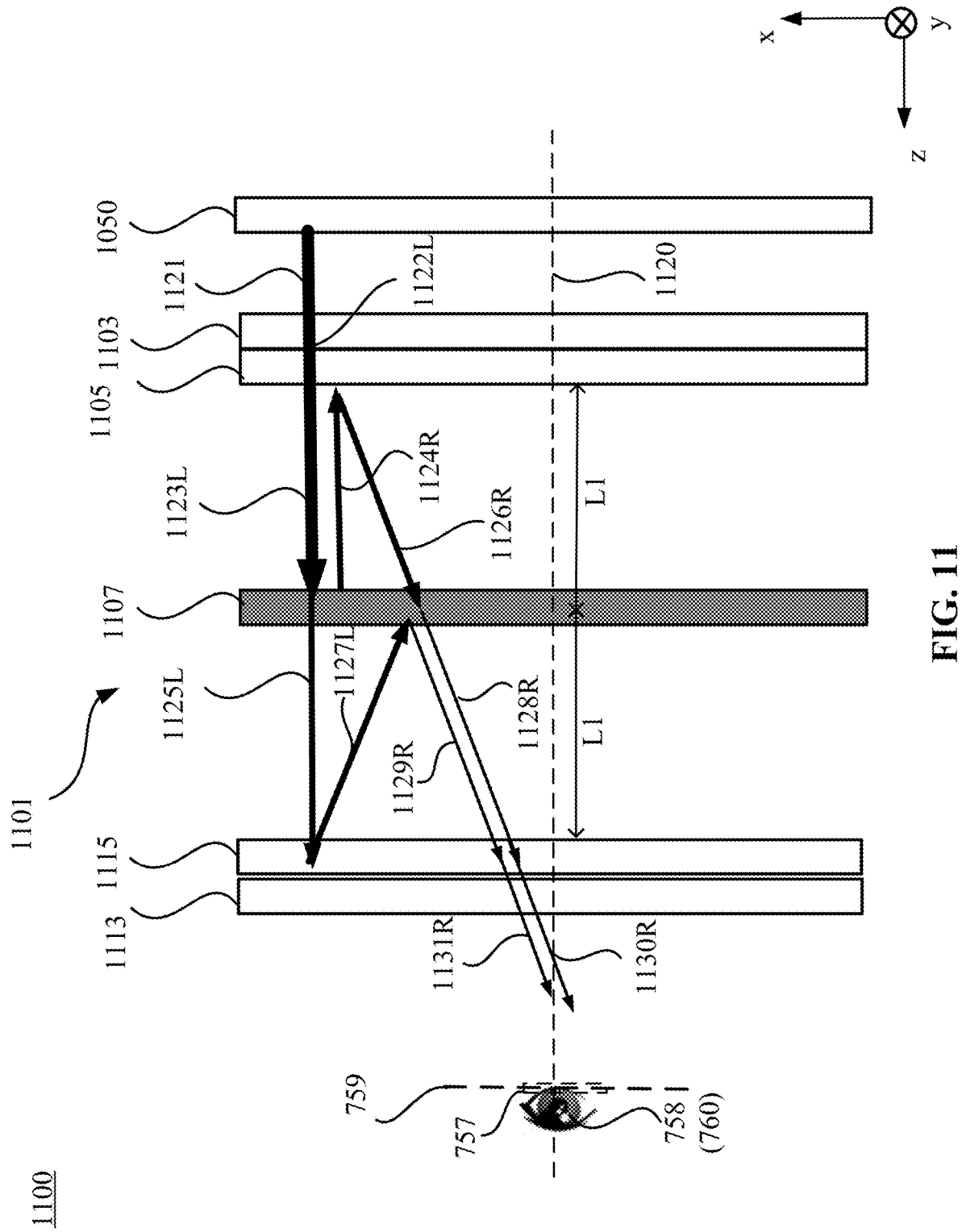
FIG. 11 schematically illustrates a system including one or more BPLC polarization hologram elements, according to an embodiment of the present disclosure.

FIG. 11 schematically illustrates an x-z sectional view of a system 1100, according to an embodiment of the present disclosure. The system 1100 may include the display element 1050 (which is an example of a light source) configured to output an image light 1121 representing a virtual image, and a path-folding lens assembly 1101 (also referred to as a lens assembly 1101) configured to fold the path of the image light 1121 from the display element 1050 to the eyebox 759. The lens assembly 1101 may be disposed between the display element 1050 and the eyebox 759. The lens assembly 1101 may transform the rays (forming a divergent image light) emitted from each light outputting unit of the display element 1050 into a bundle of parallel rays that substantially cover one or more exit pupils 757 in the eyebox 759 of the system 1100. For illustrative purposes, FIG. 11 shows a single ray of the image light 1121 emitted from a light outputting unit (e.g., a pixel) at the upper half of the display element 1050. The exit pupil 757 may correspond to a spatial zone where the eye pupil 758 of the eye 760 may be positioned in the eyebox 759 of the system 1100 to perceive the virtual image.

The lens assembly 1101 may include a first circular polarizer 1103, a first polarization selective reflector 1105 (e.g., a first reflective PVH element configured with a first optical power (i.e., functioning as a first PVH lens)), a polarization non-selective partial reflector 1107 (also referred to as a partial reflector 1107), a second polarization selective reflector 1115 (e.g., a second reflective PVH element configured with a second optical power (i.e., functioning as a second PVH lens)), and a second circular polarizer 1113 arranged in an optical series. For discussion purposes, the first polarization selective reflector 1105 and the second polarization selective reflector 1115 are referred to as a first PVH element 1105 and a second PVH element 1115, respectively.

In the embodiment shown in FIG. 11, at least one of the first PVH element 1105 or the second PVH element 1115 may include a disclosed BPLC polarization hologram element, e.g., a passive or an active BPLC polarization hologram element. In some embodiments, the BPLC layer included in at least one of the first PVH element 1105 or the second PVH element 1115 may include a plurality of sub-layers.

The partial reflector 1107 may be configured to partially transmit an input light while maintaining the polarization and propagation direction, and partially reflect the input light while changing the polarization, independent of the polarization of the input light. That is, regardless of the polarization of the input light, the partial reflector 1107 may partially transmit the input light and partially reflect the input light. For discussion purposes, the partial reflector 1107 is also referred to as a mirror. In some embodiments, the mirror 1107 may be configured to transmit about 50% of an input light and reflect about 50% of the input light (referred to as a 50/50 mirror).

FIG. 11 illustrates an optical path or a propagation path of the image light 1121 propagating from the display element 1050 to the eyebox 759 through the lens assembly 1101. In below figures, the letter "R" appended to a reference number (e.g., "1124R") denotes a right-handed circularly polarized ("RHCP") light, and the letter "L" appended to a reference number (e.g., "1123L") denotes a left-handed circularly polarized ("LHCP") light, the letter "s" appended to a reference number denotes an s-polarized light, and the letter "p" appended to a reference number denotes a p-polarized light.

In the embodiment shown in FIG. 11, the first PVH element 1105 and the second PVH element 1115 may have the same optical power and different polarization selectivities (e.g., may reflect lights of orthogonal polarizations). For example, the first PVH element 1105 may function as a right-handed PVH lens that reflects and converges, via diffraction, an RHCP light, and transmits an LHCP light with negligible or zero diffraction. The second PVH element 1115 may function as a left-handed PVH lens that reflects and converges, via diffraction, an LHCP light, and transmits an RHCP light with negligible or zero diffraction. A distance (e.g., L1) between the first PVH element 1105 and the mirror 1107 may be equal to a distance (e.g., L1) between the second PVH element 1115 and the mirror 1107. In some embodiments, the first PVH element 1105 and the second PVH element 1115 may have different optical powers, and the distance between the first PVH element 1105 and the mirror 1107 may be different from the distance the second PVH element 1115 and the mirror 1107.

As shown in FIG. 11, the first circular polarizer 1103 may convert the image light 1121 into an image light 1122L. The first PVH element 1105 may substantially transmit the image light 1122L as an image light 1123L toward the mirror 1107. The mirror 1107 may transmit a first portion of the image light 1123L as an image light 1125L toward the second PVH element 1115, and reflect a second portion of the image light 1123L back to the first PVH element 1105 as an image light 1124R. The second PVH element 1115 may substantially reflect and converge, via diffraction, the image light 1125L as an image light 1127L toward the mirror 1107. The mirror 1107 may transmit a first portion of the image light 1127L toward the first PVH element 1105 as an LHCP image light (not shown), and reflect a second portion of the image light 1127L back to the second PVH element 1115 as an image light 1129R. The second PVH element 1115 may substantially transmit the image light 1129R while maintaining the polarization and propagation direction. The second circular polarizer 1113 may transmit the image light 1129R as an image light 1131R toward the eyebox 759.

When the image light 1123L is normally incident onto the mirror 1107, the image light 1124R may propagate in a direction opposite to the propagation direction of the image light 1123L. That is, the image light 1124R and the image light 1123L may substantially coincide with one another and have opposite propagation directions. To better illustrate the optical paths of the image light 1124R and the image light 1123L, FIG. 11 shows a small gap between the image light 1124R and the image light 1123L. The first PVH element 1105 may reflect and converge, via diffraction, the image light 1124R as an image light 1126R toward the mirror 1107. The mirror 1107 may transmit a first portion of the image light 1126R toward the second PVH element 1105 as an image light 1128R, and reflect a second portion of the image light 1126R back to the first PVH element 1105 as an LHCP image light (not shown). The second PVH element 1115 may substantially transmit the image light 1128R, while maintaining the propagation direction and the polarization. The second circular polarizer 1113 may transmit the image light 1128R as an image light 1130R toward the eyebox 759.

In the embodiment shown in FIG. 11, both of the first PVH element 1105 and the second PVH element 1115 may be passive elements, or both of the first PVH element 1105 and the second PVH element 1115 may be active elements configured to operate in the active state. As the first PVH element 1105 and the second PVH element 1115 have the same optical power, and the same axial distance (e.g., L1) to the mirror 1107 along an optical axis 1120 of the system 1100, the image light 1130R and the image light 1131R may substantially coincide or overlap with one another, forming a single image with a high image quality within the eyebox 759. When the distance between the between the first PVH element 1105 and the mirror 1107 is different from the distance between the second PVH element 1115 and the mirror 1107, the optical powers of the first PVH element 1105 and the second PVH element 1115 may be configured to be different, and additional optical elements may be included such that the image light 1130R and the image light 1131R may still substantially coincide or overlap with one another.

Figure 13A:
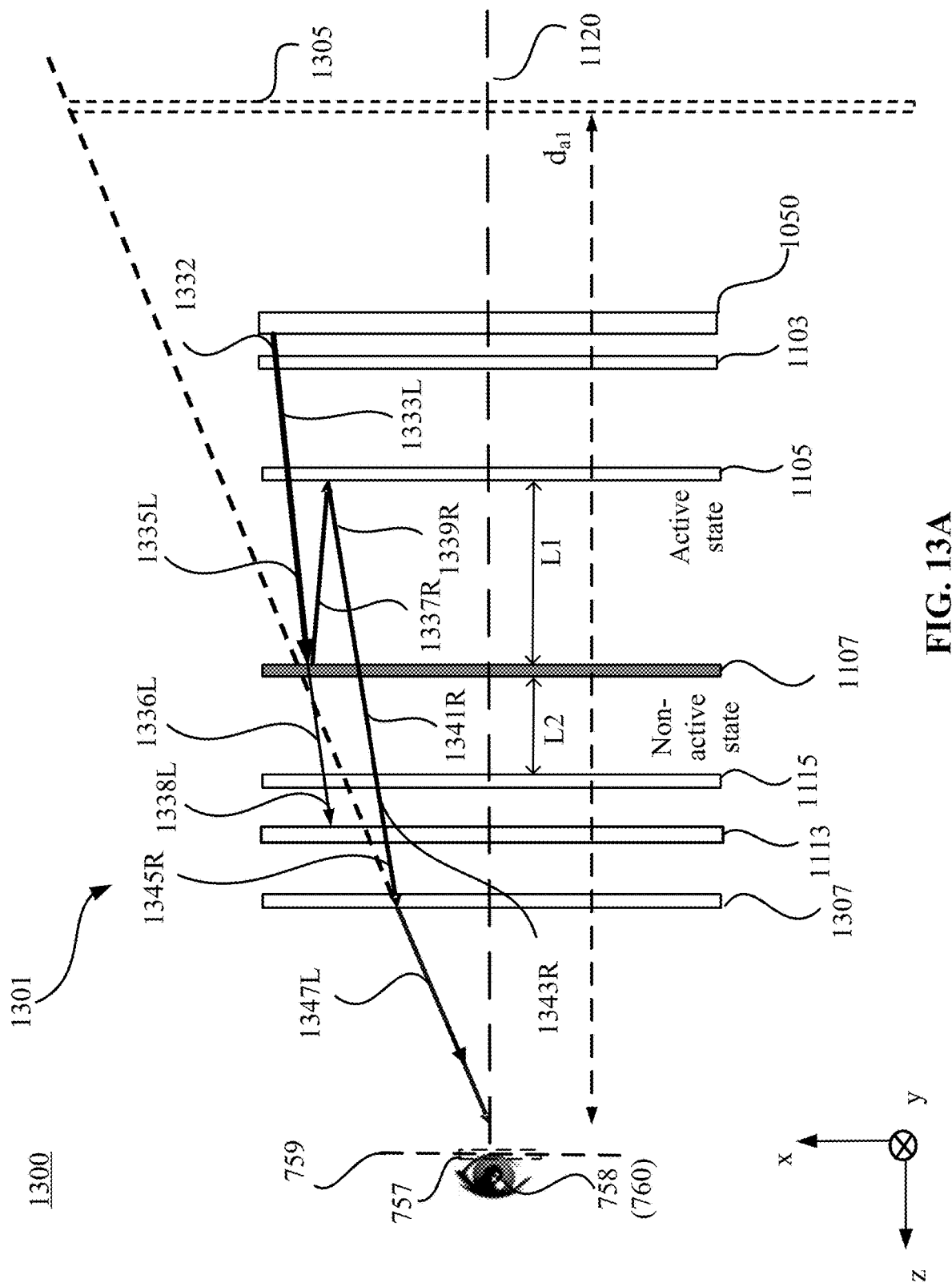
FIG. 13A schematically illustrates a system including one or more BPLC polarization hologram elements, according to an embodiment of the present disclosure.

FIG. 13A illustrates an x-z sectional view of a system 1300, according to an embodiment of the present disclosure. The system 1300 may include elements that are similar to or the same as those included in the system 1100 shown in FIG. 11. Descriptions of the same or similar elements or features can refer to the above corresponding descriptions, including those rendered in connection with FIG. 11. As shown in FIG. 13A, the system 1300 may include the display element 1050, and a path-folding lens assembly 1301 (also referred to as lens assembly 1301) configured to fold the path of an image light emitted from the display element 1050 to the eyebox 759. The lens assembly 1301 may include the first circular polarizer 1103, the first PVH lens 1105 (also referred to as a first lens 1105), the mirror 1107, the second PVH lens 1115 (also referred to as a second lens 1115), and the second circular polarizer 1113 arranged in an optical series.

The system 1300 may also include a transmissive lens 1307 (also referred to as a third lens 1307) disposed between the eyebox 759 and the second circular polarizer 1113. The transmissive lens 1307 may include a conventional solid lens including at least one curved surface (e.g., a glass lens, a polymer lens, or a resin lens, etc.), a liquid lens, a Fresnel lens, a meta lens, a disclosed BPLC polarization hologram element that functions as a transmissive PVH lens, etc. The transmissive lens 1307 may be configured with a fixed optical power or a tunable optical power. For discussion purposes, FIG. 13A shows that the transmissive lens 1307 includes flat surfaces. In some embodiments, the transmissive lens 1307 may include at least one curved surface.

In the embodiment shown in FIG. 13A, each of the first PVH lens 1105 and the second PVH lens 1115 may be an active element that is switchable between operating in an active state and operating in a non-active state. When operating in the active state, the first PVH lens 1105 or the second PVH lens 1115 may selectively reflect or transmit an input light depending on a polarization of the input light. When operating in the non-active state, the first PVH lens 1105 or the second PVH lens 1115 may transmit an input light independent of the polarization of the input light. Thus, the first PVH lens 1105 or the second PVH lens 1115 operating in the active state may have a polarization selective optical power (e.g., zero or non-zero optical power depending on the polarization of the input light), and the first PVH lens 1105 or the second PVH lens 1115 operating in the non-active state may have a zero optical power independent of the polarization of the input light. For example, the first PVH lens 1105 or the second PVH lens 1115 may operate in the active state when an applied voltage is less than or equal to a first threshold value (e.g., a voltage that is insufficiently high to reorientate the LC molecules), and may operate in the non-active state when the applied voltage is equal to or greater than a second threshold value (e.g., a voltage that is sufficiently high to reorientate the LC molecules to be substantially parallel with an electric field direction).

In some embodiments, the controller 740 (not shown) may be communicatively coupled with the first PVH lens 1105 and the second PVH lens 1115 to control the operation state thereof. For example, the first PVH lens 1105 or the second PVH lens 1115 may be electrically coupled with a power source (not shown). The controller 740 may control the output of the power source to control the electric field in the first PVH lens 1105 or the second PVH lens 1115, thereby controlling the operation state of the first PVH lens 1105 or the second PVH lens 1115.

The optical power of the first PVH lens 1105 or the second PVH lens 1115 may be fixed or adjustable. The first PVH lens 1105 and the second PVH lens 1115 may be configured to have at least one of different optical powers or different axial distances (e.g., L1 and L2) to the mirror 1107 along the optical axis 1120. For example, in some embodiments, the first PVH lens 1105 and the second PVH lens 1115 may be configured to have the same optical power, and different axial distances to the mirror 1107. In some embodiments, the first PVH lens 1105 and the second PVH lens 1115 may be configured to have different optical powers, and the same axial distance to the mirror 1107. In some embodiments, the first PVH lens 1105 and the second PVH lens 1115 may be configured to have different optical powers, and different axial distances to the mirror 1107. For discussion purposes, FIG. 13A shows that the axial distance L1 is greater than the axial distance L2. In some embodiments, the axial distance L1 may be equal to or smaller than the axial distance L2.

FIG. 13A also illustrates an optical path of an image light 1332 from the display element 1050 to the eyebox 759, according to an embodiment of the present disclosure. In FIG. 13A, the controller 740 (not shown) may control the first PVH lens 1105 to operate in the active state, and control the second PVH lens 1115 to operate in the non-active state.

Figure 13B:
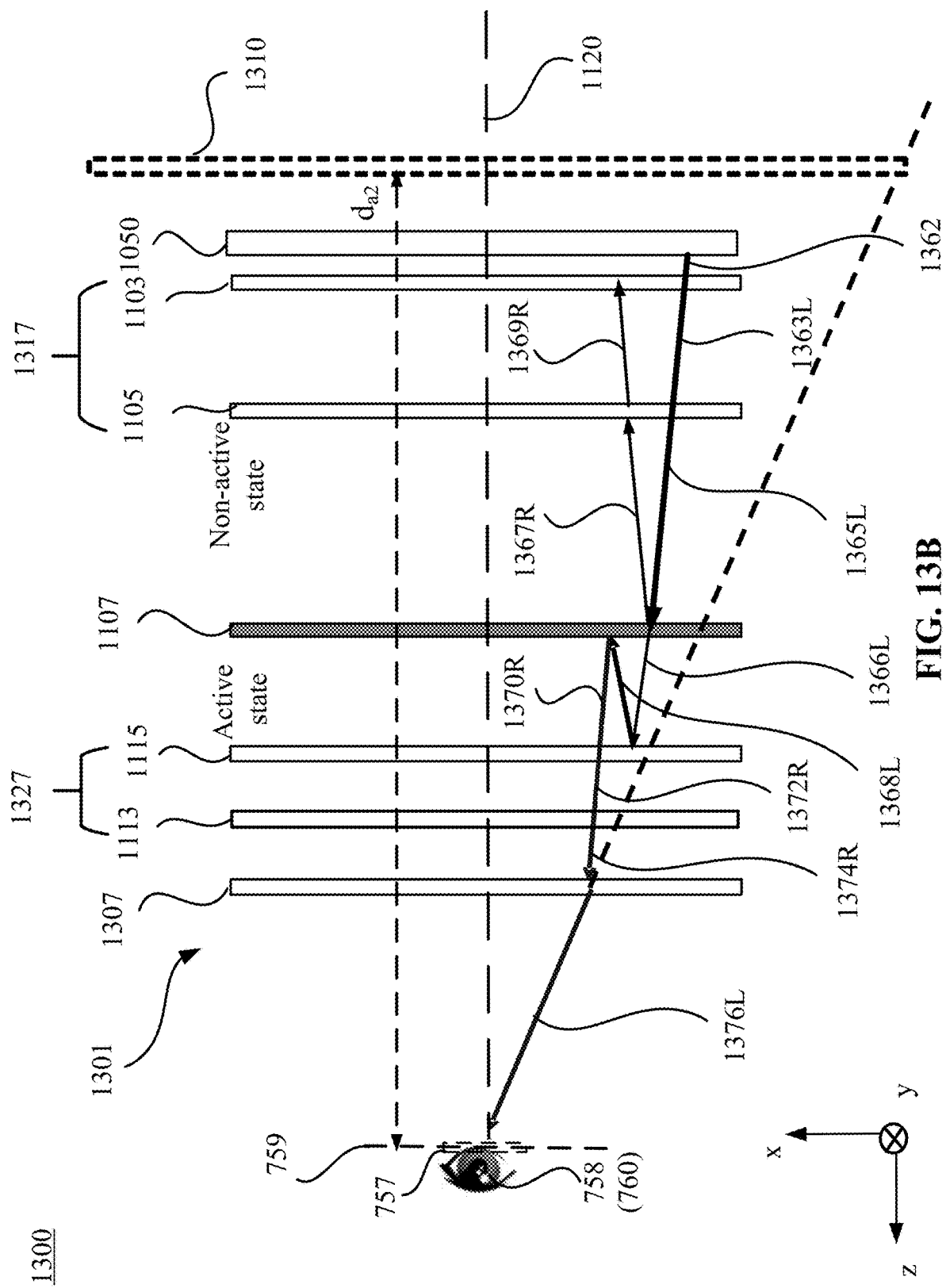
FIG. 13B schematically illustrates a cross-sectional view of an optical path in the system shown in FIG. 13A, according to an embodiment of the present disclosure.

FIG. 13B illustrates an optical path of an image light 1362 from the display element 1050 to the eyebox 759, according to an embodiment of the present disclosure. In FIG. 13B, the controller 740 (not shown) may control the first PVH lens 1105 to operate in the non-active state, and control the second PVH lens 1115 to operate in the active state.

For discussion purposes, in FIGS. 13A and 13B, the first PVH lens 1105 operating in the active state may reflect and converge an RHCP light, and may transmit an LHCP light while maintaining the propagation direction of the LHCP light. The second PVH lens 1115 operating in the active state may reflect and converge an LHCP light, and may transmit an RHCP light while maintaining the propagation direction of the RHCP light. For discussion purposes, the transmissive lens 1307 may be a right-handed PBP lens configured to converge an RHCP light and diverge an LHCP light, the first circular polarizer 1103 may transmit an LHCP light and block an RHCP light, and the second circular polarizer 1113 may transmit an RHCP light and block an LHCP light.

Referring back to FIG. 13A, the display element 1050 may output a first image light 1332 (e.g., representing a first virtual object). The first circular polarizer 1103 may convert the image light 1332L into an image light 1333L toward the first PVH lens 1105. The first PVH lens 1105 operating in the active state may substantially transmit the image light 1333L as an image light 1335L toward the mirror 1107. The mirror 1107 may transmit a first portion of the image light 1335L as an image light 1336L toward the second PVH lens 1115, and reflect a second portion of the image light 1335L back to the first PVH lens 1105 as an image light 1337R. The second PVH lens 1115 may transmit the image light 1336L as an image light 1338L toward the second circular polarizer 1113. The second circular polarizer 1113 may block the image light 1338L from being incident onto the transmissive lens 1307, such that a ghost image may be suppressed.

The first PVH lens 1105 may reflect and converge, via diffraction, the image light 1337R as an image light 1339R toward the mirror 1107. The mirror 1107 may transmit a first portion of the image light 1339R toward the second PVH lens 1115 as an image light 1341R, and reflect a second portion of the image light 1339R back to the first PVH lens 1105 as an LHCP image light (not shown). The second PVH lens 1115 may substantially transmit the image light 1341R as an image light 1343R toward the second circular polarizer 1113. The second circular polarizer 1113 may transmit the image light 1343R as an image light 1345R toward the transmissive lens 1307. The transmissive lens 1307 may focus the image light 1345R into an image light 1347L. The light intensity of the image light 1347L may be about 25% of the light intensity of the image light 1332L output from the display element 1050. The optical path of an image light from being the image light 1332L to being the image light 1347L may be referred to as a first optical path.

The lens assembly 1301 may image the display element 1050 to a first image plane 1305 having a first axial distance of $d_{a1}$ to the eyebox 759, along the optical axis 1120 of the lens assembly 1301. Thus, the first virtual object displayed by the display element 1050 (e.g., displayed on the display panel) may be imaged, by the lens assembly 1301, to the first image plane 1305 that is apart from the eyebox 759 by the first axial distance of $d_{a1}$. In other words, the lens assembly 1301 may form an image of the first virtual object at the first image plane 1305. Accordingly, for the eye 760 placed at the exit pupil 757 within the eyebox 759, the accommodation distance of the first virtual object may be substantially equal to the first axial distance $d_{a1}$.

As shown in FIG. 13B, the display element 1050 may output a second image light 1362 (e.g., representing a second virtual object). The first circular polarizer 1103 may convert the image light 1362 into an image light 1363L propagating toward the first PVH lens 1105. The first PVH lens 1105 may substantially transmit the image light 1363L as an image light 1365L toward the mirror 1107. The mirror 1107 may transmit a first portion of the image light 1365L as an image light 1366L toward the second PVH lens 1115, and reflect a second portion of the image light 1365L back to the first PVH lens 1105 as an image light 1367R. The first PVH lens 1105 may transmit the image light 1367R as an image light 1369R toward the first circular polarizer 1103. The first circular polarizer 1103 may block the image light 1369R from being incident onto the display element 1050.

The second PVH lens 1115 may reflect and converge, via diffraction, the image light 1366L as an image light 1368L toward the mirror 1107. The mirror 1107 may transmit a first portion of the image light 1368L toward the first PVH lens 1105 as an LHCP image light (not shown), and reflect a second portion of the image light 1368L back to the second PVH lens 1115 as an image light 1370R. The second PVH lens 1115 may substantially transmit the image light 1370R as an image light 1372R toward the second circular polarizer 1113. The second circular polarizer 1113 may transmit the image light 1372R as an image light 1374R toward the transmissive lens 1307. The transmissive lens 1307 may focus the image light 1374R into an image light 1376L. The light intensity of the image light 1376L may be about 25% of the light intensity of the image light 1362L output from the display element 1050. The optical path of an image light from being the image light 1363L to being the image light 1376L may be referred to as a second optical path.

The lens assembly 1301 may image the display element 1050 to a second image plane 1310 having a second axial distance of $d_{a2}$ to the eyebox 759, along the optical axis 1120 of the lens assembly 1301. Thus, the second virtual object displayed by the display element 1050 (e.g., displayed on the display panel) may be imaged by the lens assembly 1301 to be at the second image plane 1310 that is spaced apart from the eyebox 759 by the second axial distance of $d_{a2}$. In other words, the lens assembly 1301 may form an image of the second virtual object at the second image plane 1310. Accordingly, for the eye 760 placed at the exit pupil 757 within the eyebox 759, the accommodation distance of the second virtual object may be substantially equal to the second axial distance $d_{a2}$.

Referring to FIGS. 13A and 13B, in some embodiments, when the axial distances L1 and L2 are fixed, the first axial distance $d_{a1}$ of the first image plane 1305 may be determined by the respective optical powers of the first PVH lens 1105 and the transmissive lens 1307, and the second axial distance $d_{a2}$ of the second image plane 1310 may be determined by the respective optical powers of the second PVH lens 1115 and the transmissive lens 1307. Thus, through configuring the respective optical powers of the transmissive lens 1307, the first PVH lens 1105, and the second PVH lens 1115, the second axial distance $d_{a2}$ may be configured to be different from the first axial distance $d_{a1}$. For discussion purposes, FIGS. 13A and 13B show that the first axial distance $d_{a1}$ is greater than the second axial distance $d_{a2}$, and the first virtual object and the second virtual object displayed by the display element 1050 may be a distant virtual object and a close virtual object, respectively.

Thus, when each of the transmissive lens 1307, the first PVH lens 1105, and the second PVH lens 1115 is presumed to have a fixed optical power, the lens assembly 1301 may image the display element 1050 to two different image planes having different axial distances to the eyebox 759. In other words, the lens assembly 1301 may form respective images of the first virtual object and the second virtual object displayed by the display element 1050 (e.g., displayed on the display panel) at two different image planes that are spaced apart from the eyebox 759 by different axial distances. Accordingly, for the eye 760 placed at the exit pupil 757 within the eyebox 759, the accommodation distance of the first virtual object and the second virtual object may be different from one another.

When the display element 1050 displays the first virtual object and the second virtual object associated with different vergence distances (from the eye 760 placed at the exit pupil 757 within the eyebox 759), the respective optical powers of the transmissive lens 1307, the first PVH lens 1105, and the second PVH lens 1115 may be configured, and the axial distances L1, and L2 for the lens assembly 1301 may be configured, such that the first axial distance $d_{a1}$ may be substantially equal to the vergence distance of the first virtual object, and the second axial distance $d_{a2}$ may be substantially equal to the vergence distance of the second virtual object.

Thus, the vergence-accommodation conflict in the system 1300 may be reduced, and the user experience may be enhanced. In some embodiments, when at least one of the transmissive lens 1307, the first PVH lens 1105, or the second PVH lens 1115 has an adjustable optical power, the lens assembly 1301 may image the virtual content displayed by the display element 1050 to more than two different image planes having different axial distances to the eyebox 759. The accommodation capability of the lens assembly 1301 may be further improved.

In some embodiments, during a display frame of the display element 1050, a distant virtual object and a close virtual object may be displayed by the display element 1050, during different sub-frames of the display frame. The display element 1050 may render the close virtual object to appear closer to the eyes 760 than the distant virtual object. Referring to FIGS. 13A and 13B, the distant virtual object may be the first virtual object represented by the image light 1332 shown in FIG. 13A, and the close virtual object may be the second virtual object represented by the image light 1362 shown in FIG. 13B.

The display element 1050 may be configured to display virtual objects associated with different vergence distances in a time sequential manner during the operation of the system 200. For example, the display element 1050 may be configured to switch between displaying the distant virtual object and displaying the close virtual object at a predetermined frequency or predetermined frame rate. In some embodiments, the display frame of the display element 1050 may include a first sub-frame and a second sub-frame. The controller 740 may be configured to control the display element 1050 to display the distant virtual object and the close virtual object during the respective sub-frames of the display frame of the display element 1050. In some embodiments, the frame rate of the display element 1050 may be at least 60 Hz according to the frame rate of the human vision.

In addition, during the operation of the system 1300, the controller 740 may be configured to control each of the first PVH lens 1105 and the second PVH lens 1115 to switch between the active state and the non-active state. In some embodiments, when the display frame of the display element 1050 includes a first sub-frame and a second sub-frame, the controller 740 may be configured to control the first PVH lens 1105 and the second PVH lens 1115 to sequentially operate in the active state during the two sub-frames. The switching of the first PVH lens 1105 and the second PVH lens 1115 may be synchronized with the switching of the display element 1050 between displaying the distant virtual object and the close virtual object.

For example, during the first sub-frame, the controller 740 may be configured to control the display element 1050 to display only the distant virtual object, and output the image light 1332 representing the distant virtual object (as shown in FIG. 13A). In some embodiments, based on the eye tracking information provided by the eye tracking device (not shown), the controller 740 may determine a vergence distance $d_{v1}$ of the distant virtual object. Based on the determined eye tracking information, the controller 740 may control the first PVH lens 1105 to operate in the active state and the second PVH lens 1115 to operate in the non-active state. Referring to FIG. 13A, the lens assembly 1301 may image the distant virtual object to the first image plane 1305 having the first axial distance of $d_{a1}$ to the eyebox 759. In some embodiments, the first axial distance of $d_{a1}$ may be configured to be substantially equal to the vergence distance $d_{v1}$ of the distant virtual object. Thus, the eyes 760 placed at the exit pupil 757 within the eyebox 759 may accommodate for the distant virtual object.

During the second sub-frame, the controller 740 may be configured to control the display element 1050 to display only the close virtual object, and output the image light 1362 representing the close virtual object (as shown in FIG. 13B). Based on the eye tracking information provided by the eye tracking device (not shown), the controller 740 may determine a vergence distance $d_{v2}$ of the close virtual object. Based on the determined eye tracking information, the controller 740 may control the first PVH lens 1105 to operate in the non-active state and the second PVH lens 1115 to operate in the active state. Referring to FIG. 13B, the lens assembly 1301 may image the close virtual object to the second image plane 1310 having the second axial distance of $d_{a1}$ to the eyebox 759. In some embodiments, the second axial distance of $d_{a1}$ may be configured to be substantially equal to the vergence distance $d_{v2}$ of the close virtual object. Thus, the eyes 760 placed at the exit pupil 757 within the eyebox 759 may accommodate for the close virtual object.

Figure 12A:
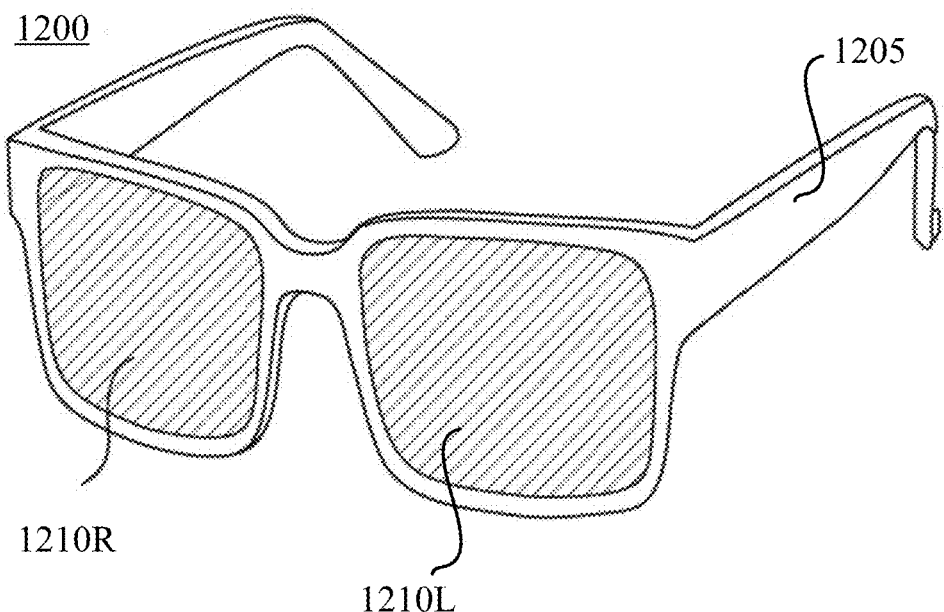
FIG. 12A illustrates a schematic diagram of an artificial reality device, according to an embodiment of the present disclosure.

FIG. 12A illustrates a schematic diagram of an artificial reality device 1200 according to an embodiment of the present disclosure. In some embodiments, the artificial reality device 1200 may produce VR, AR, and/or MR content for a user, such as images, video, audio, or a combination thereof. In some embodiments, the artificial reality device 1200 may be smart glasses. In one embodiment, the artificial reality device 1200 may be a near-eye display ("NED"). In some embodiments, the artificial reality device 1200 may be in the form of eyeglasses, goggles, a helmet, a visor, or some other type of eyewear. In some embodiments, the artificial reality device 1200 may be configured to be worn on a head of a user (e.g., by having the form of spectacles or eyeglasses, as shown in FIG. 12A), or to be included as part of a helmet that is worn by the user. In some embodiments, the artificial reality device 1200 may be configured for placement in proximity to an eye or eyes of the user at a fixed location in front of the eye(s), without being mounted to the head of the user. In some embodiments, the artificial reality device 1200 may be in a form of eyeglasses which provide vision correction to a user's eyesight. In some embodiments, the artificial reality device 1200 may be in a form of sunglasses which protect the eyes of the user from the bright sunlight. In some embodiments, the artificial reality device 1200 may be in a form of safety glasses which protect the eyes of the user. In some embodiments, the artificial reality device 1200 may be in a form of a night vision device or infrared goggles to enhance a user's vision at night.

Figure 12B:
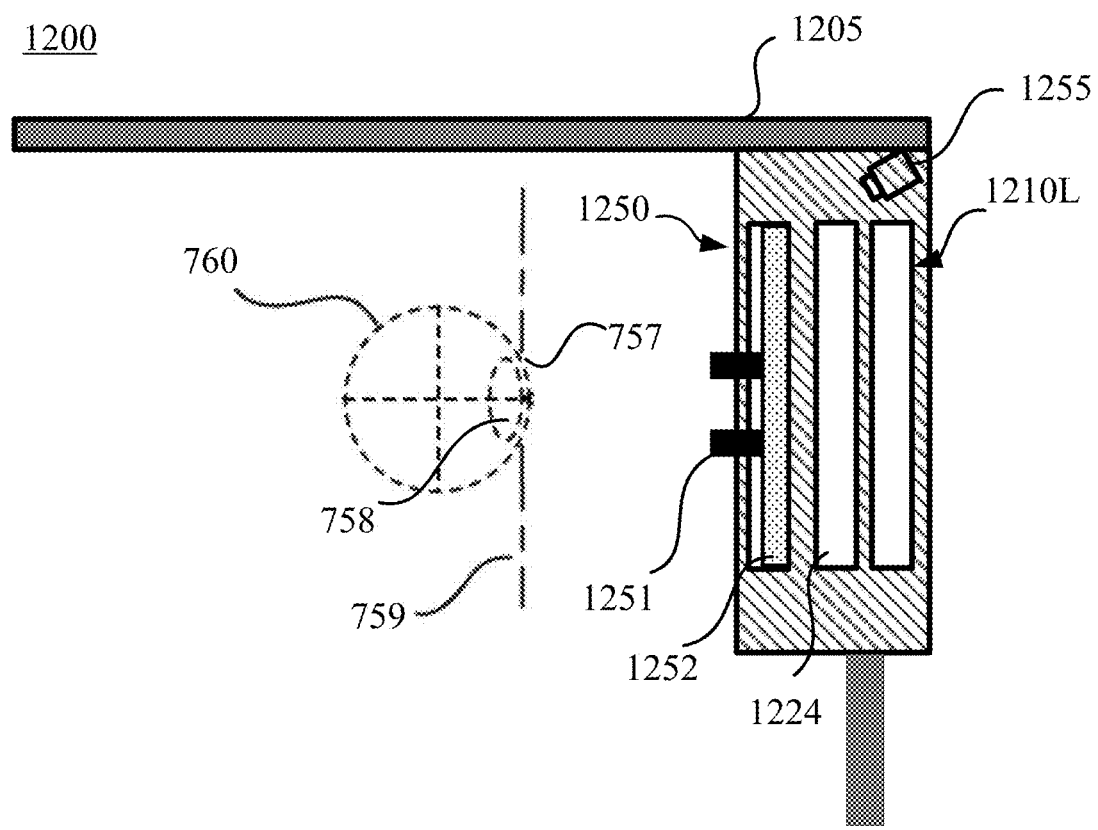
FIG. 12B schematically illustrates a cross-sectional view of half of the artificial reality device shown in FIG. 12A, according to an embodiment of the present disclosure.

For discussion purposes, FIG. 12A shows that the artificial reality device 1200 includes a frame 1205 configured to mount to a head of a user, and left-eye and right-eye display systems 1210L and 1210R mounted to the frame 1205. FIG. 12B is a cross-sectional view of half of the artificial reality device 1200 shown in FIG. 12A according to an embodiment of the present disclosure. For illustrative purposes, FIG. 12B shows the cross-sectional view associated with the left-eye display system 1210L. The frame 1205 is merely an example structure to which various components of the artificial reality device 1200 may be mounted. Other suitable type of fixtures may be used in place of or in combination with the frame 1205.

In some embodiments, the left-eye and right-eye display systems 1210L and 1210R each may include suitable image display components configured to generate virtual images, such as the display element 705 shown in FIGS. 7A and 7B, the display panel 901 and the light guide illumination assembly 903 shown in FIG. 9A, the display panel 982 and the light guide illumination assembly 903 shown in FIG. 9B, or the display element 1050 shown in FIG. 10A, FIG. 11, and FIGS. 13A and 13B, etc. In some embodiments, the left-eye and right-eye display systems 1210L and 1210R may each include a light guide display system, e.g., the system 800 shown in FIG. 8A or the system 850 in FIG. 8B. In some embodiments, the left-eye and right-eye display systems 1210L and 1210R may include one or more disclosed BPLC polarization hologram elements.

In some embodiments, the artificial reality device 1200 may also include a viewing optics system 1224 disposed between the left-eye display system 1210L or right-eye display system 1210R and the eyebox 759. The viewing optics system 1224 may be configured to guide an image light (representing a computer-generated virtual image) output from the left-eye display system 1210L or right-eye display system 1210R to propagate through one or more exit pupils 757 within the eyebox 759. For example, the viewing optics system 1224 may include the off-axis combiner 720 shown in FIG. 7A, the off-axis combiner 780 shown in FIG. 7B, the lens assembly 853 shown in FIG. 8B, the lens assembly 902 shown in FIG. 9A or FIG. 9B, the path-folding lens assembly 1001 shown in FIG. 10A, the path-folding lens assembly 1101 shown in FIG. 11, or the path-folding lens assembly 1301 shown in FIGS. 13A and 13B, etc. In some embodiments, the viewing optics system 1224 may also be configured to perform a suitable optical adjustment of an image light output from the left-eye display system 1210L or right-eye display system 1210R, e.g., correct aberrations in the image light, adjust a position of the focal point of the image light in the eyebox 759, etc. In some embodiments, the viewing optics system 1224 may include one or more disclosed BPLC polarization hologram elements. In some embodiments, the viewing optics system 1224 may be omitted.

In some embodiments, as shown in FIG. 12B, the artificial reality device 1200 may also include an object tracking system 1250 (e.g., eye tracking system and/or face tracking system). The object tracking system 1250 may include an IR light source 1251 configured to illuminate the eye 760 and/or the face, a light deflecting element 1252 configured to deflect the IR light reflected by the eye 760 toward an optical sensor 1255. The optical sensor 1255 (e.g., a camera) may be configured to receive the IR light deflected by the deflecting element 1252 and generate a tracking signal (e.g., an eye tracking signal).

In some embodiments, the present disclosure provides a device. The device includes a polymer stabilized blue phase liquid crystal ("PS-BPLC") layer; and an alignment structure coupled with the PS-BPLC layer. LC molecules disposed in contact with the alignment structure are configured to have a spatially varying in-plane orientation pattern that is at least partially defined by the alignment structure. The PS-BPLC layer is configured to forwardly deflect a polarized light having a predetermined handedness, and transmit a polarized light having a handedness that is orthogonal to the predetermined handedness. In some embodiments, the LC molecules disposed in contact with the alignment structure are configured to rotate periodically or non-periodically in at least one of a linear direction, a radial direction, or an azimuthal direction.

In some embodiments, the PS-BPLC layer includes a nematic liquid crystal host of about 70-90 wt %, chiral dopants of about 5-10 wt %, and a polymer network. In some embodiments, the PS-BPLC layer includes double twist cylinders having a same lattice constant in a thickness direction of the PS-BPLC layer. In some embodiments, the PS-BPLC layer includes double twist cylinders having varying lattice constants in a thickness direction of the PS-BPLC layer. In some embodiments, the PS-BPLC layer includes a plurality of sub-layers arranged in a stack configuration, each sub-layer includes double twist cylinders having a same lattice constant across the sub-layer, and at least two sub-layers have different lattice constants. In some embodiments, the alignment structure includes a first alignment structure and a second alignment structure disposed at opposite sides of the PS-BPLC layer, and the device further includes a first electrode and a second electrode coupled with the first alignment structure and the second alignment structure, respectively.

In some embodiments, the present disclosure provides a system. The system includes a light source assembly configured to generate an image light representing a virtual image; and an optical combiner configured to receive the image light that is off-axis incident onto the image combiner, the optical combiner being configured to focus the image light to propagate through a plurality of sub-eyeboxes forming an uncompressed eyebox. The optical combiner includes a polymer stabilized blue phase liquid crystal ("PS-BPLC") layer and an alignment structure, and LC molecules disposed at a surface of the PS-BPLC layer are configured with a predetermined in-plane orientation pattern that is at least partially defined by the alignment structure.

In some embodiments, the PS-BPLC layer includes a plurality of sub-layers configured to focus the image light to propagate through a plurality of sub-eyebox. In some embodiments, each sub-layer is configured to be switchable between operating at an active state and operating at a non-active state, and the sub-layer operating in the active state is configured to focus the image light to propagate through a sub-eyebox, and the sub-layer operating in the non-active state is configured to transmit the image light. In some embodiments, the system further comprises a controller configured to selectively configure one or more of the sub-layers to operate in the active state to focus the image light to propagate through one or more sub-eyeboxes forming a compressed eyebox having a size smaller than a size of the uncompressed eyebox. The controller is further configured to selectively configure remaining one or more of the sub-layers to operate in the non-active state. In some embodiments, the system further comprises an eye tracking device configured to obtain eye tracking information of an eye pupil, And the controller is coupled with the eye tracking device and configured to selectively configure the one or more sub-layers to operate in the active state based on the eye tracking information.

In some embodiments, the present disclosure provides a system. The system includes a light source assembly configured to output a light; and a light guide coupled with an in-coupling element and an out-coupling element, the in-coupling element being configured to couple the light received from the light source into the light guide as an in-coupled light, and the out-coupling element being configured to couple the in-coupled light out of the light guide as a plurality of output lights. At least one of the in-coupling element or the out-coupling element includes a polymer stabilized blue phase liquid crystal ("PS-BPLC") layer and an alignment structure. The PS-BPLC layer is configured to forwardly deflect a polarized light having a predetermined handedness, and transmit a polarized light having a handedness that is orthogonal to the predetermined handedness.

In some embodiments, the light source assembly includes a display element disposed at an input side of the light guide and configured to output the light, and the light is an image light representing a virtual image. In some embodiments, the system further comprises a lens assembly configured to focus the output lights received from the out-coupling element to an image plane within an eyebox of the system. The lens assembly is disposed at a side of the light guide facing the eyebox, and the PS-BPLC layer included in the at least one of the in-coupling element or the out-coupling element is a first PS-BPLC layer, and the lens assembly includes a second PS-BPLC layer. In some embodiments, the lens assembly is configured to provide at least one of an adjustable optical power or an adjustable steering angle to the output lights. In some embodiments, the lens assembly is a first lens assembly, and the side of the light guide facing the eyebox is a first side, the system further comprises a second lens assembly disposed at a second side of the light guide, and the second lens assembly includes a third PS-BPLC layer.

In some embodiments, the system further comprises a display panel disposed at an output side of the light guide, and the display panel is configured to be illuminated by the output lights of the light guide. In some embodiments, the display panel is configured to modulate the output lights received from the light guide as an image light representing a virtual image. In some embodiments, the system further comprises a lens assembly configured to focus the image light received from the display panel to an image plane within an eyebox of the system. The lens assembly is disposed at a side of the light guide facing the eyebox, and the PS-BPLC layer included in the at least one of the in-coupling element or the out-coupling element is a first PS-BPLC layer, and the lens assembly includes a second PS-BPLC layer.

The foregoing description of the embodiments of the present disclosure have been presented for the purpose of illustration. It is not intended to be exhaustive or to limit the disclosure to the precise forms disclosed. Persons skilled in the relevant art can appreciate that modifications and variations are possible in beam of the above disclosure.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the present disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or perform computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the present disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
    a polymer stabilized blue phase liquid crystal ("PS-BPLC") layer; and
    an alignment structure coupled with the PS-BPLC layer,
    wherein LC molecules disposed in contact with the alignment structure are configured to have a spatially varying in-plane orientation pattern that is at least partially defined by the alignment structure, and
    wherein the PS-BPLC layer is configured to forwardly deflect a polarized light having a predetermined handedness, and transmit a polarized light having a handedness that is orthogonal to the predetermined handedness.

2. The device of claim 1, wherein the LC molecules disposed in contact with the alignment structure are configured to rotate periodically or non-periodically in at least one of a linear direction, a radial direction, or an azimuthal direction.

3. The device of claim 1, wherein the PS-BPLC layer includes a nematic liquid crystal host of about 70-90 wt %, chiral dopants of about 5-10 wt %, and a polymer network.

4. The device of claim 1, wherein the PS-BPLC layer includes double twist cylinders having a same lattice constant in a thickness direction of the PS-BPLC layer.

5. The device of claim 1, wherein the PS-BPLC layer includes double twist cylinders having varying lattice constants in at least one of a thickness direction of the PS-BPLC layer or an in-plane direction of the PS-BPLC layer.

6. The device of claim 1, wherein:
    the PS-BPLC layer includes a plurality of sub-layers arranged in a stack configuration,
    each sub-layer includes double twist cylinders having a same lattice constant across the sub-layer, and
    at least two sub-layers have different lattice constants.

7. The device of claim 1, wherein the alignment structure includes a first alignment structure and a second alignment structure disposed at opposite sides of the PS-BPLC layer, and the device further includes a first electrode and a second electrode coupled with the first alignment structure and the second alignment structure, respectively.

8. A system, comprising:
    a light source assembly configured to generate an image light representing a virtual image; and
    an optical combiner configured to receive the image light that is off-axis incident onto the image combiner, the optical combiner being configured to focus the image light to propagate through a plurality of sub-eyeboxes forming an uncompressed eyebox,
    wherein the optical combiner includes a polymer stabilized blue phase liquid crystal ("PS-BPLC") layer and an alignment structure, and LC molecules disposed at a surface of the PS-BPLC layer are configured with a predetermined in-plane orientation pattern that is at least partially defined by the alignment structure.

9. The system of claim 8, wherein:
    the PS-BPLC layer includes a plurality of sub-layers configured to focus the image light to propagate through a plurality of sub-eyebox.

10. The system of claim 9, wherein:
    each sub-layer is configured to be switchable between operating at an active state and operating at a non-active state, and
    the sub-layer operating in the active state is configured to focus the image light to propagate through a sub-eyebox, and the sub-layer operating in the non-active state is configured to transmit the image light.

11. The system of claim 10, further comprising:
a controller configured to selectively configure one or more of the sub-layers to operate in the active state to focus the image light to propagate through one or more sub-eyeboxes forming a compressed eyebox having a size smaller than a size of the uncompressed eyebox; and
the controller is further configured to selectively configure remaining one or more of the sub-layers to operate in the non-active state.

12. The system of claim 11, further comprising:
an eye tracking device configured to obtain eye tracking information of an eye pupil,
wherein the controller is coupled with the eye tracking device and configured to selectively configure the one or more sub-layers to operate in the active state based on the eye tracking information.

13. A system, comprising:
a light source assembly configured to output a light; and
a light guide coupled with an in-coupling element and an out-coupling element, the in-coupling element being configured to couple the light received from the light source into the light guide as an in-coupled light, and the out-coupling element being configured to couple the in-coupled light out of the light guide as a plurality of output lights,
wherein at least one of the in-coupling element or the out-coupling element includes a polymer stabilized blue phase liquid crystal ("PS-BPLC") layer and an alignment structure, and
wherein the PS-BPLC layer is configured to forwardly deflect a polarized light having a predetermined handedness, and transmit a polarized light having a handedness that is orthogonal to the predetermined handedness.

14. The system of claim 13, wherein the light source assembly includes a display element disposed at an input side of the light guide and configured to output the light, and the light is an image light representing a virtual image.

15. The system of claim 14, further comprising a lens assembly configured to focus the output lights received from the out-coupling element to an image plane within an eyebox of the system, wherein the lens assembly is disposed at a side of the light guide facing the eyebox, and wherein the PS-BPLC layer included in the at least one of the in-coupling element or the out-coupling element is a first PS-BPLC layer, and the lens assembly includes a second PS-BPLC layer.

16. The system of claim 15, wherein the lens assembly is configured to provide at least one of an adjustable optical power or an adjustable steering angle to the output lights.

17. The system of claim 15, wherein the lens assembly is a first lens assembly, and the side of the light guide facing the eyebox is a first side, the system further comprises a second lens assembly disposed at a second side of the light guide, and the second lens assembly includes a third PS-BPLC layer.

18. The system of claim 13, further comprising a display panel disposed at an output side of the light guide, and the display panel is configured to be illuminated by the output lights of the light guide.

19. The system of claim 18, wherein the display panel is configured to modulate the output lights received from the light guide as an image light representing a virtual image.

20. The system of claim 19, further comprising a lens assembly configured to focus the image light received from the display panel to an image plane within an eyebox of the system, wherein the lens assembly is disposed at a side of the light guide facing the eyebox, and wherein the PS-BPLC layer included in the at least one of the in-coupling element or the out-coupling element is a first PS-BPLC layer, and the lens assembly includes a second PS-BPLC layer.

* * * * *